US011607363B2

(12) United States Patent
Waldridge

(10) Patent No.: US 11,607,363 B2
(45) Date of Patent: Mar. 21, 2023

(54) DIVERTER FOR USE IN THERAPEUTIC MASSAGE SYSTEM

(71) Applicant: EVA MEDTEC, INC., Bloomington, MN (US)

(72) Inventor: Irene Waldridge, Shakopee, MN (US)

(73) Assignee: Eva Medtec, Inc., Bloomington, MN (US)

(*) Notice: Subject to any disclaimer, the term of this patent is extended or adjusted under 35 U.S.C. 154(b) by 907 days.

(21) Appl. No.: 16/435,446

(22) Filed: Jun. 7, 2019

(65) Prior Publication Data

US 2019/0358115 A1 Nov. 28, 2019

Related U.S. Application Data

(63) Continuation-in-part of application No. 15/224,330, filed on Jul. 29, 2016, now Pat. No. 11,090,216.

(60) Provisional application No. 62/199,036, filed on Jul. 30, 2015.

(51) Int. Cl.
| | |
|---|---|
| *A61H 9/00* | (2006.01) |
| *F16K 11/076* | (2006.01) |
| *F16K 31/04* | (2006.01) |
| *F16K 5/04* | (2006.01) |
| *F16K 37/00* | (2006.01) |

(52) U.S. Cl.
CPC ......... *A61H 9/0078* (2013.01); *F16K 5/0407* (2013.01); *F16K 11/076* (2013.01); *F16K 31/041* (2013.01); *F16K 37/0025* (2013.01); *A61H 2201/0146* (2013.01); *A61H 2201/1238* (2013.01); *A61H 2201/1409* (2013.01); *A61H 2203/0443* (2013.01)

(58) Field of Classification Search
CPC ............................. F16K 11/076; A61H 9/0078
See application file for complete search history.

(56) References Cited

U.S. PATENT DOCUMENTS

| | | | |
|---|---|---|---|
| 706,928 A * | 8/1902 | Graham | F16K 5/0414 251/310 |
| 4,583,255 A | 4/1986 | Mogaki et al. | |
| 5,046,522 A * | 9/1991 | Le Devehat | F16K 11/085 137/554 |
| 5,267,364 A | 12/1993 | Volk | |

(Continued)

FOREIGN PATENT DOCUMENTS

| | | |
|---|---|---|
| CA | 2282101 A1 | 3/2000 |
| CN | 202822057 U | 3/2013 |

(Continued)

OTHER PUBLICATIONS

US 7,534,214 B2, 05/2009, Dehli (withdrawn)

*Primary Examiner* — Eric Keasel
(74) *Attorney, Agent, or Firm* — Dicke, Billig & Czaja, PLLC

(57) ABSTRACT

A diverter is provided for use in directing airflow from an input port to selected output ports. The diverter allows for operation without valves, and is able to provide an air signal to selected output ports in a predetermined manner. The diverter having a rotatable member, or swivel valve, directing air signals to the desired output port depending on the rotational position thereof. The diverter is driven by a controlled actuator or motor, to thus control the manner in which air signals are provided to a plurality of output ports in a controlled manner.

4 Claims, 43 Drawing Sheets

(56) References Cited

U.S. PATENT DOCUMENTS

| | | |
|---|---|---|
| 5,807,290 A | 9/1998 | Barry |
| 5,815,865 A | 10/1998 | Washburn et al. |
| 5,893,184 A | 4/1999 | Murphy |
| 6,179,796 B1 | 1/2001 | Waldridge |
| 6,361,512 B1 | 3/2002 | Mackay et al. |
| 6,643,875 B2 | 11/2003 | Boso et al. |
| 6,645,165 B2 | 11/2003 | Waldridge et al. |
| 6,687,935 B2 | 2/2004 | Reeder et al. |
| 6,860,862 B2 | 3/2005 | Waldridge et al. |
| 6,952,852 B2 | 10/2005 | Reeder et al. |
| 6,966,884 B2 | 11/2005 | Waldridge et al. |
| 7,604,606 B2 | 10/2009 | Dehli |
| 8,021,313 B2 | 9/2011 | Dehli |
| 8,052,630 B2 | 11/2011 | Kloecker et al. |
| 8,167,856 B2 | 5/2012 | Kazala, Jr. et al. |
| 8,418,296 B1 | 4/2013 | Hanlon et al. |
| 8,745,796 B2 | 6/2014 | Liu |
| 8,753,383 B2 | 6/2014 | Parish et al. |
| 8,863,338 B2 | 10/2014 | Dzioba et al. |
| 8,893,338 B2 | 11/2014 | McCausland et al. |
| 8,966,689 B2 | 3/2015 | McGuire et al. |
| 9,015,885 B2 | 4/2015 | Chapin |
| 9,119,760 B2 | 9/2015 | Purdy et al. |
| 2007/0088239 A1 | 4/2007 | Roth et al. |
| 2008/0082029 A1 | 4/2008 | Diana |
| 2009/0270774 A1 | 10/2009 | Gowda et al. |
| 2009/0299239 A1 | 12/2009 | Meyer et al. |
| 2011/0314612 A1 | 12/2011 | Hsu |
| 2012/0079662 A1 | 4/2012 | Dzioba et al. |
| 2013/0000047 A1 | 1/2013 | McCann et al. |
| 2013/0042413 A1 | 2/2013 | Cao |
| 2013/0085431 A1 | 4/2013 | Malhi |
| 2014/0007353 A1 | 1/2014 | Stryker et al. |
| 2015/0148196 A1 | 5/2015 | Hanks et al. |

FOREIGN PATENT DOCUMENTS

| | | |
|---|---|---|
| EP | 0986999 A2 | 3/2000 |
| JP | 2000-185081 A | 7/2000 |
| JP | 2000-237256 A | 9/2000 |
| JP | 2008-073185 A | 4/2008 |
| JP | 2008-113889 A | 5/2008 |
| JP | 4258209 B2 | 4/2009 |
| WO | 2004037149 A1 | 5/2004 |

* cited by examiner

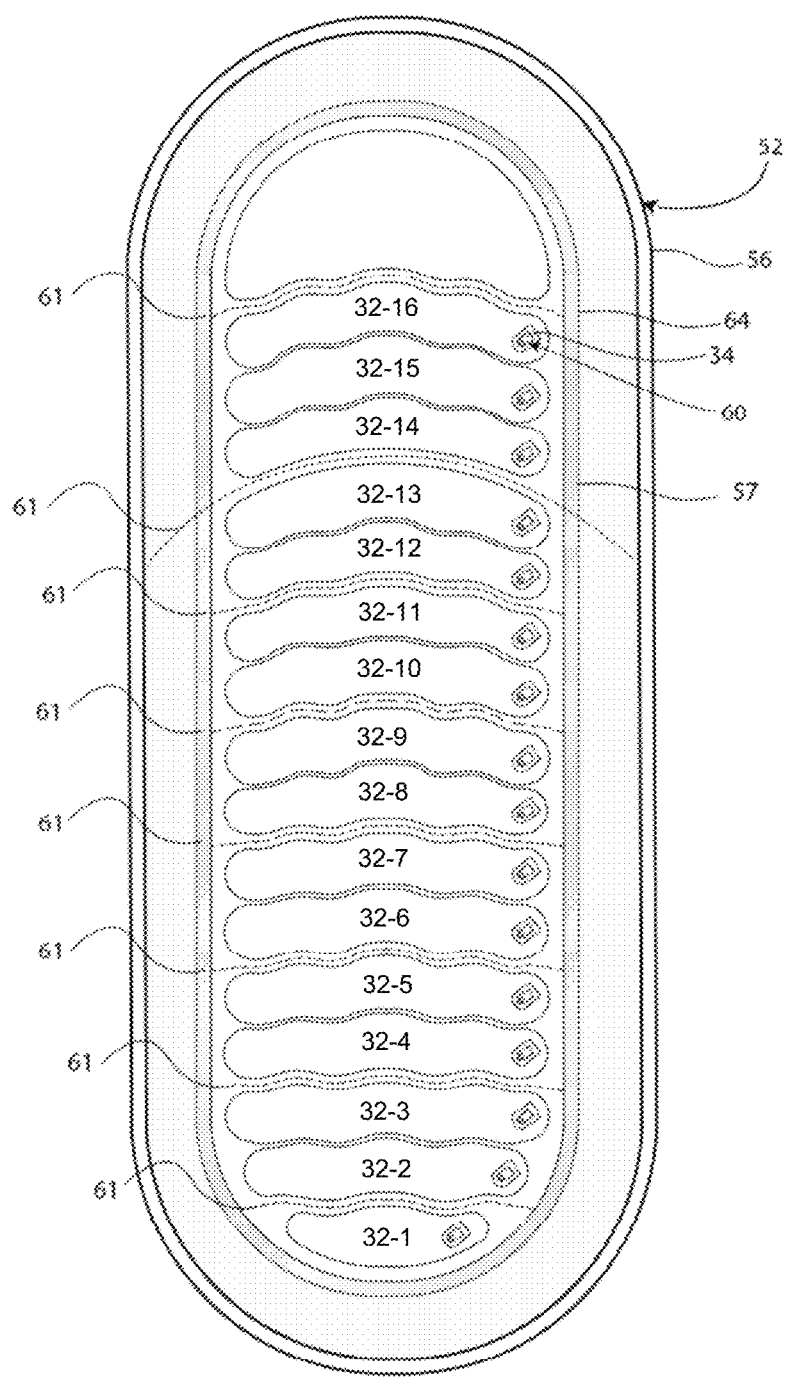

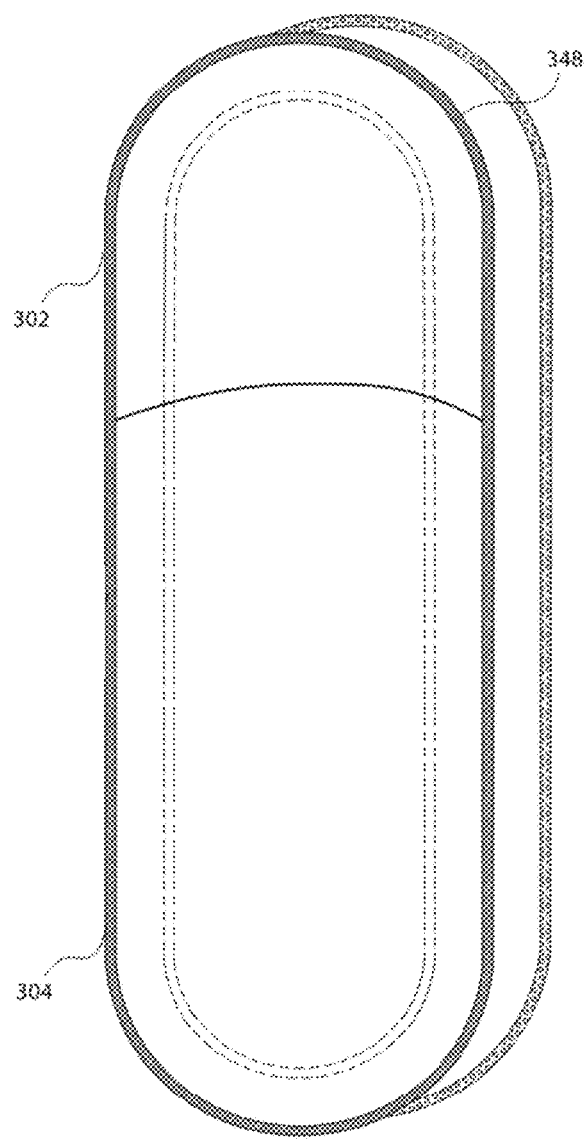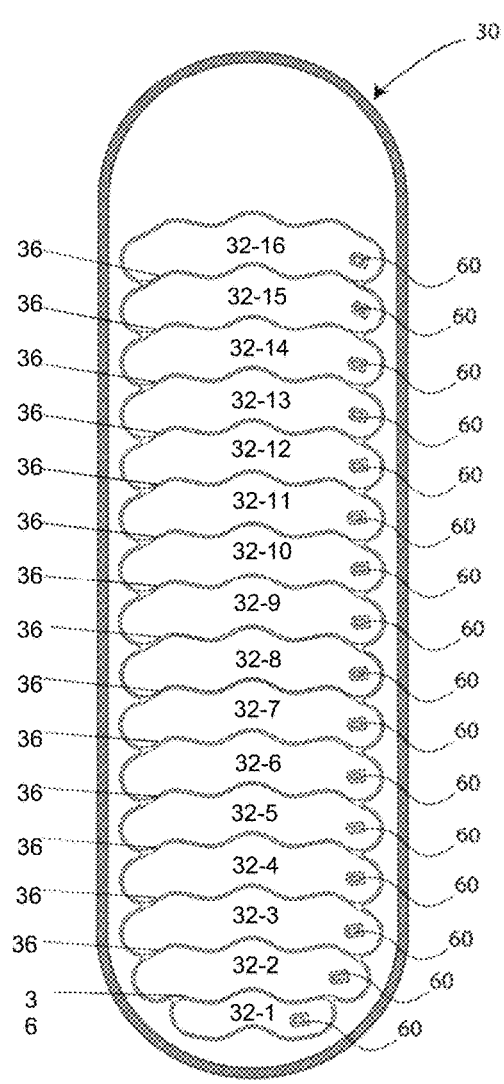

PRESSURE PROFILE #1

PRESSURE PROFILE #4

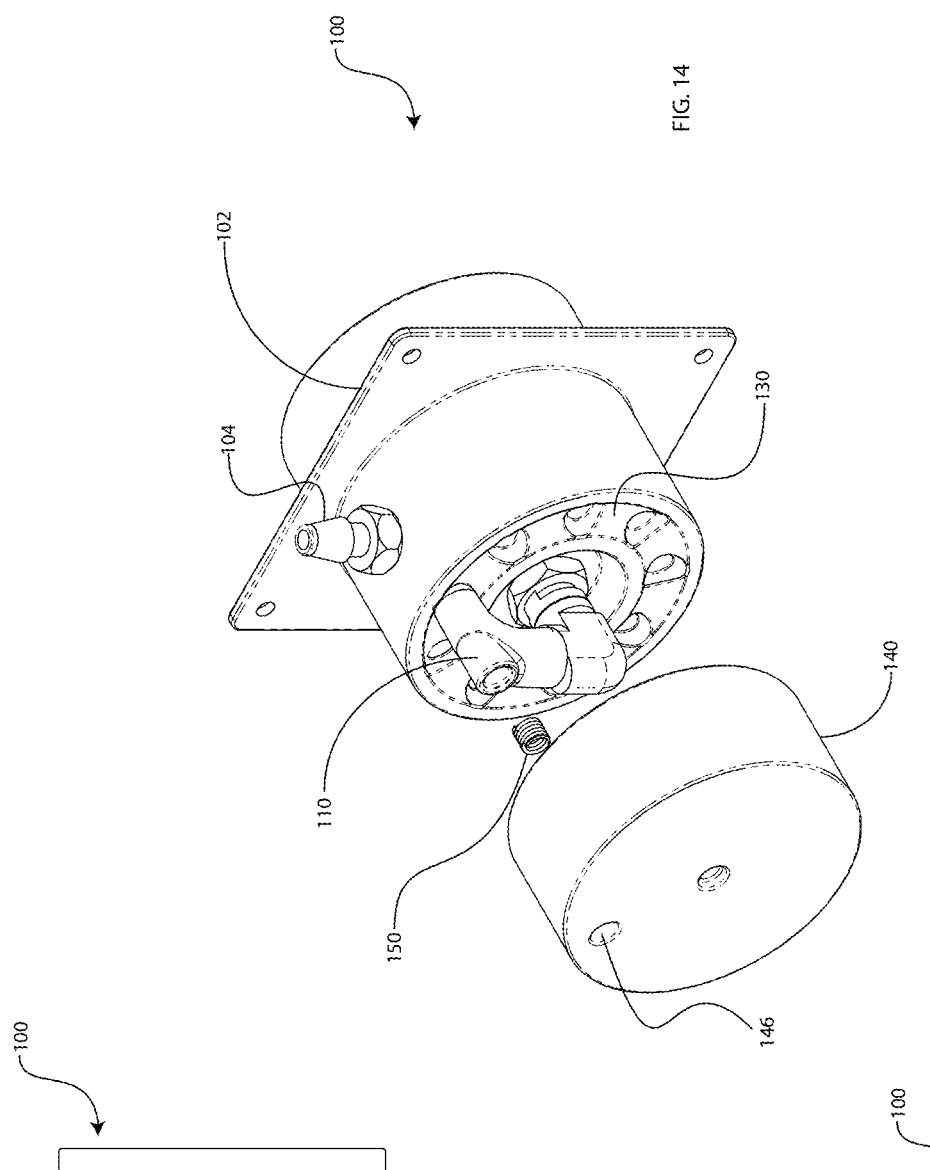
FIG. 14
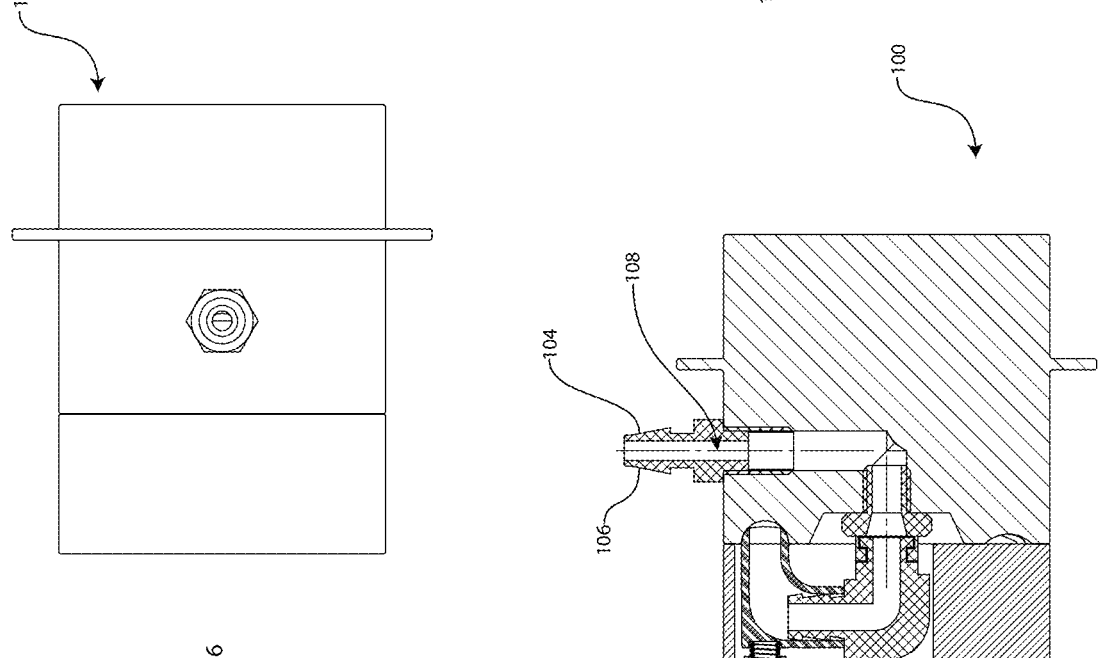
FIG. 16
FIG. 15

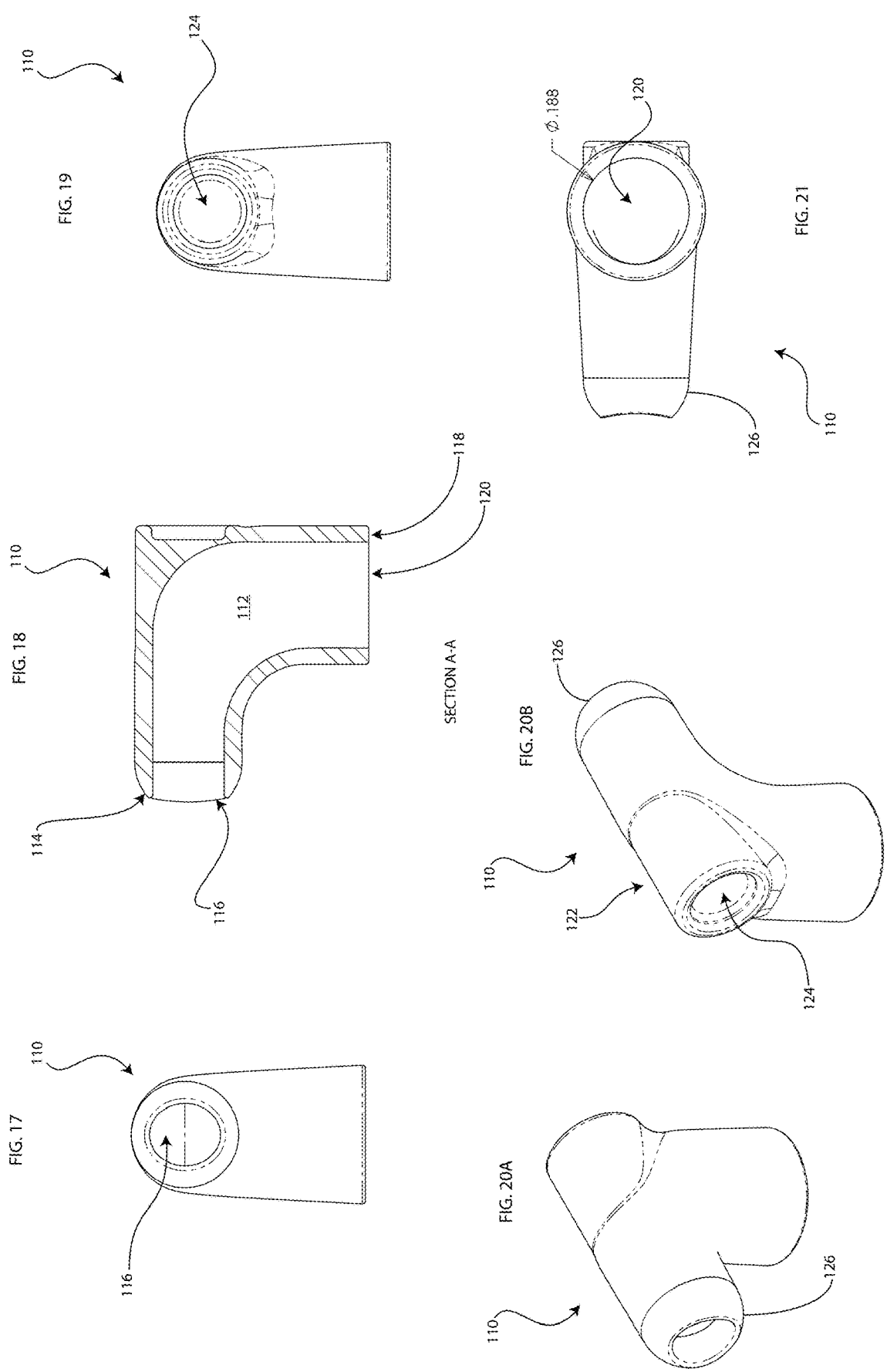

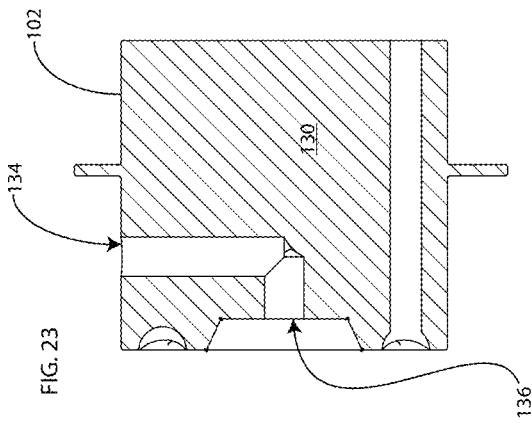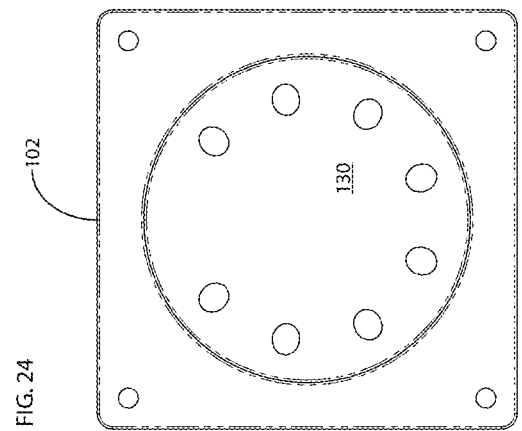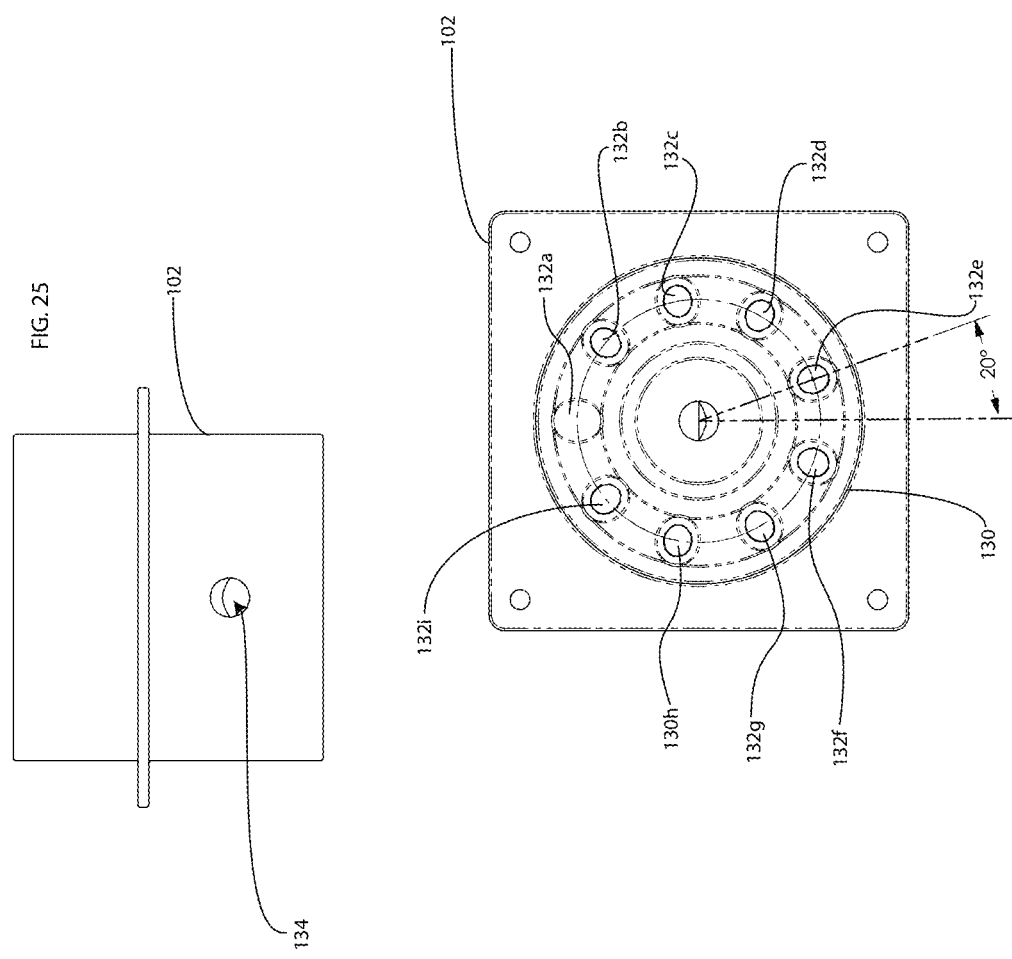

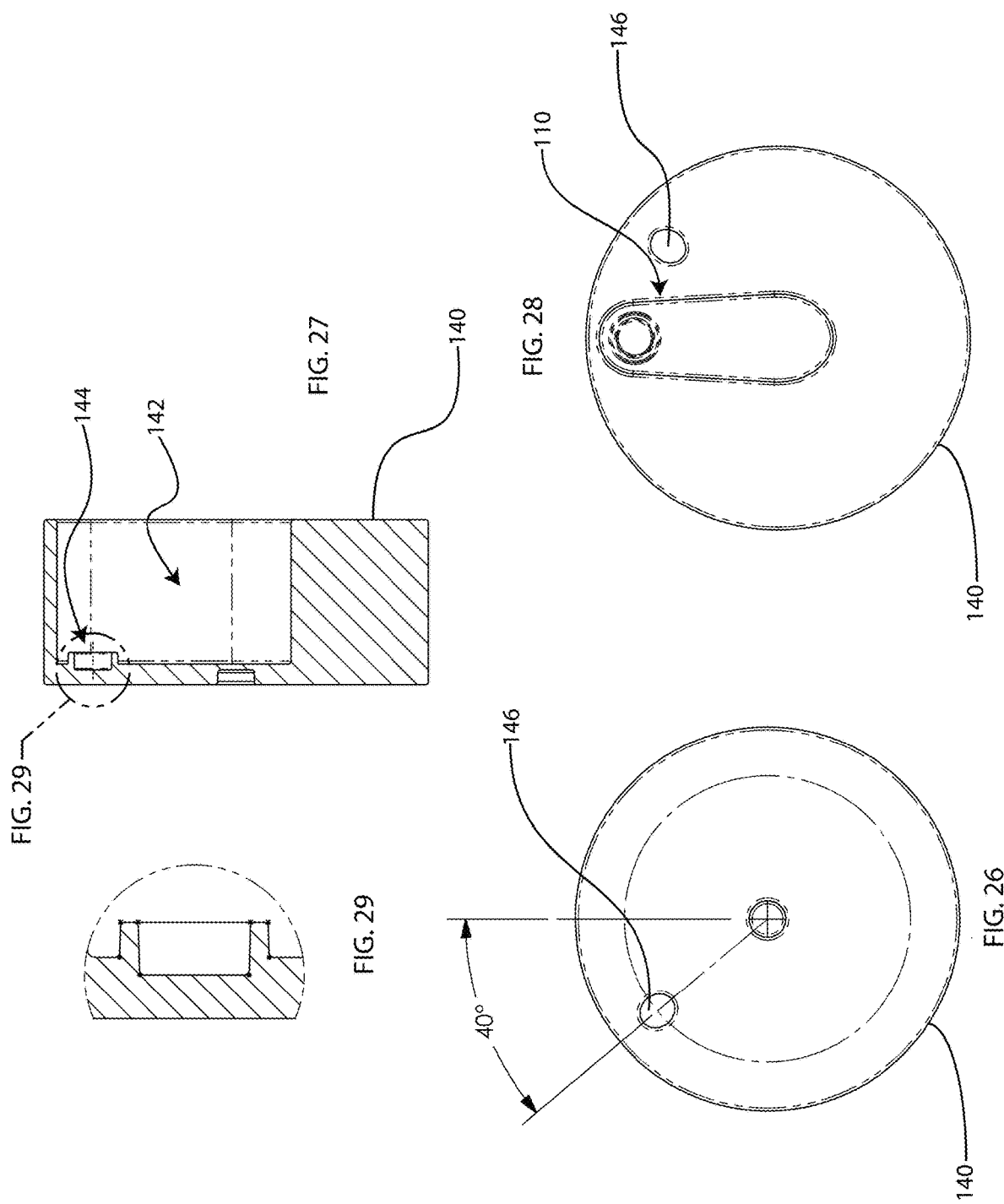

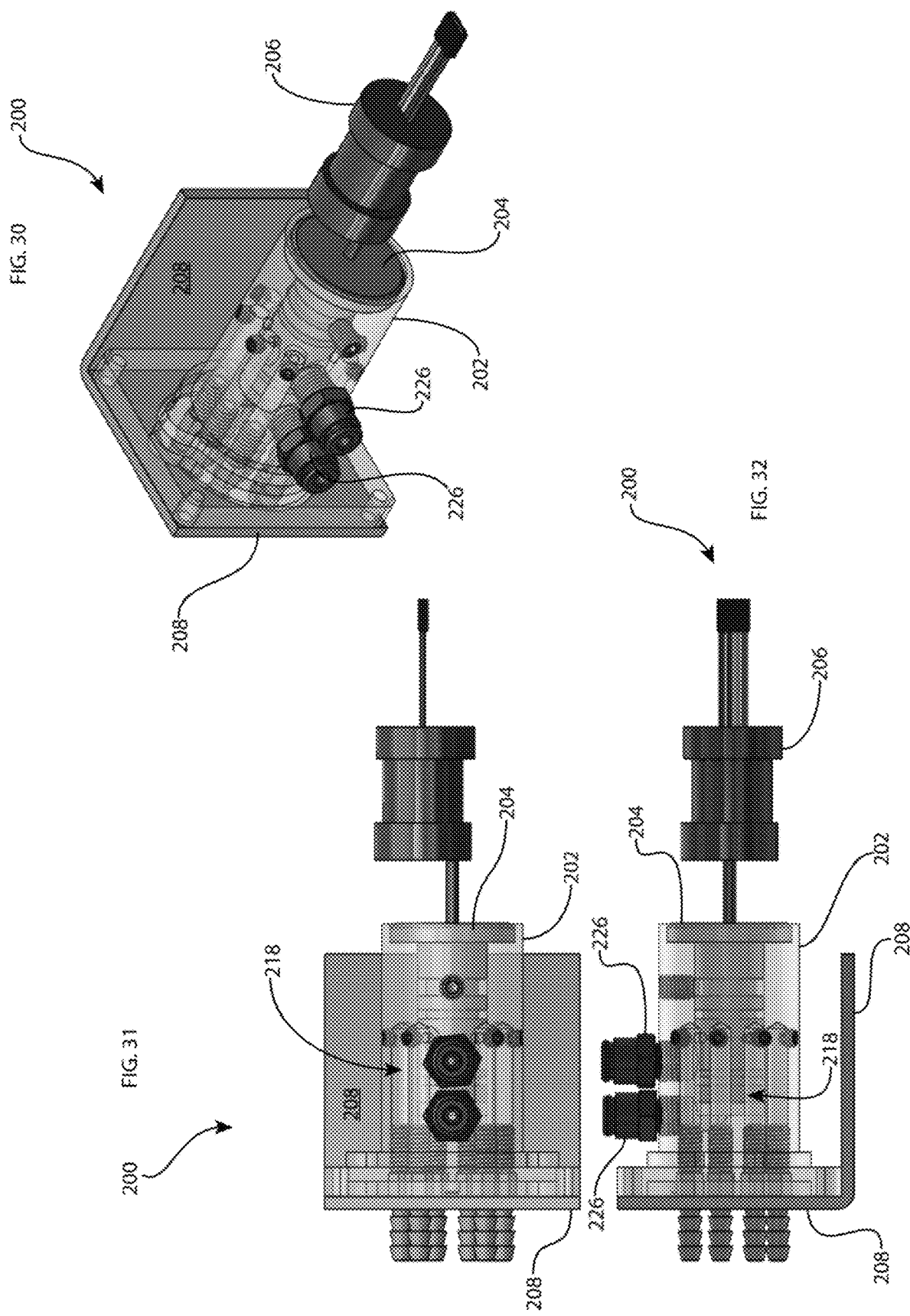

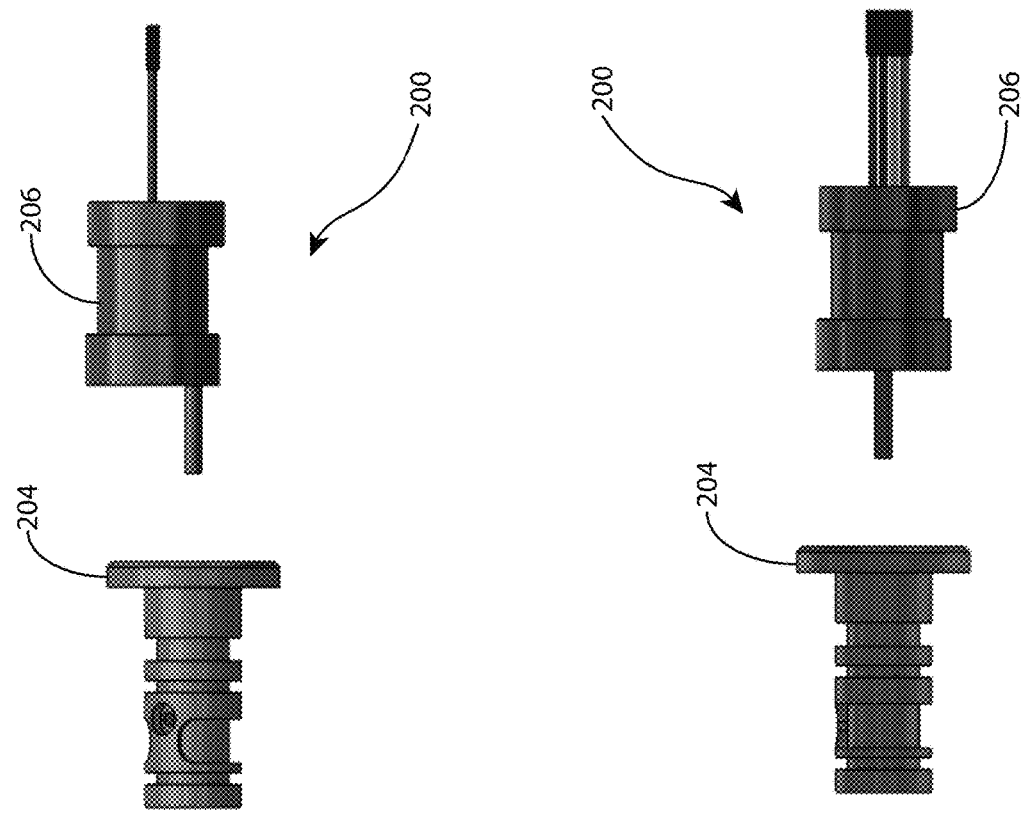
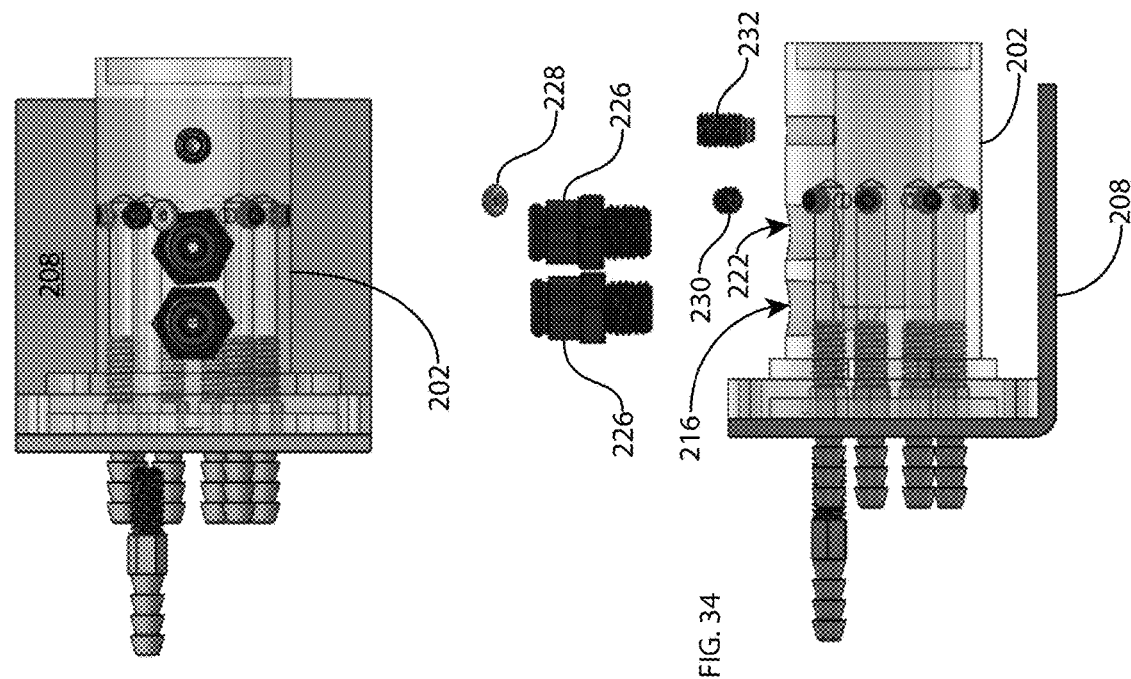
FIG. 33
FIG. 34

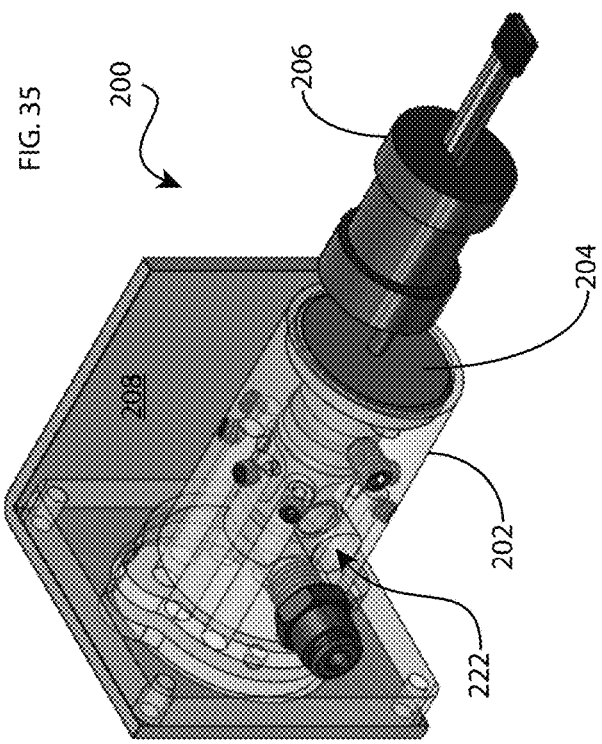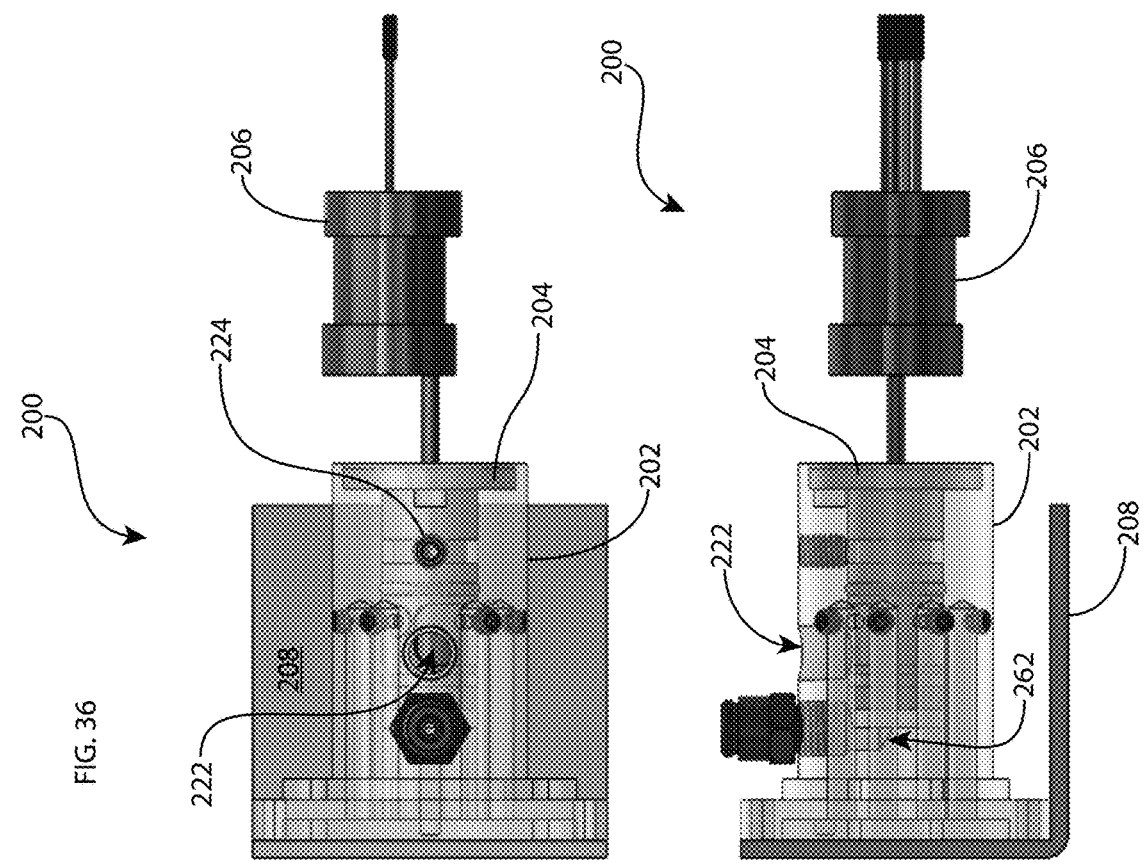

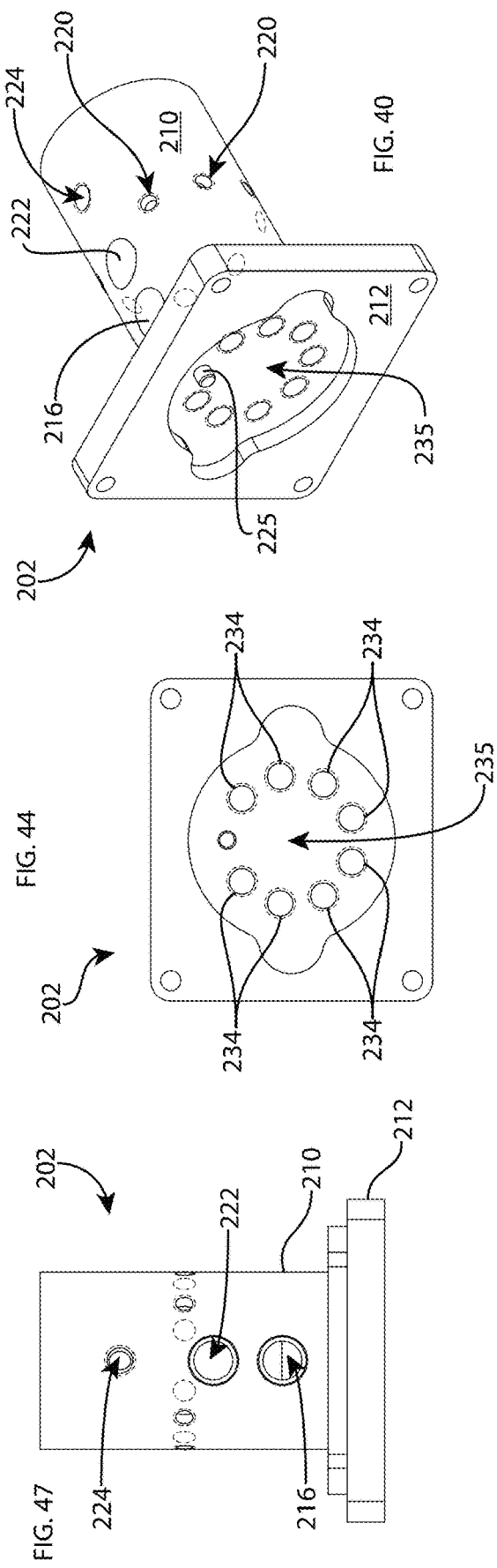
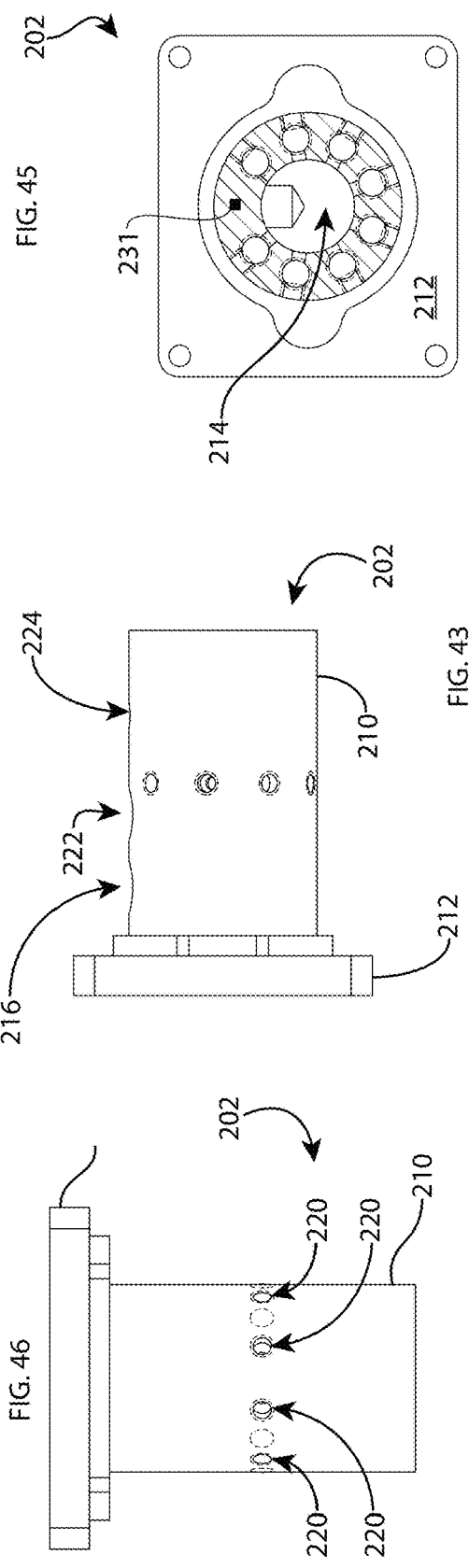

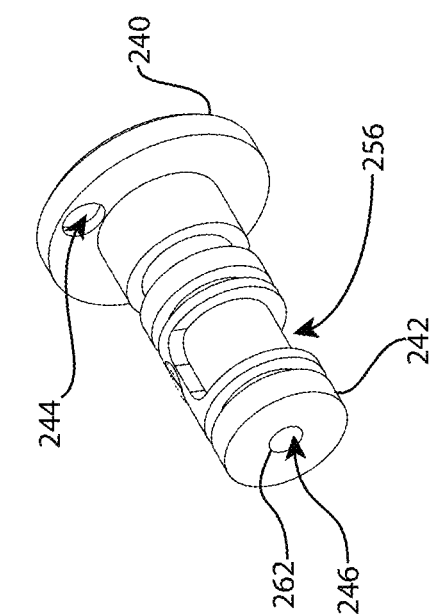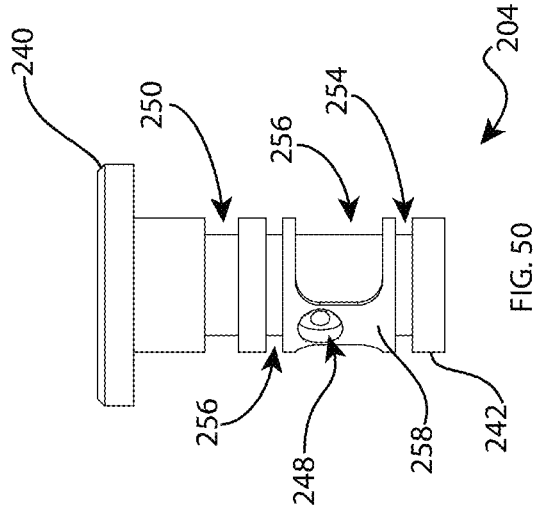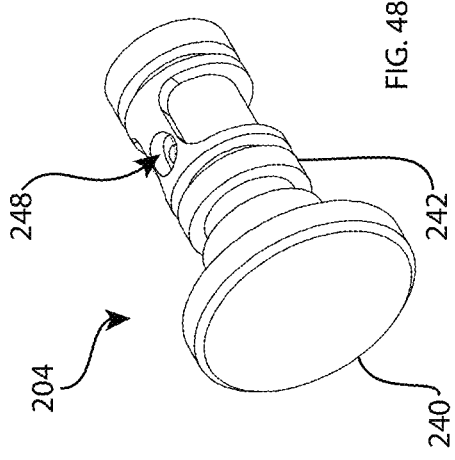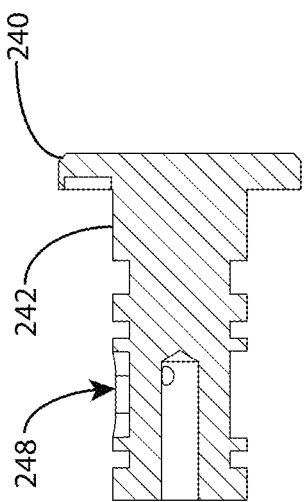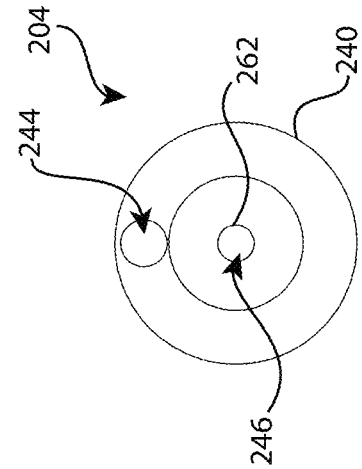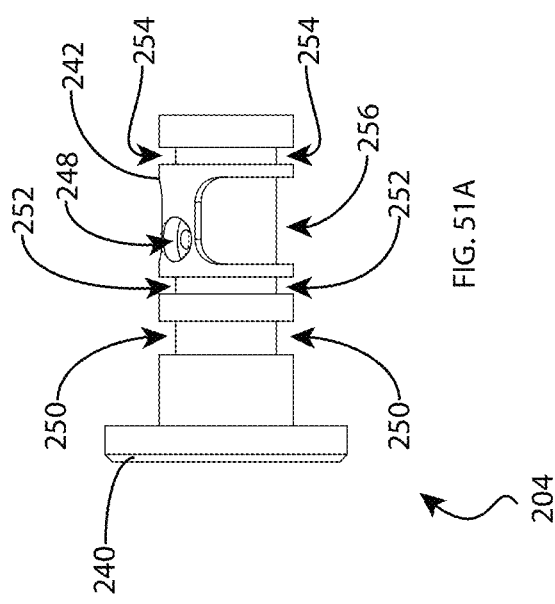

DIVERTER FOR USE IN THERAPEUTIC MASSAGE SYSTEM

RELATED APPLICATIONS

This application is a continuation in part of U.S. application Ser. No. 15/224,330 "Therapeutic Massage System" filed Jun. 29, 2016, which claims priority to U.S. Provisional Application 62/199,036 filed Jul. 30, 2015.

FIELD OF THE INVENTION

The present invention relates to an apparatus and method for managing pain and relieving stress. In particular, the present invention relates to a programmable system for delivering a therapeutic pressure profile to a user, and the various components included to allow the application of this therapy.

BACKGROUND

Massage therapy can be an effective form of natural, non-invasive treatment for individuals who experience chronic or acute pain in soft tissue and/or muscular-skeletal structures, or who suffer from circulatory conditions. For example, hands-on massage therapy pressures can elicit an immediate relaxation response as well as a lasting improvement in certain physiological systems such as the parasympathetic nervous system. Specific health benefits may include a reduction in stress and risks related to stress, such as hypertension, fatigue, digestive disorders, anxiety, and certain cardiac arrhythmias. In addition, the physical manipulation that occurs during certain forms of massage therapy can improve circulation of blood and lymph and promote the release and/or relaxation of nerves and deep connective tissue.

Better circulation can improve the health of cells by enhancing the supply of oxygen delivered to muscles. Improved cellular health causes tissues to function more efficiently, which in turn can reduce swelling in soft tissues by enhancing the removal of cellular waste products and increasing the absorption of excess fluids. By manipulating soft connective tissue, massage therapy may enhance the delivery of proper nutrition to cells. Cells may then begin to operate more efficiently, thereby improving the overall functioning of muscles and organs.

In addition to treating muscle aches and pains and relaxing the mind and body, massage therapy has proven especially beneficial in facilitating circulation and improving health. Customized bodywork can clear vessel pathways, help remove wastes, proteins, and excess fluids from cells, and allow for increased movement of lymphocytes. Lymphatic massages are therefore frequently used to reduce swelling, stimulate the immune system, and increase energy levels, among other beneficial effects.

Therapeutic massages are frequently performed hands-on by a massage therapist. Proper therapeutic technique typically requires specialized knowledge and training and, in some states, may require certification, licensing, or other type of credentialing. While trained therapeutic massage therapists can provide an effective remedy for the aforementioned conditions, there are drawbacks. In particular, payment is normally required for receiving the services of a therapeutic massage therapist. Over time, this can generate significant costs. Furthermore, an office visit may be necessary to receive the requisite care. This requires an additional expenditure of time and may be impractical for individuals whose mobility is reduced, suffer from significant pain symptoms or live in remote geographical areas.

An alternative to seeking hands-on treatment from a massage therapist is using a portable or in-home massage device. There are many such massage devices available on the market today. Automated massage devices are generally less expensive than a massage therapist's services over the course of a selected therapy treatment and can be operated in a non-clinical environment such as a home or other residence. They typically function by using rollers and/or vibration methods to apply pressure and may be incorporated into a chair, pad or other support apparatus. These automated massage therapy devices, however, are often ineffective or inefficient, or fail to apply comfortable or effective pressures. In particular, these devices frequently apply excess pressure or in an improper location on an individual's body, or apply the pressure for an inadequate or excessive period of time. For example, many automated massage therapy devices do not follow the natural curvature of the body. As a result, a user or other operator of automated massage therapy devices must continually re-position the device to different parts of the body. Even if the user or operator is able to properly reposition the device, such devices still fail to adjust the applied pressure for optimal therapeutic effectiveness on a particular region of the user's body. Moreover, while many automated massage therapy devices may aggravate certain conditions or cause additional pain, such as by applying pressure in excess of what is comfortable, relaxing or necessary for optimal therapeutic effect.

Therefore, there is a need for a massage device that self-adjusts to the contours of an individual's body and that delivers an optimal pressure profile for delivering effective and efficient treatment to treat the specific therapeutic needs of a user. There is a further need for a therapeutic massage device that provides comfort, alleviates high-pressure points and can be easily and properly operated by all users, including those with physical challenges or impairment. There is an additional need for a system that can provide targeted delivery of therapeutic massage treatments to the muscles and soft tissues proximal to and progressively along portions of the spine of a user, and/or the user's neck.

SUMMARY

Embodiments of the therapeutic massage system of the present invention substantially meet the aforementioned needs of the industry. In an embodiment, a therapeutic massage system includes a cushion, connective tubing, and a controller unit. The cushion is operably connected to the controller unit via the tubing.

The cushion has a support pad for supporting an individual lying prone thereon and a therapy pad for delivering massage therapy. The support pad and the therapy pad may be arcuate in shape for enhanced comfort and functionality. The support pad includes a plurality of compartments that are filled with a filling material, such as microbeads. The compartments are separated by seams, or compartment abutments, each of which forms an interface having a generally wavelike, or sinusoidal, shape. The support pad is generally self-adjusting to conform to the contours of the individual's body. The therapy pads include a plurality of abutting channels. Each interface between the channels also has a generally sinusoidal shape. When an individual lies on the cushion, the channels are positioned into optimal alignment with the contours of the individuals' body by virtue of the self-adjusting support pad. The channels are selectively inflatable and deflatable to apply a predetermined pressure profile to the user.

A controller unit generally includes at least one processor or controller programmed to execute a pressure profile by inflating and deflating the channels of the support pad in accordance with a prescribed massage treatment plan. The processor can control the progression, frequency, duration, and intensity at which selected channels inflate and deflate, thus causing the massage treatment plan to be delivered. The controller unit also includes a diverter and an actuator for controlling the diverter. Alternatively, the diverter and the actuator may be provided as a separate unit or separate units. The processor operatively controls the diverter to communicate air provided by an air source, such as an air compressor, to one of a plurality of chambers located within the diverter. The air is then communicated through connective tubing to one of the channels, thereby inflating the channel. The diverter can be actuated to communicate air from the air source to another chamber, thereby inflating the other channel. The diverter can substantially simultaneously deflate the previously inflated channel by directing air through an exhaust port.

In yet an additional embodiment, a diverter unit or valve assembly, is provided as a single incorporated unit having both fluid handling mechanisms, and a related actuator all contained within one housing. The actuator will respond to appropriate command signals, cause and operation of the diverter and appropriate redirection of air pressure signals. A valve assembly will include its own micro controller, thus allowing many specific control functions to be contained within this one particular component.

The processor can be programmed with information that allows the pressure-therapy treatment to be customized by an individual. The pressure-therapy treatment may be customized to deliver inflation-induced pressure to the individual's gluteus, back, shoulders, and/or neck. The pressure-therapy treatment may also be customized to provide pressure asymmetrically to selected portions of the aforementioned anatomy.

The therapeutic massage system is thereby capable of providing multiple sources or types of pressure therapy. A first source of pressure therapy originates in the support pad, which applies pressure by continuously conforming to and supporting an individual's body. A second source of pressure therapy originates in the therapy pad, which applies localized pressure along the sinusoidal wave-shaped channels located between the individual's body and the support pad. A third source of pressure therapy originates in the controller unit, which can execute instructions for sequentially inflating and deflating therapy pad channels in accordance with a prescribed treatment plan. Any one of these sources alone will provide beneficial massage therapy to a user, while the combination of any or all of these sources will provide further benefits and advantages.

BRIEF DESCRIPTION OF THE DRAWINGS

FIG. 4B is a bottom view of RF heat seal channels attached to the cover of FIG. 4A;

FIGS. 6A-6J illustrate the layers of fabric used to form a support pad, a therapy pad and a cover for a cushion;

FIG. 14 is a partially exploded perspective view of a diverter for a massage system;

FIG. 15 is a cross-sectional side view of the diverter of FIG. 14;

FIG. 16 is a top view of the diverter of FIG. 14;

FIG. 17 is front elevation view of a conduit for the diverter of FIG. 14;

FIG. 18 is a cross-sectional side elevation view of the conduit of FIG. 17;

FIG. 19 is a front elevation view of the conduit of FIG. 17;

FIG. 20A is a front perspective view of the conduit of FIG. 17;

FIG. 20B is a rear perspective view of the conduit of FIG. 17;

FIG. 21 is bottom view of the conduit of FIG. 17;

FIG. 22 is a front elevation view of a manifold and a manifold housing for a diverter;

FIG. 23 is a cross-sectional side elevation view of the manifold of FIG. 22;

FIG. 24 is a rear elevation view of the manifold and the manifold housing of FIG. 23;

FIG. 25 is top view of the housing of FIG. 22;

FIG. 26 is rear elevation view of a diverter cap for a diverter;

FIG. 27 is a cross-sectional side elevation view of the diverter of FIG. 26;

FIG. 28 is a rear elevation view of the diverter cap of FIG. 26 depicting the conduit in phantom;

FIG. 29 is a cross-sectional side elevation view of a detent in the diverter cap of FIG. 26;

FIG. 30 is perspective view of an embodiment of a diverter, depicted in phantom;

FIG. 31 is side view of the diverter of FIG. 30, depicted in phantom;

FIG. 32 is top view of the diverter of FIG. 30, depicted in phantom;

FIG. 33 is an exploded side view of the diverter of FIG. 30, depicted in phantom;

FIG. 34 is an exploded top view of the diverter of FIG. 30, depicted in phantom;

FIG. 35 is a perspective view of an embodiment of a diverter, depicted in phantom;

FIG. 36 is a side view of the diverter of FIG. 35, depicted in phantom;

FIG. 37 is a top view of the diverter of FIG. 35, depicted in phantom;

FIG. 40 is a perspective view of a manifold for the diverter of FIGS. 30 and 35;

FIG. 43 is side elevational view of the of the manifold of FIG. 40;

FIG. 44 is front elevational view of the manifold of FIG. 40;

FIG. 45 is a rear elevational view of the manifold of FIG. 40;

FIG. 46 is a bottom plan view of the manifold of FIG. 40;

FIG. 47 is a top plan view of the manifold of FIG. 40;

FIG. 48 is a perspective view of a swivel valve for the diverter of FIGS. 30 and 35;

FIG. 49 is a perspective view of the swivel valve of FIG. 48;

FIG. 50 is a top elevational view of the swivel value of FIG. 48;

FIG. 51A is a side elevational view of the swivel value of FIG. 48;

FIG. 52B is a rear elevational view of the swivel value of FIG. 48;

FIG. 53A is cross-sectional side elevational view of the swivel value of FIG. 48;

DESCRIPTION OF THE PREFERRED EMBODIMENTS

Figure 1:
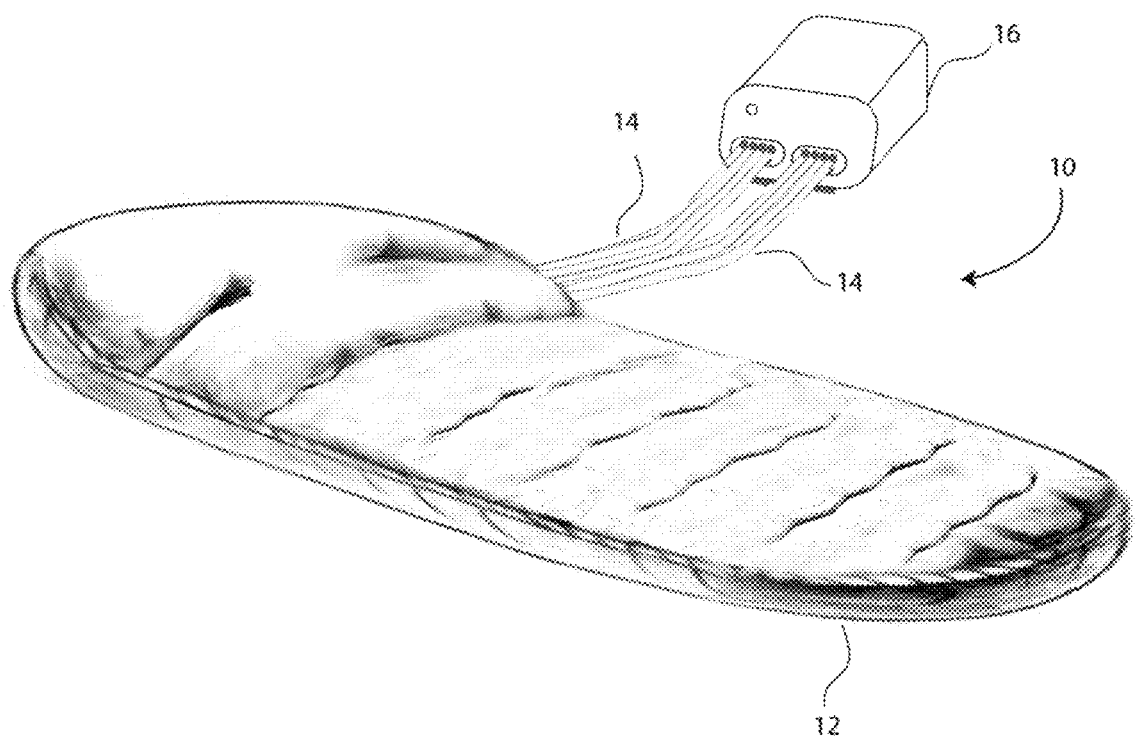
FIG. 1 is a perspective view of a massage system.

A massage system 10 according to an embodiment is depicted generally in FIG. 1. Although massage system 10 can be used for any number of purposes, the illustrated embodiment is configured to deliver therapeutic pressure treatments to an individual. Massage system 10 may be particularly useful for providing customized massage therapy to the individual's musculature proximal the individual's vertebrae, or spinal region.

Figure 2:
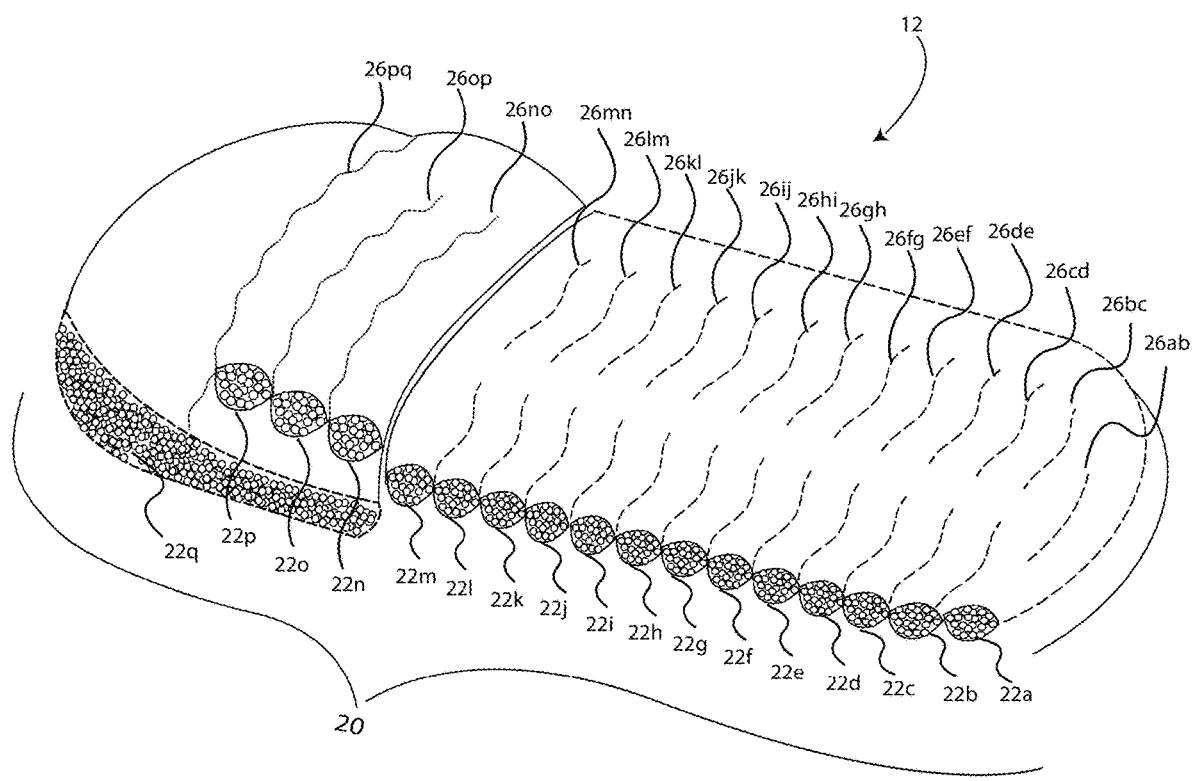
FIG. 2 is a cross-sectional perspective view of a support pad of a cushion for the massage system depicted in FIG. 1.

Referring to FIGS. 1-2, massage system 10 generally includes cushion 12, tubing 14, and controller unit 16. In embodiments, massage system 10 may also include an air source (not depicted), such as an air compressor. Tubing 14 communicates a fluid between cushion 12 and controller unit 16. By operating controller unit 16, cushion 12 can thereby be selectively inflated and deflated to deliver a pressure profile by dynamically applying and releasing pressure in a pattern designed to provide a massage experience to a user in accordance with customized pressure-therapy treatment. Said pressure-therapy treatment can be used to treat any number of disorders and types of discomfort, including chronic pain, hypertension and stress, edema, nerve and muscle and spasms, muscle stiffness, and lymphedema swelling. In addition to treatment of and alleviating symptoms associated with the aforementioned conditions, benefits to using massage system 10 can include pain relief, mind and body relaxation, injury recovery and rehabilitation, enhanced overall wellness, stress reduction, and improved circulation.

Figure 3:
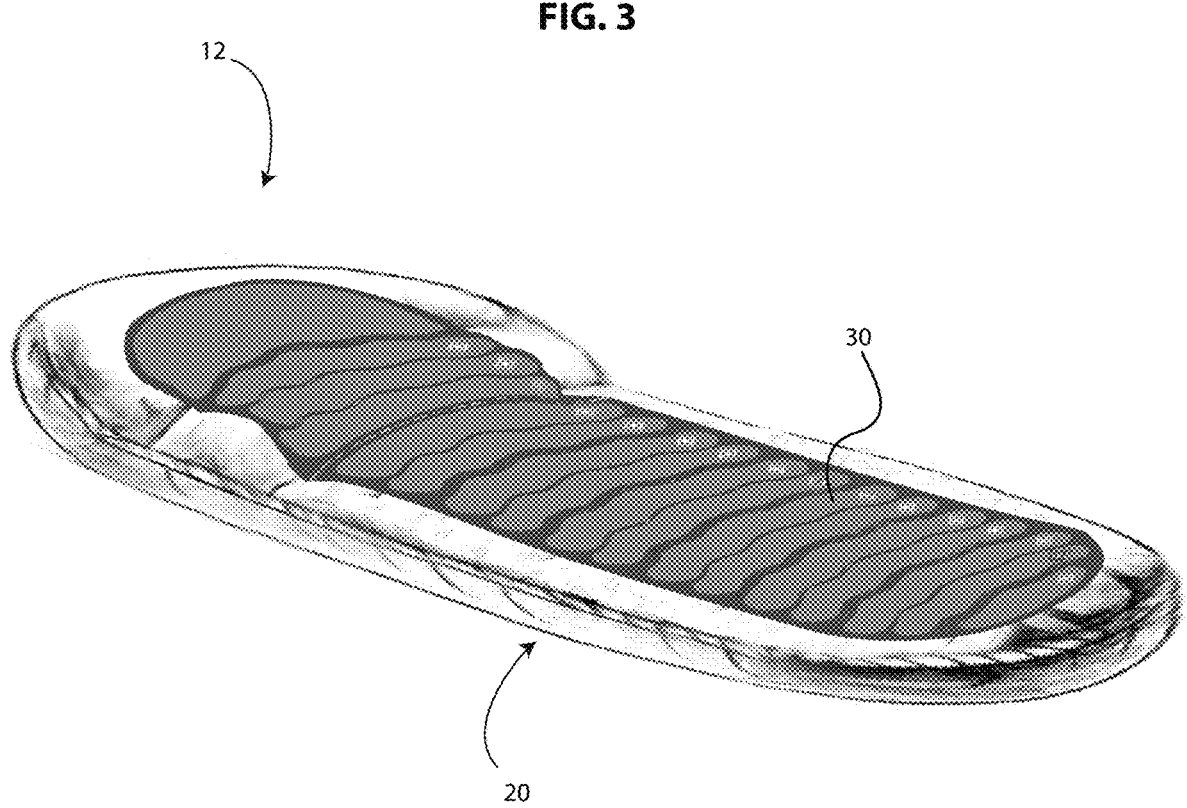
FIG. 3 is a perspective view of a cushion of FIG. 2 depicting a therapy pad in phantom.

Referring to FIG. 3, cushion 12 includes support pad 20 and therapy pad 30. Cushion 12 may also include an intermediate layer disposed between support pad 20 and therapy pad 30. Cushion 12 may also include an outer layer. The outer layer may be in the form of a cover surrounding support pad 20, therapy pad 30 and the intermediate layer.

Referring to FIG. 2, support pad 20 includes at least one compartment 22, and generally includes a plurality of compartments 22. Compartments 22 may be in the form of discrete, independent pockets. Generally, however, compartments 22 are interconnected. Each compartment 22 typically abuts another compartment 22 at a seam to form compartment interface 26. Compartment interfaces 26 can be shaped in any number of ways. In the illustrated embodiment, compartment interfaces 26 exhibit a wavelike pattern. In particular, the wavelike pattern has substantially similar characteristics to a sinusoidal curve. Compartments 22 are also generally arcuate.

To provide structural support to support pad 20, compartments 22 are filled with a supporting substance, which may be referred to herein as filler material. Although compartments 22 can be filled with air or other fluid, a generally solid material has been found to be beneficial. Nevertheless, said filler material can have certain fluid-like properties, such as, for example, the ability to conform to different shapes in response to varying pressures. In an embodiment, compartments 22 are filled with microbeads (as shown in FIG. 2), or a combination of microbeads and foam, so that support pad 20 can conform to the contours of the individual's body while structurally support the individual and maintaining adequate comfort levels. Interconnecting compartments 22 can facilitate the migration of microbeads within compartments 22, thereby enhancing the ability of support pad 20 to self-adjust to the contours of the individual's body.

Support pad 20 and compartments 22 of support pad 20 can be formed in any number of ways. In an embodiment, support pad 20 is formed by attaching together two pieces of resilient nylon fabric proximal the respective perimeters of each piece of fabric, such as by sewing or stitching. For example, seams can be sewn into the fabric to form compartments 22 and compartment interfaces 26 to permit, while also dissuading, the migration of microbeads between compartments 22. One or more flapped openings can be left in the joined fabric pieces to facilitate loading of microbeads into compartments 22.

Figure 55:
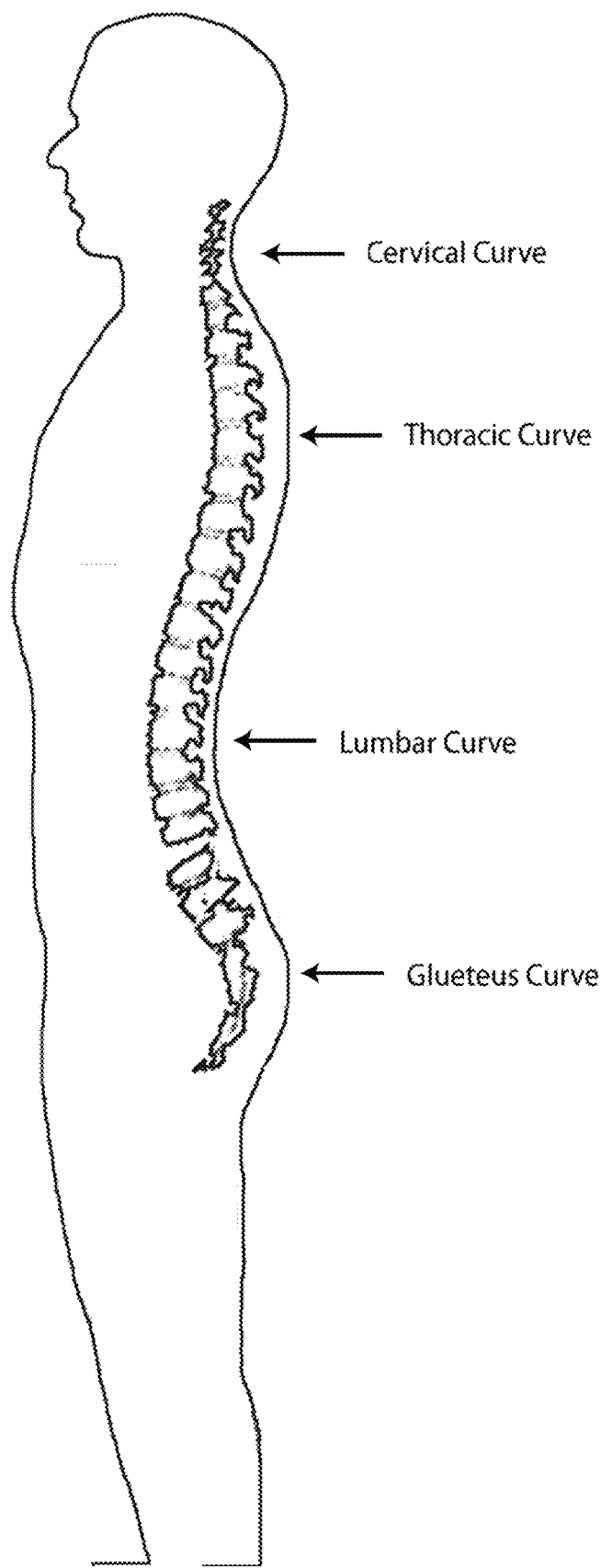
FIG. 55 is an illustration of the vertebral regions of an individual.
Figure 56:
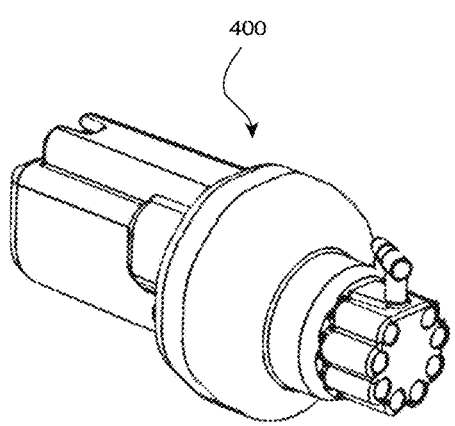
FIG. 56 is a perspective view of a valve assembly used as part of the therapeutic massage system.
Figure 57:
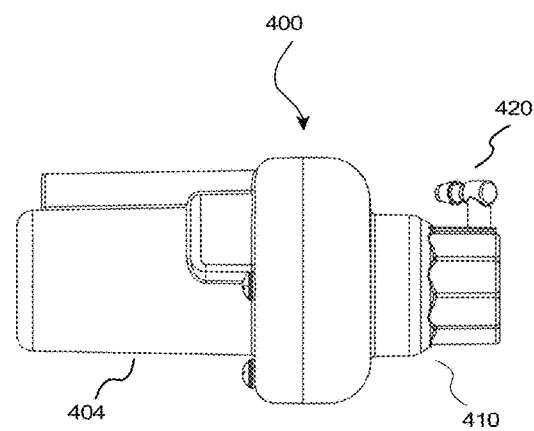
FIG. 57 is a side view of the valve assembly shown in FIG. 56.
Figure 58:
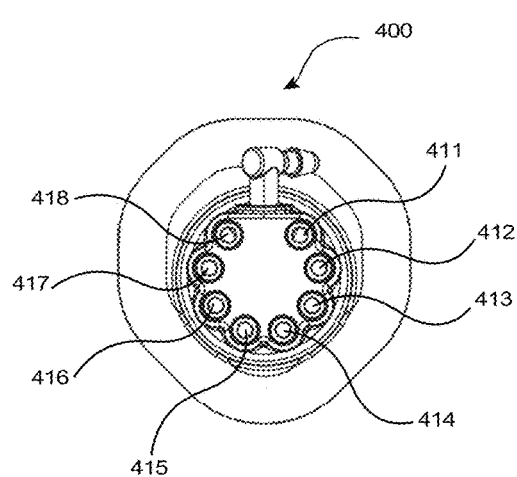
FIG. 58 is a front view of the valve assembly.
Figure 59:
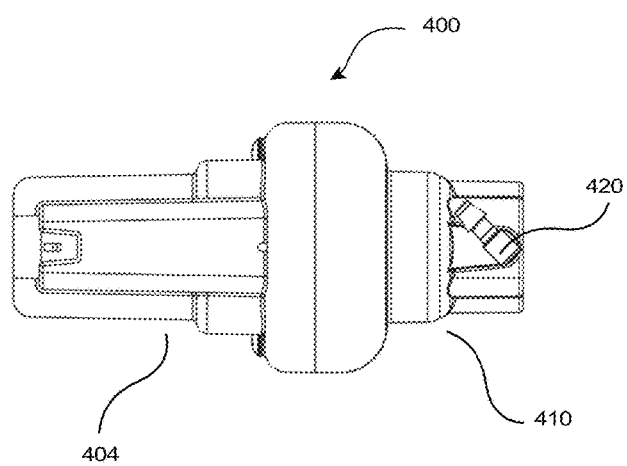
FIG. 59 is a top view of the valve assembly.

As depicted in FIGS. 2 and 3, support pad 20 may include seventeen compartments 22a-22q, which in turn form compartment interfaces 26ab-26pq. One skilled in the art will readily recognize that support pad 20 can include greater or few compartments 22 and compartment interfaces 26. The number and size of compartments 22 may be varied in accordance with the anatomical region of an individual targeted by massage system 10. Referring again to the embodiment of cushion 12 depicted in FIG. 2, support pad 20 is configured with compartments 22a-22m to support the gluteal, lumbar, thoracic, and cervical curves of an individual depicted in FIG. 55, while compartments 22n-22q support head and neck region of a user. Though support pad 20 depicted in FIG. 3 does not include a cover, support pad 20 may be attached to a cover, thereby forming an internal space adapted to receive therapy pad 30.

Figure 8A:
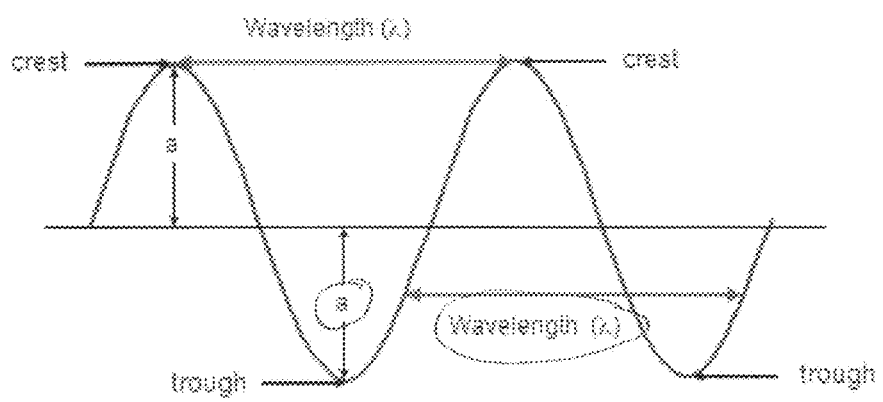
FIG. 8A is a schematic of a sinusoidal wave pattern used as part of a channel interface.
Figure 8B:
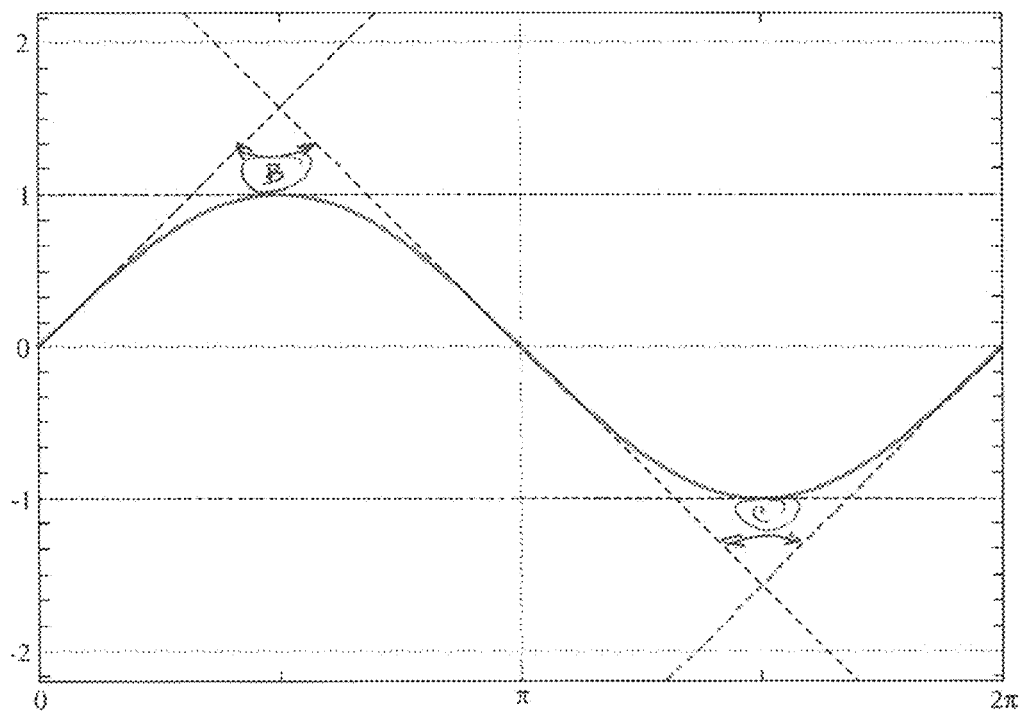
FIG. 8B is a schematic of the sinusoidal wave pattern of the channel interface.
Figure 9:
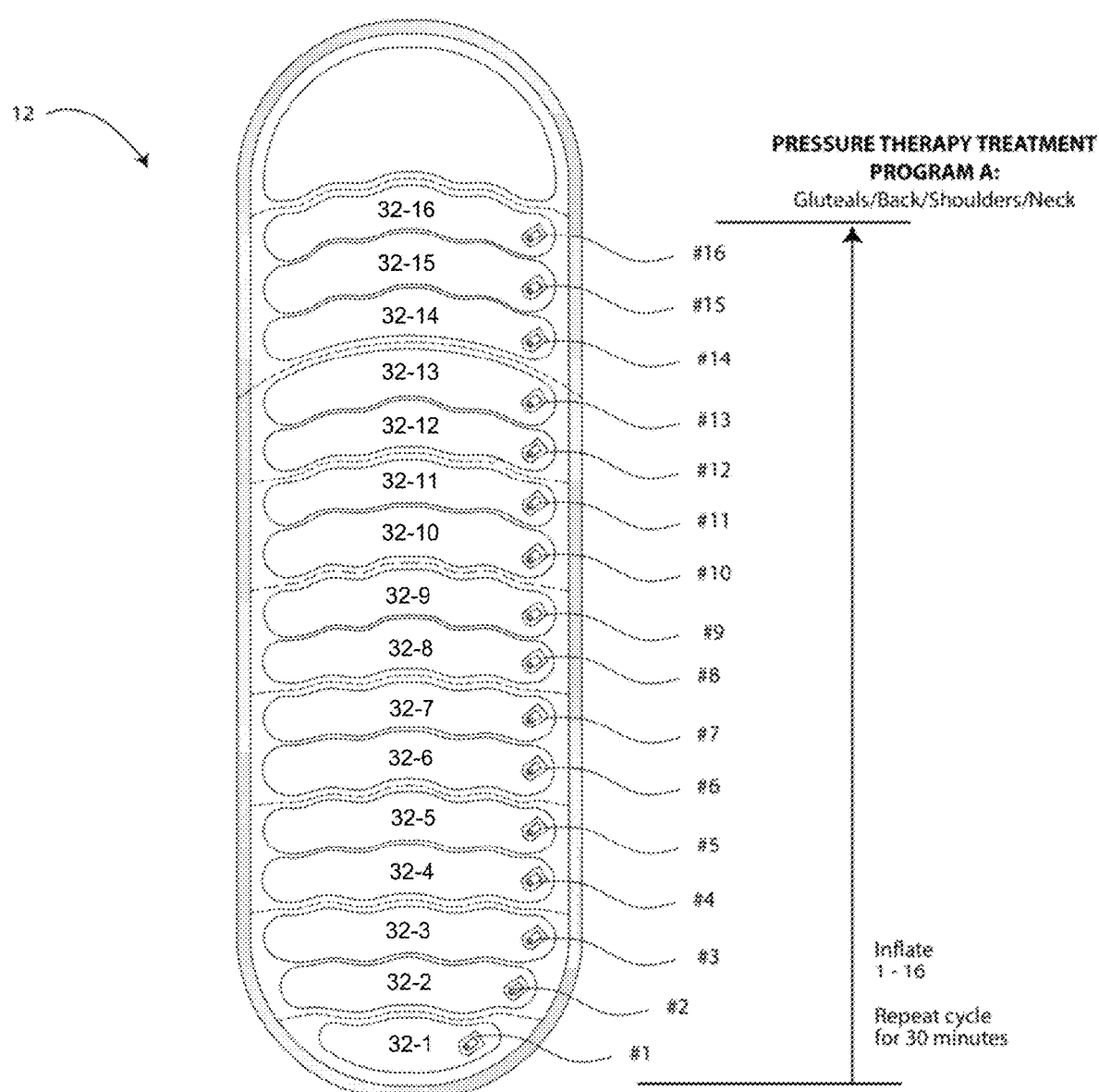
FIG. 9 illustrates a pressure profile for a pressure-therapy treatment.

As shown in FIG. 6H, therapy pad 30 includes at least one channel 32, and generally includes a plurality of channels (illustrated separately as 32-1 thru 32-16). Though channels 32 may be interconnected, each channel 32 generally defines a discrete, independent interior space. Each channel 32 also generally includes a fluid port 34 adapted to receive a tube 50 which is part of connective tubing 14 such that the interior space of channel 22 is in fluid communication with the interior space of tube 50. As with compartments 22, each channel 32 typically abuts another channel 32 to form channel interface 36. Channel interfaces 36 can be shaped in any numbers of ways. In an embodiment, channel interfaces 36 form a wavelike pattern. In particular, the wavelike pattern has substantially similar characteristics to a sinusoidal curve. An embodiment of the sinusoidal wave pattern is depicted in FIGS. 8A-8B.

Figure 7:
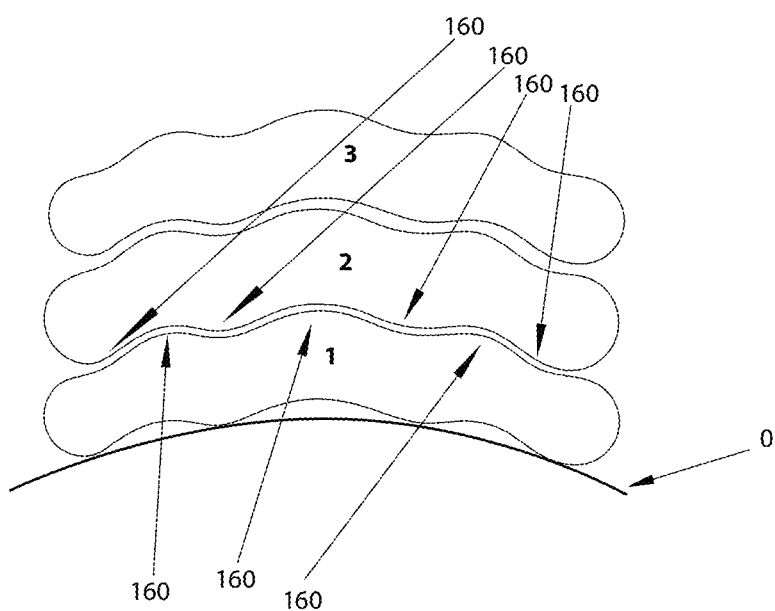
FIG. 7 is an illustration of pressure points induced by the channels of a therapy pad of the cushion.

Therapy pad 30 can be formed by radio-frequency welding (RF welding) sections of fabric together to form channels 32, wherein the weld pattern causes these channels 32 to be in abutment with one another. In an embodiment, the interior and exterior surfaces of channels 32 may have a coating of a substantially air-impermeable and/or liquid-impermeable material, such as urethane laminate. In an alternative embodiment each channel 32 may be formed independently from separate pieces of material. Alternatively, channels 32 and channel interfaces 36 may be formed, as with compartments 22, from two separate pieces of a fabric whereby the seams and channel interfaces 36 are formed by RF welding. As depicted in FIG. 7, channels 32 are generally sloped, or arcuate. When inflated, the arcuate, sinusoidal shape of channels 32 produces pressure points 160. The angle θ of the slope will be selected to optimize the desired therapeutic effect of massage device 10 and is generally between approximately eleven degrees (11°) and forty-five degrees (45°). In an embodiment, the angle θ of the slope is approximately twenty-seven degrees (27°).

As mentioned, support pad 20 and therapy pad 30, as well as a cover for support pad 20 and therapy pad 30, can be formed by joining, such as through sewing and RF welding, various layers of fabric or material. Those skilled in the art will recognize that these components (i.e., support pad 20 and therapy pad 30) can be separate devices, or could be integrated into a single integral device. The actual physical embodiments may take many forms.

One example of therapy pad 30 may be formed by joining first layer 52 and second layer 52. First layer 52 has outer first layer perimeter 56 and inner first layer perimeter 57. Similarly, second layer 54 has outer second layer perimeter 58 and inner second layer perimeter 59.

In an embodiment, first layer 52 and second layer 52 are made from RF weld fabric are joined through RF welding such that the walls forming each of the channels 32-1 thru 32-16 are substantially gas impermeable. Additionally, outer first layer perimeter 56 may be attached to outer second layer perimeter 58 and inner first layer perimeter 57 may be attached to inner second layer perimeter 59. First layer 52 generally also includes defined openings 60. As shown in FIG. 4B, openings 60 are adapted to receive fluid port 34, which allows each channel to thereby be coupled to and in fluid communication with tubing 14.

Figure 4A:
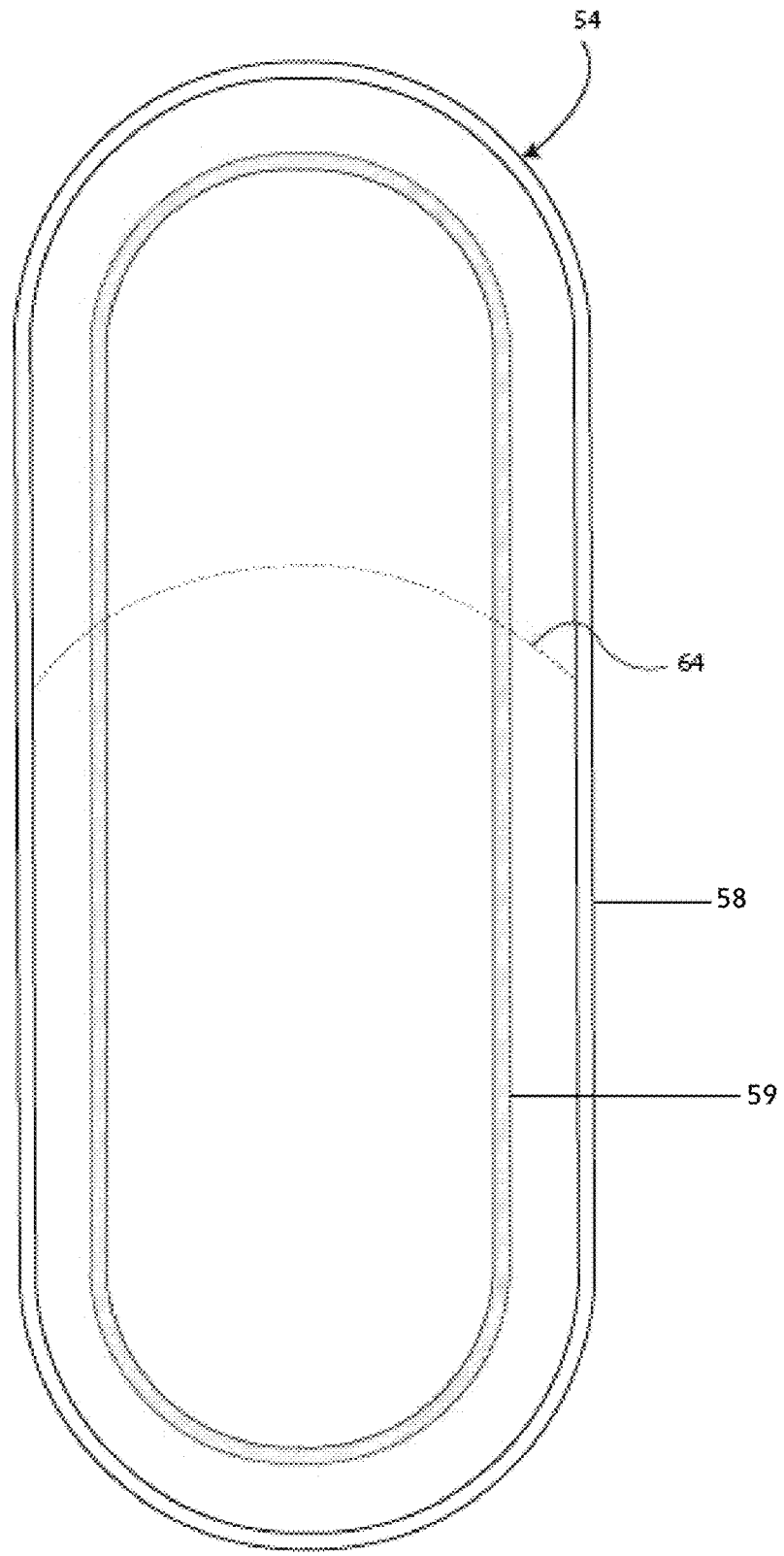
FIG. 4A is a top view of a cover used to form a cushion for a massage system.

First layer 52 and second layer 54 may further include guides 61. Guides 61 facilitate joining first layer 52 and second layer 54, such as by providing a visual stitching marker. Guides 61 are generally situated between channels 32. As depicted in FIG. 4A, guides 61 may be situated between alternating channels 32.

Figure 5A:
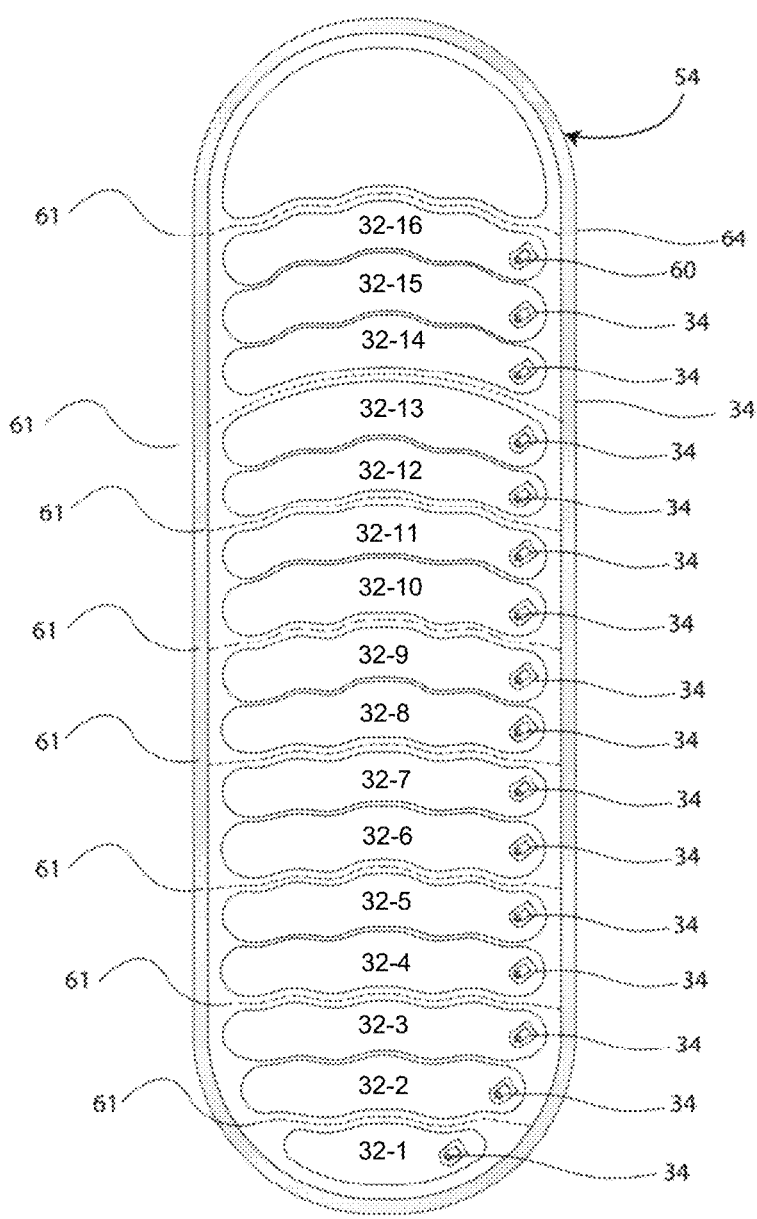
FIG. 5A is an illustration of a therapy pad.
Figure 5B:
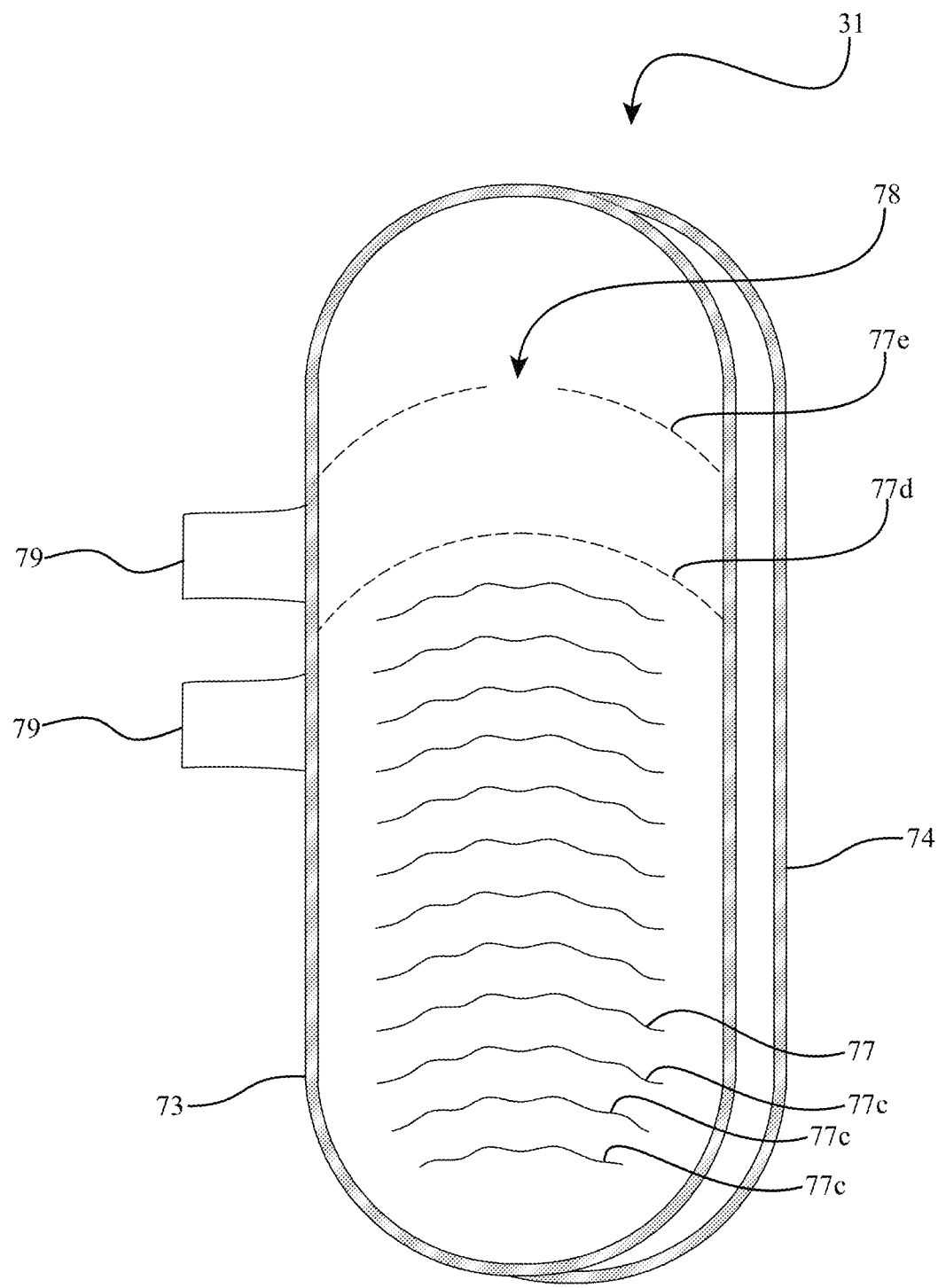
FIG. 5B is an illustration of the fabric used to form a support layer.

Referring to FIG. 3B, support pad 20 may be formed by joining third layer 62 and fourth layer 63. Third layer 62 defines third layer perimeter 64. Similarly, second layer 54 defines fourth layer perimeter 65. In an embodiment, third and fourth support layers 62, 63 are made from a substantially flexible fabric material, such as Lycra®. Third and fourth layers 62, 63 are generally joined by sewing third layer perimeter 64 to fourth layer perimeter 65. Specifically, third and fourth layers 62, 63 are sewn together along compartment guides 66, thereby forming compartments 22. As shown in FIG. 5B, compartment guides 66a may extend partially between support layer perimeters 64, 65, thereby allowing filler material to migrate between compartments of support pad 20, which compartment guide 66b may fully extend between support layer perimeters 64, 65 for additional stability and support near a user's shoulder region. As further shown in FIG. 5B, guide 66c located near the neck region of a user to facilitate further migration of filler material and further enhance user comfort.

During construction of support pad 20, portions of third layer perimeter 64 and fourth layer perimeter 65 are joined together, such as by sewing or stitching, leaving openings 68 through which filler material, such as microbeads, can be inserted. When compartments 22 have been sufficiently filled with filler material, openings 68 are closed off. Support pad 20 and therapy pad 30 may then be fully joined by aligning guides 61 with compartment guides 66 and sewing, stitching, or otherwise coupling there along. In an embodiment, intermediate layer 40 is disposed between support pad 20 and therapy pad 30.

Referring to FIGS. 6A-6I, the pre-assembly component parts used according to a method for constructing cushion 12 for message system 300 are depicted. Specifically, such components and methods can be used to form the embodiment of cushion 300 depicted in FIG. 6I. While therapy pad 30 is formed substantially as described above, support pad 20 is formed from separate upper and lower sections 302, 304. Upper section 302 is generally adapted to support the head-neck-shoulder region of a user, while lower section 304 is generally adapted to support the back-gluteal-sacro-iliac region of a user.

Figure 6A:
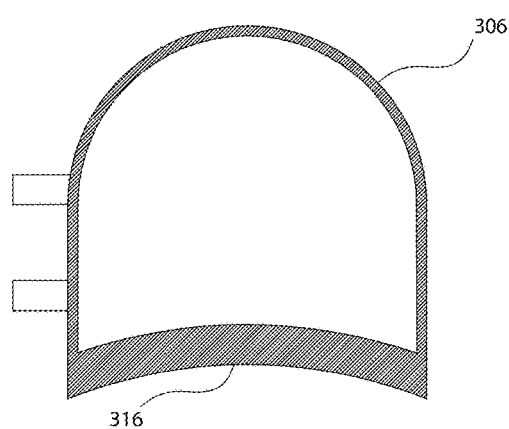
Figure 6D:
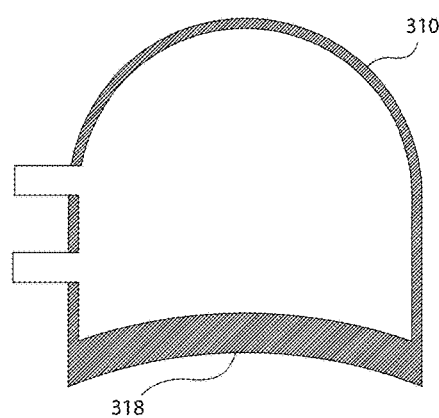
Figure 6B:
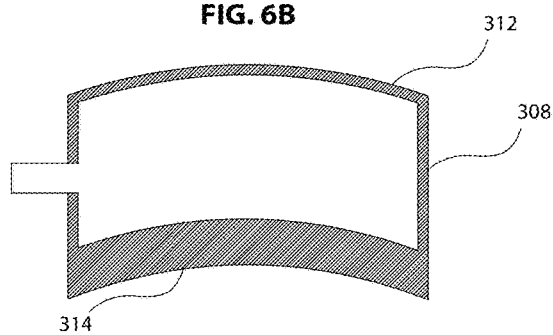
Figure 6E:
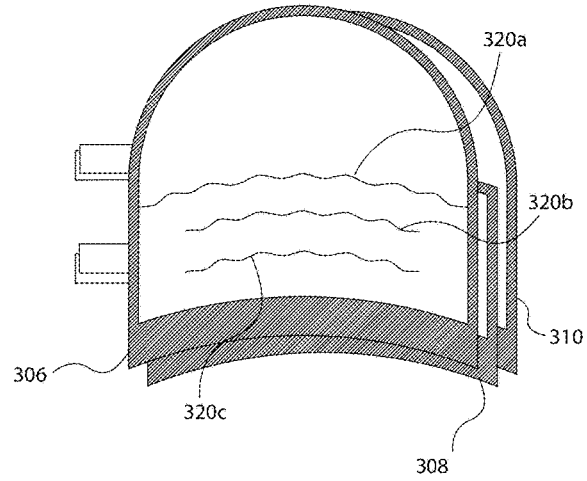
Figure 6C:
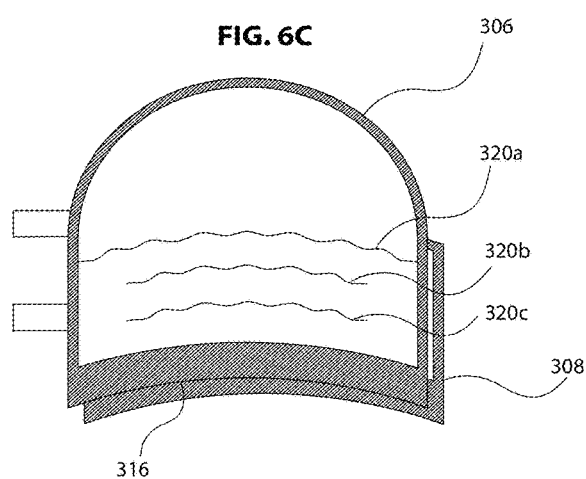

Referring to FIGS. 6A-6E, upper section 302 includes first upper section layer 306, second upper section layer 308 and third upper section layer 310. In an embodiment, second upper section layer 308 is joined to and between first upper section layer 306 and third upper section layer 310. Referring to FIGS. 6A and 6B, first supper section layer 306 may be joined to second upper section layer 308 by stitching sinusoidal-shaped seems, thereby creating compartments 10D. The joined resulting section is shown in FIG. 6C. Referring to FIG. 6D, perimeter of third upper section layer 310 is then sewn around the first and second upper section layer 306, 308. In this manner first and third upper section layers 306, 310 form a cavity that can be filled with filler material, while first and second upper section layers 306, 308 and second and third upper section layers 308, 310 form substantially separate cavities that can be filled with filler material.

First upper section layer 306 generally includes a plurality of seams 320 that define various compartments. In an embodiment, seams 320 are sinusoidal in shape and define head compartment 322, neck compartment 324 and shoulder compartments 326, which are adapted, respectively, to support the head, neck and shoulder regions of a user. Lower border 312, 314 and 316 are generally fabricated such that the bottom-most shoulder compartment 326 has a slope of approximately eleven degrees (11°) to approximately twenty-four degrees (24°). Referring to FIG. 6E, upper section 302 is fabricated to include openings 328 through which filler material can be inserted and which are closed off once sufficient filler material has been added.

Figure 6F:
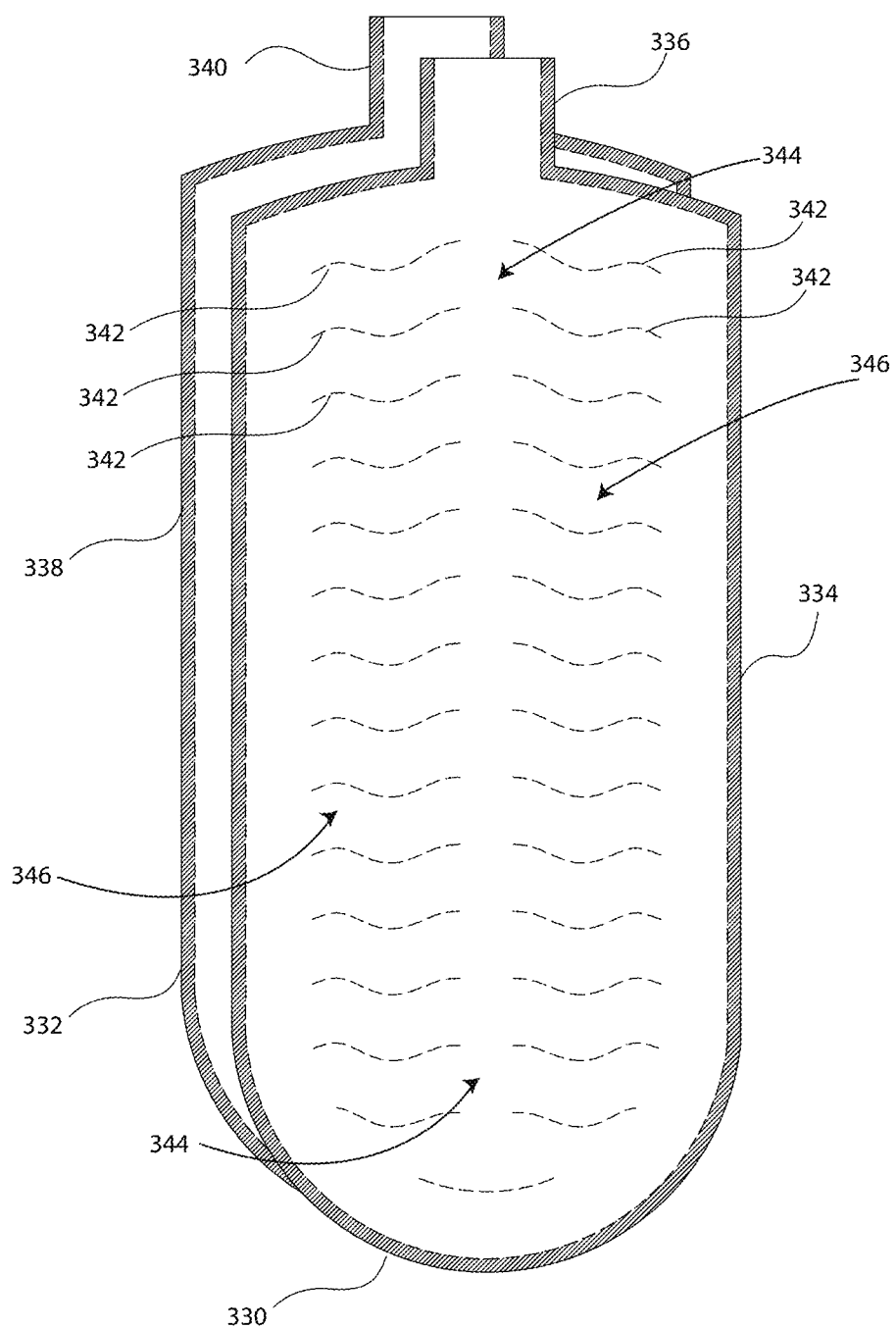
Figure 6I:
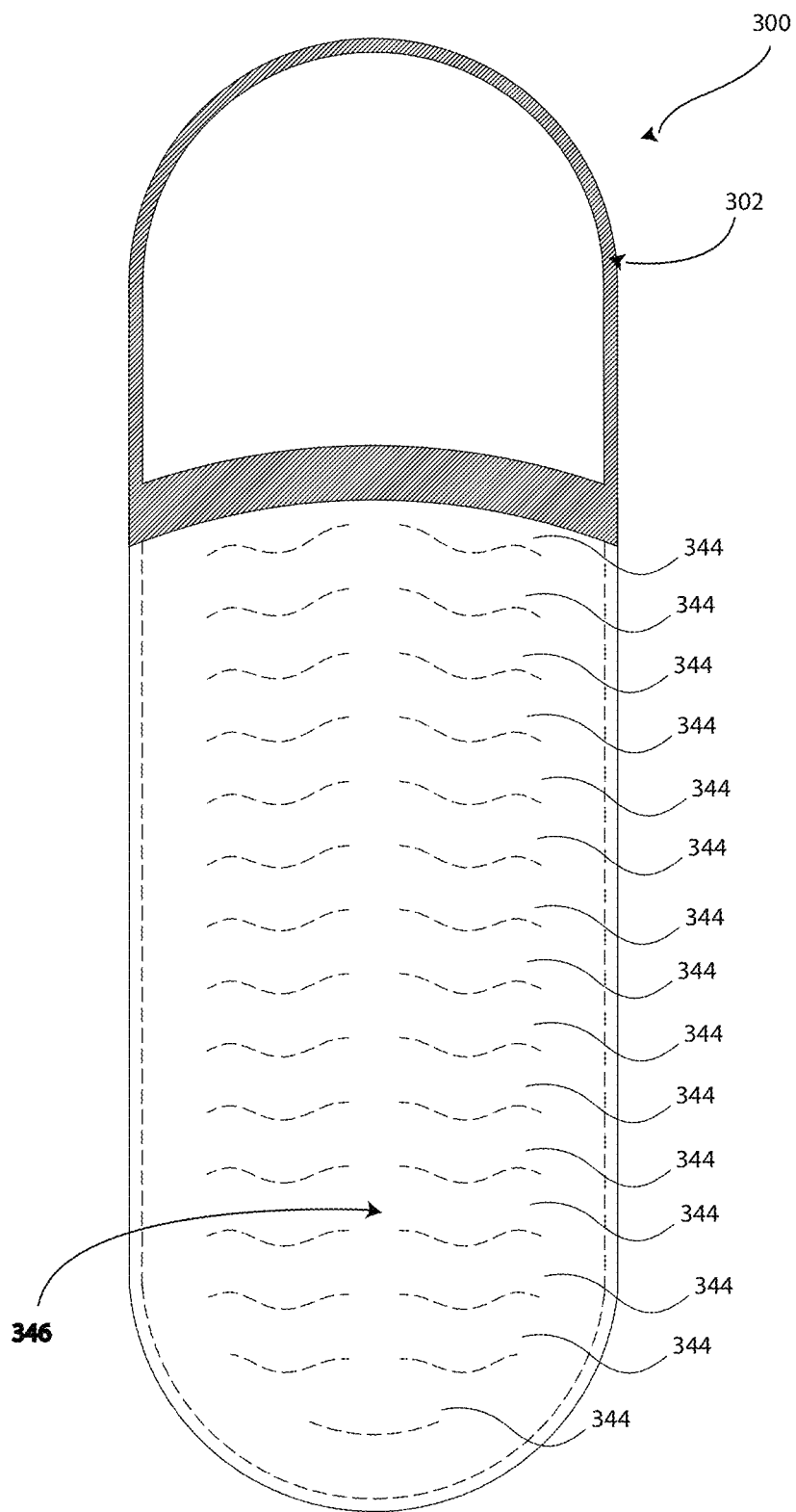
Figure 6J:
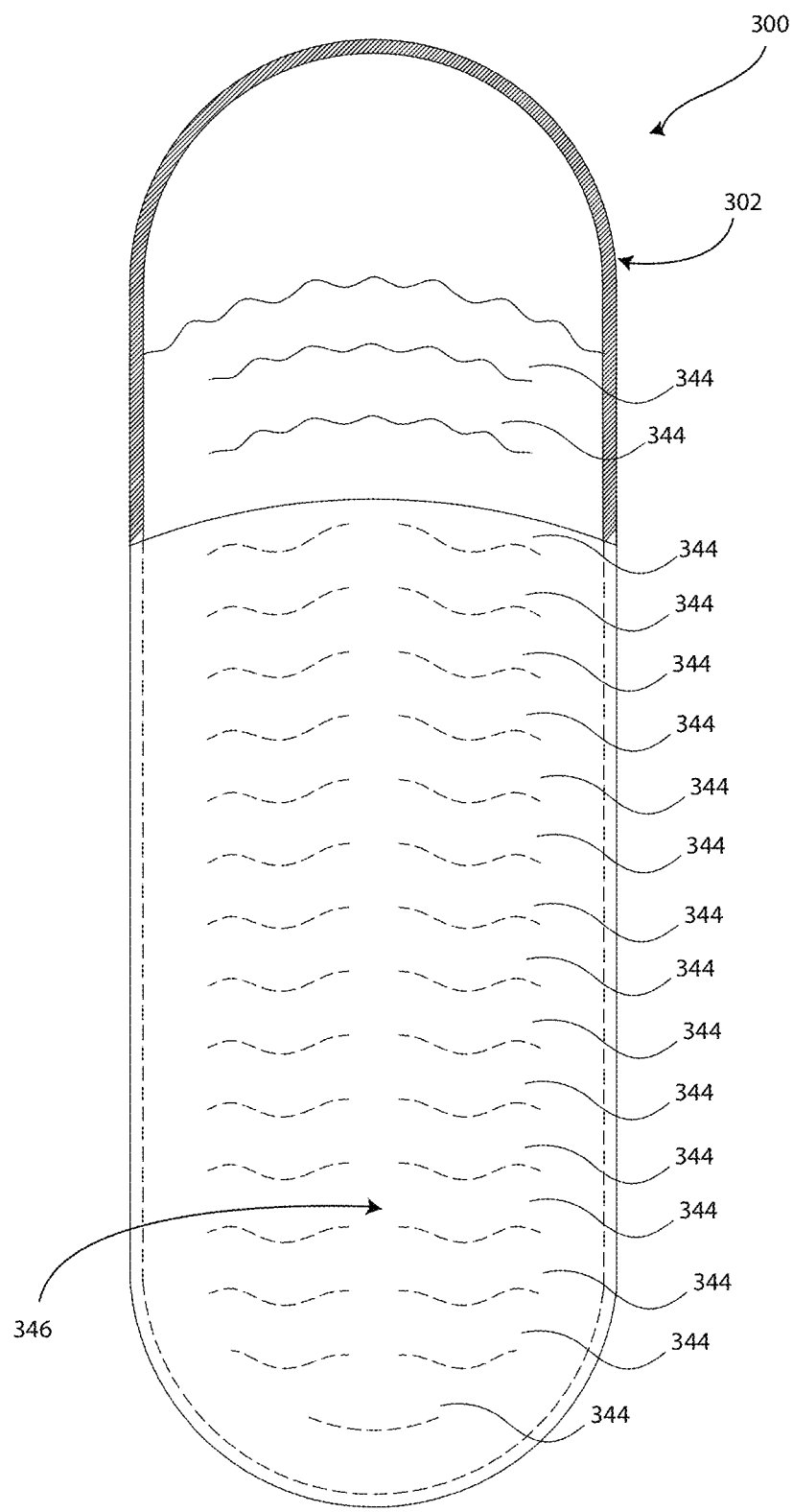

Referring to FIG. 6F, lower section 304 includes first lower section layer 330 and second lower section layer 332. First lower section layer 330 defines first lower section layer perimeter 334 and includes neck portion 336. Similarly, second lower section layer 332 defines second lower section layer perimeter 338 and includes neck portion 340. To construct lower section 304, first and second lower section layers 330, 332 are overlaid and joined, such as by sewing or stitching, to create seams 342. As shown in FIG. 6F, seams 342 generally have a sinusoidal shape, each forming an interface between two compartments 346. In an embodiment, seams 342 are stitched into first and second lower section layers 330, 332 such that lower section defines compartments 344, 346. Compartment 344 is generally adapted to be positionable along the spinal region of a user. Compartments 346 traverse the spinal region of a user, thereby providing support to the gluteus, lumbar and thoracic curves of a user.

Once seams 342 are formed, first lower section layer perimeter 334 and second lower section layer perimeter 338 are joined, such as through stitching or other suitable techniques. In an embodiment, the distal ends of neck portions 336, 340 are initially left unstitched, thereby providing an opening through which filler material, such as microbeads, can be inserted. Once the cavity between first and second lower section layers is sufficiently filled, the distal end of neck portions 336, 340 are joined. Cover 348 may also be attached to support pad 20.

Referring to FIG. 6G, upper section 302 and lower section 304 are joined to form support pad 20. Support pad 20 can then be attached to therapy pad 30 to form cushion 300. In an embodiment, channels 32 of therapy pad 30 overlay seams 342 of support layer 30. Cover 348 may then be wrapped about support pad 20 and therapy pad 30.

While support pad 30 generally provides dynamic, responsive support to a user on its own, therapy pad 20 utilizes channels 32 to provide unique pressure profiles for delivering therapeutic massage treatment. Specifically, the combination of the slope of channels 32 and the sine-wave pattern of channel interfaces 36 creates a specific pattern of pressure points that can be delivered to an individual in a customized sequence, thus delivering a dynamic pressure-therapy treatment designed to impart a therapeutic effect tailored to the needs of an individual. The sine-wave pattern of channel interfaces 36 permits pressure to be applied in a variable pattern across portions of the individual's body. Specifically, as shown in FIG. 7, the sinusoidal shape creates hills and valleys when adjacent channels are inflated—relatively high pressure occurring at the "hills" and relatively low pressure occurring at the valleys. As channels 36 are sequentially inflated and deflated, the hills and valleys are also inflated and deflated accordingly, thereby creating a massaging effect that follows the progression of the inflation and deflation of channels 36.

In an embodiment, therapy pad 30 includes a plurality of channels 32, which abut at channel interfaces. One skilled in the art will readily recognize, however, that therapy pad 30 can include any number of channels 32 and channel interfaces 36 without departing from the spirit or scope of the present invention. The number and size of channels 32 may be varied in accordance with the anatomical region of the individual targeted by massage system 10. Referring again to the pressure profiles depicted in FIGS. 9-13, for example, therapy pad 30 may be configured with sixteen (16) compartments adapted to provide massage therapy to the gluteal, lumbar, thoracic, and cervical curves of an individual. Therapy pad 30 may also be configured to provide massage therapy to various regions and areas, such as the shoulder region of an individual.

As indicated above, a feature of the present invention is the ability to deliver customized massage therapy to a user by selectively inflating and deflating channels 32-1 thru 32-16 of therapy pad 30. Controller unit 16 inflates and deflates channels by sequentially delivering a fluid, such as air, to any one of the channels 32-1 thru 32-16 and subsequently removing the fluid from the selected channels 32. Controller unit 16 generally includes at least a processor programmed to deliver customized pressure profiles to an individual. Controller unit 16 may also include mechanism to directing air into and out of channels of therapy pad 30, such as diverter 100 or diverter 200, as well actuators (not depicted) that are operably connected to diverter 100 or 200 and an air compressor. Alternatively, diverter 100 or 200 and the actuators may be provided as a separate unit or separate units. The diverter 100 or 200 includes at least one chamber, and generally a plurality of chambers, that are adapted to communicate to therapy pad 30 air that is supplied from an air source. The processor can be instructed to control the air compressor and diverter 100 or 200 so as to deliver a desired pressure-therapy treatment to an individual.

Referring to the embodiment shown in FIG. 14, diverter 100 generally includes housing 102, intake port 104, conduit 110, manifold 130, diverter disc 140, and biasing member 150. Housing 102 is adapted to support intake port 104 and manifold 130. Manifold 130 is adapted to support conduit 110. Diverter cap 140 is adapted to receive biasing member 150 and a portion of conduit 110, and to fit over one end of housing 102. Diverter cap 140 is generally seated about the portion of housing 102 covering manifold 130 by compression fit. Portions of controller unit 16, and specifically, the housing, will be positioned to maintain this compression fit. Diverter cap 140 may include a sensor and sensor transmitter (not depicted) adapted to communicate information concerning the rotation of diverter cap 140 with respect to manifold 130. In this embodiment, the sensor on diverter cap 140 may detect the proximity of a positioning element, such as a light-emitting diode (LED) or magnet embedded within diverter 100. A sensor transmitter can subsequently relay this information to the processor within controller unit 16 to create feedback input for the software program which is providing instructions for delivery of a pressure-therapy treatment. Based on this feedback input, controller unit 16 can monitor progress of the pressure-therapy treatment and take corrective measures as necessary.

Diverter 100 can be operably connected to cushion 12 with tubing 14. In one embodiment, controller unit 16 will include an integrated female connector 18 to facilitate the connection of tubing 14. A cooperating connector 19 will be attached to tubing 14, thus allowing for the convenient connection to diverter 100. One skilled in the art will recognize that tubing 14 and diverter 100 can be connected in any number of ways.

As depicted in FIG. 15, intake port 104 generally has nozzle 106 and defines interior intake port space 108. Intake port 104 can be operably connected to the source of the fluid to inflate the channels 36, such as an air compressor. In an embodiment, nozzle 106 is adapted to create a substantially air-tight fit with a tube connected to the air compressor. It is contemplated that the air compressor would have the capacity to generate between approximately 1 and 30 psi of pressure, and a flow rate of between 1 to 50 liters per minute. In one particular embodiment, the air compressor generates approximately 3 psi and induces a flow rate of approximately 10 liters per minute. Naturally, many other alternatives may be possible.

Referring to FIGS. 17-20A and 20B, conduit 110 defines interior conduit space 112 between conduit exit port 116 located at first end 114 of conduit 110 and conduit entry port 120 located at second end 118 of conduit 110. Annulus 126 may be formed at first end 114 of conduit 110 proximal conduit exit port 116. In an embodiment, annulus 126 presents a beveled circumferential edge. Conduit 110 also has elbow 122 that defines dimple 124 which is sized and configured to support a spring or biasing member 150. Conduit 110 may be made from any number of suitable materials, including aluminum, steel, and/or a polymer. In an embodiment, conduit 110 is made from a combination of steel and rubber components.

Referring to FIGS. 22-25, manifold 130 includes a plurality of chambers 132. In accordance with the embodiment depicted in FIG. 22, manifold 130 may include nine chambers 132a-132h. In an embodiment, each chamber 132 is adapted to conformingly receive first end 114 of conduit 110. In an alternative embodiment, a sensor may be embedded within one of chambers 132. Embedding a sensor in one of chambers 132 can be used for any number of purposes, such as, for example, identifying when conduit 110 occupies a home position.

Annulus 126 can create a substantially air-tight seal between first end 114 of conduit 110 and each of chambers 132. Manifold 130 generally has first chamber port 134 and second chamber port 136 and defines interior chamber space 138. Manifold 130 can be coupled to intake port 104 at first chamber port 134 and to conduit 110 at second chamber port 136 such that interior chamber space 138 is in fluid communication with interior intake port space 106 of intake port 104 and interior conduit space 112 of conduit 110. In this manner, fluid can be communicated from a fluid source, such as an air compressor, through intake port 104, into conduit 110 via interior chamber space 138, and from conduit 110 into one of chambers 132 depending upon the rotational positioning of conduit 110.

Conduit 110 can be selectively positioned in each chamber 132 of manifold 130 by rotating conduit 110. In an embodiment, conduit 110 is rotated by rotating diverter cap 140, which may be operably connected to actuator (not depicted). Referring to FIGS. 26-29, diverter cap 140 defines interior disc space 142, detent 144, and exhaust port 146. Interior disc space 142 is adapted to receive a portion of conduit 110 such that conduit 110 is positioned intermediate diverter cap 140 and manifold 130 when diverter cap 140 is positioned onto housing 102. Detent 144 is adapted to receive biasing member 150 such that biasing member 150 is positioned intermediate diverter cap 140 and conduit 110. Biasing member 150 can thereby exert a force upon conduit 110 in a direction that is generally parallel to the axis of rotation of conduit 110. In an embodiment, the biasing force exerted by biasing member 150 upon conduit 110 is sufficiently large so as to create a substantially air-tight seal between first end 114 of conduit 110 and chambers 132a-132h of manifold 130. As diverter cap 140 is further rotated, the beveled, or chamfered, edge of annulus 126 causes a retractive force opposing the biasing force exerted by biasing member 150 upon conduit 110. In an embodiment, the biasing force exerted by biasing member 150 upon conduit 110 is sufficiently small so as to be overcome by the retractive force resulting from rotation of conduit 110.

Conduit 110 sits snugly within interior disc space 142 of diverter cap 140. Diverter cap 140 may also include two holes adapted to receive a threaded member, such as a 10/30 threaded nut, and elbow 122 of conduit 110. Diverter cap 140 can snap onto elbow 122 of conduit 110 to hold conduit 110 in place with respect to diverter cap 140. Diverter cap 140 and conduit 110 can be fastened to the threaded member to further secure conduit 110 in place within interior disc space 142 of diverter cap 140. An electronic gear may be operably connected to the exterior face of diverter cap 140. Actuating the electronic gear thereby causes conduit 110 to rotate 360 degrees and pause and/or stop at any one of the chambers 132 of manifold 130. Such pause generally occurs for approximately 1-4 seconds, though one skilled in the art will recognize that the length of the pause can be outside of this range.

In one embodiment, diverter 100 may be assembled according to the following steps:

1) Conduit 100 is formed by fitting a rubber arm over a barbed end of elbow 122.
2) Biasing member 150 is placed in detent 144 of diverter cap 140.
3) The rubber arm fitted over the barbed end of elbow 122 is inserted inside diverter cap 140 and over biasing member 150.
4) Manifold 110 is positioned within manifold housing 102.
5) Diverter cap 140 is positioned with respect to manifold housing 102 by inserting conduit 110 into second chamber port 136.
6) Annulus 126 of conduit 110 is aligned with home chamber 132a of manifold 110. As conduit rotates in a clock-wise direction, annulus can correspondingly align with subsequent chambers 132b-132i.
7) Intake port 104 is coupled to conduit 110 at conduit exit port 116.
8) Intake port 104 is coupled to an air supply, such as an air compressor, with flexible tubing.
9) Tubes 50 of tubing 14 are independently connected to chambers 132 of manifold. In an embodiment, chambers 132 include a male connector for insertion into tubing 14 located opposite the point of insertion for conduit.
10) Diverter 100 is operably connected to processor and power source or power regulator of controller unit 16.
11) Diverter cap 140 is operably connect to a geared motor shaft such that conduit 110 is infinitely rotatable 360 degrees. First end 114 of conduit 110 drops down into each of chambers 132 of manifold 130 to create a seal and fill corresponding channel 32 of therapy pad 30. Exhaust port 146 allows channel 132 that was previously inflated with air to deflate by exhausting air through exhaust port 146.

In operation, the air compressor feeds air via flexible tubing into a straight-barbed fitting of intake port 104. Intake port 104 communicates air received from the air compressor through the flexible tubing and into conduit 110. The substantially interior chamber space 138 of manifold 130 and interior conduit space 112 of conduit 110 direct the flow of air through several directional changes so that the air can exit into one of chambers 132 of manifold 130. After exiting chamber 132, air flows through tube 50 of tubing 14 and into channel 32 of therapy pad 30.

Manifold 130 has a plurality of oval-shaped ports at the respective opening of channels 132 that are adapted to receive annulus 126 of conduit 110. Biasing member 150 applies constant pressure to first end 114 of conduit 114 such that as conduit 110 rotates 360 degrees, conduit 110 pauses at the port of each chamber 132 as directed by the software program of the processor of controller unit 16.

Once conduit 110 pauses, first end 114 of conduit 110 fits snugly into the oval chamfered port of one of chambers 132, thereby mitigating air leakage. The area surrounding the conduit-entry port of each conduit may include a circular boss to further mitigate air leakage as first end 114 of conduit exits the conduit-entry port.

As conduit 110 pauses at one of chambers 132 to inflate a channel 32 of therapy pad 30, the previously inflated channel 32 can deflate. Specifically, exhaust port 146 of diverter cap 140 is aligned with the previously inflated channel 32. Exhaust port 146 is thereby positioned in fluid communication with the previously inflated channel 132 via a chamber 132. The existence of a pressure differential between the previously inflated channel 132 and ambient air will cause the previously inflated channel 132 to deflate by exhausting air to the atmosphere.

After inflation of an air channel, the previously inflated channel of the massage pad will exhaust air through exhaust port 146. Exhaust port 146 will allow the previously inflated channel air to exhaust air to the atmosphere. For example, referring to FIG. 22, channel 32a (if connected to chamber 132a) will deflate as conduit 110 is rotated to align with chamber 132b and inflate channel 32b (if connected to chamber 132b). As conduit 110 rotates, channel 32b (if connected to chamber 132b) will deflate as conduit 110 is rotated to align with chamber 132c and inflate channel 32c (if connected to chamber 132c). Other channels 32c-32i will similarly inflate and deflate as conduit 110 rotates. In an embodiment, a sensor, such as a narrow-field vision light sensor, is positioned intermediate the first and last conduit-entry ports. The sensor can inform the processor of the position of conduit 110. Alternatively, a sensor can be placed within one of chambers 132, such as chamber 132 located in the 12 o'clock position. Software can then utilize this information in real-time to execute or revise instructions for delivering a prescribed pressure profile to individual. It will be noted that multiple diverters 100 can be operated in conjunction with one another to create several unique pressure profiles.

In alternative embodiments of massage system 10, diverter 200 may be used in place of diverter 200. As shown in FIGS. 31-39, diverter 200 is configured to divert air from a single intake port to one of a plurality of exit ports while exhausting air from the other exit ports to the environment. Specifically, diverter 200 includes manifold 202 and swivel valve 204. Diverter 200 is operably connected to actuator and may further include mounting bracket 208.

Referring to FIGS. 40-47, diverter 200 has main body 210, including wall 212. Main body 210 includes various channels adapted to permit the flow of air or other fluid. In an embodiment, main body 210 defines bore 214, intake port 216, conduits (also referred to as exit ports) 218, entry ports 220 and exhaust port 222. Main body 210 may also include guide channel 224 and pin 225. As shown in FIGS. 40-47, each exit port 218 is in fluid communication with a respective entry port 220. Each exit port 218 terminates at a terminal opening 234. In an embodiment, optical reader 231 is situated proximal terminal openings 234, such as, for example, at or near the 12 o'clock position. Entry ports 220 are generally circumferentially aligned along main body 210 and extend through the wall of main body 210. In an embodiment (not depicted in the figures), entry port 220 extends from exit port 218 to bore 214, but does not continue to the outer surface of manifold 202. Although FIGS. 40-47 depict embodiment of diverter 200 having either (8) exit ports 218 and entry ports 220, diverter 200 may contain any number of exit ports 218 and entry ports 220.

Bore 214 is adapted to receive swivel valve 204. Intake port 216 is adapted to receive tubing fitting 226, about which tubing 14 can be releasably secured. Entry ports 220 may be adapted to receive O-ring 228 and threaded member 230. In an embodiment, O-ring 228 and threaded member 230 create a substantially air-impermeable seal in the outermost opening of entry port 220 (i.e., where entry port 220 terminates on the outer surface of main body 210). Guide channel 224 is adapted to receive guide member 232 there through. As shown in FIGS. 30-34, exhaust port 222 may be adapted to received tubing fitting 226, or a valve assembly (not pictured) to control the outflow of air through exhaust port 222. As shown in FIGS. 35-39, exhaust port 222 may remain open. Pin 225 is adapted mate with complementary structure in tubing connector (not shown).

Wall 212 generally extends beyond main body 210, thereby forming recess 235 at terminal openings 234. Recess 235 is generally adapted to mate with a tubing connector such that a tube is attached to a channel opening 60 of therapy pad 30 and an exit port 218 of manifold 202. Wall 212 may define apertures 236 adapted to receive fastening members for securing manifold 202 to mounting bracket 208. Though shown to be rectangular, wall 212 may be any number of shapes.

Referring to FIGS. 48-53, swivel valve 204 includes disc 240 and shaft 242. Disc 240 is operably connected to actuator 206. Disc 240 generally includes structure adapted to mate with a rotatable portion of actuator 206. In an embodiment, disc 240 further includes sensor 244. As swivel valve 204 rotates, sensor 244 is able to utilize the position of optical reader 231 to gauge the relative position of swivel valve 204. Based on this information, controller unit 16 can monitor the position of swivel valve 204 with respect to manifold 202 and, if necessary, recalibrate or correct instructions for delivering a pressure profile to a user.

Figure 39:
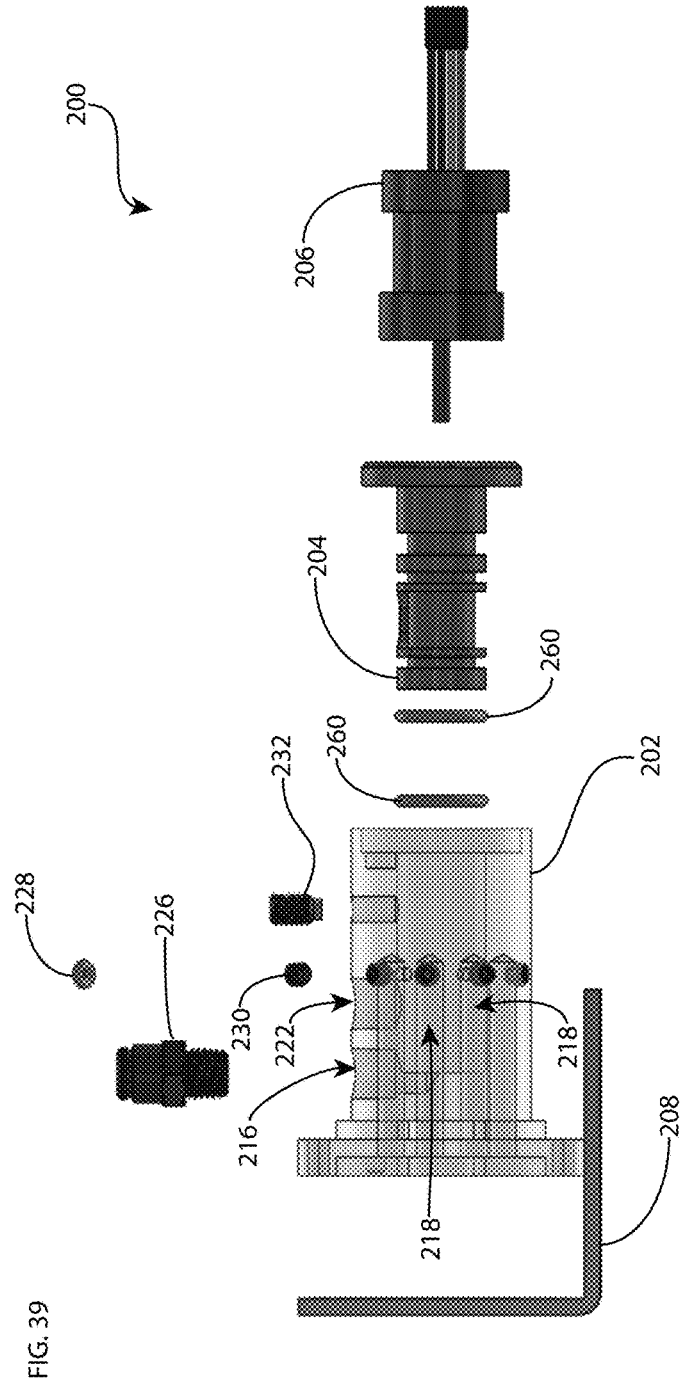
FIG. 39 is an exploded top view of the diverter of FIG. 35, depicted in phantom.
Figure 41:
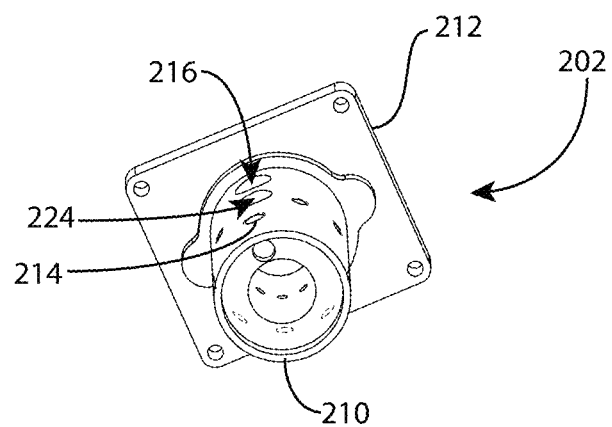
FIG. 41 is a perspective view of the manifold of FIG. 40.
Figure 42:
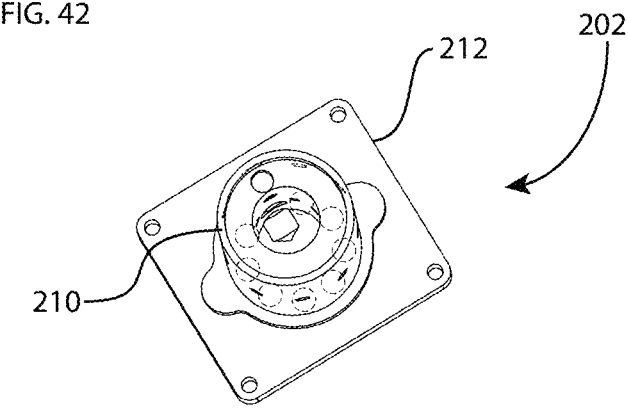
FIG. 42 is a perspective view of the manifold of FIG. 40.
Figure 52A:
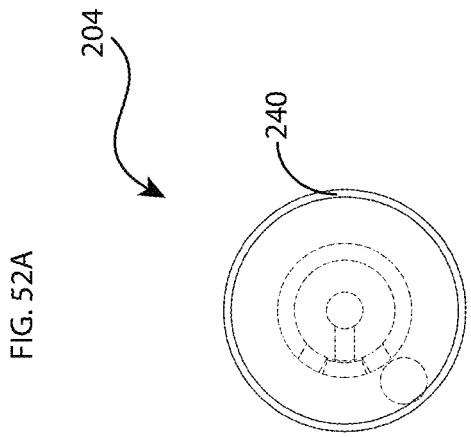
FIG. 52A is a front elevational view of the swivel value of FIG. 48.
Figure 51B:
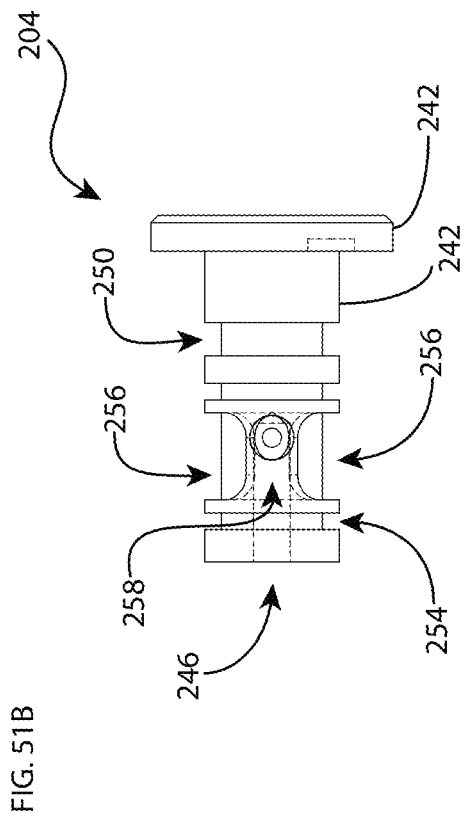
FIG. 51B is a side elevational view of the swivel value of FIG. 48.
Figure 53B:
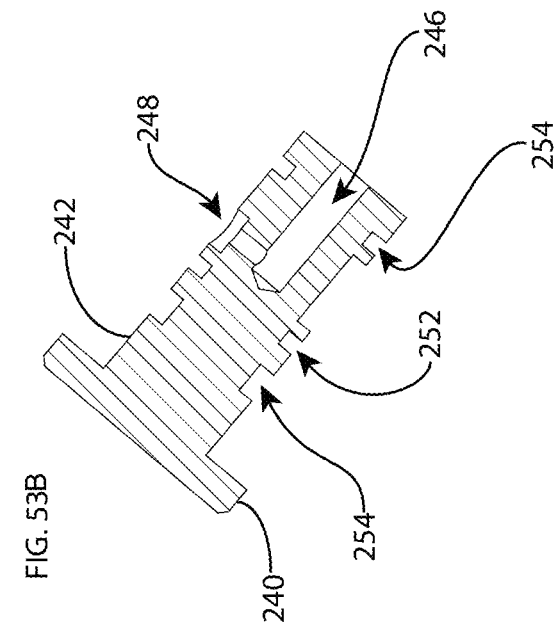
FIG. 53B is cross-sectional side elevational view of the swivel value of FIG. 48.
Figure 54:
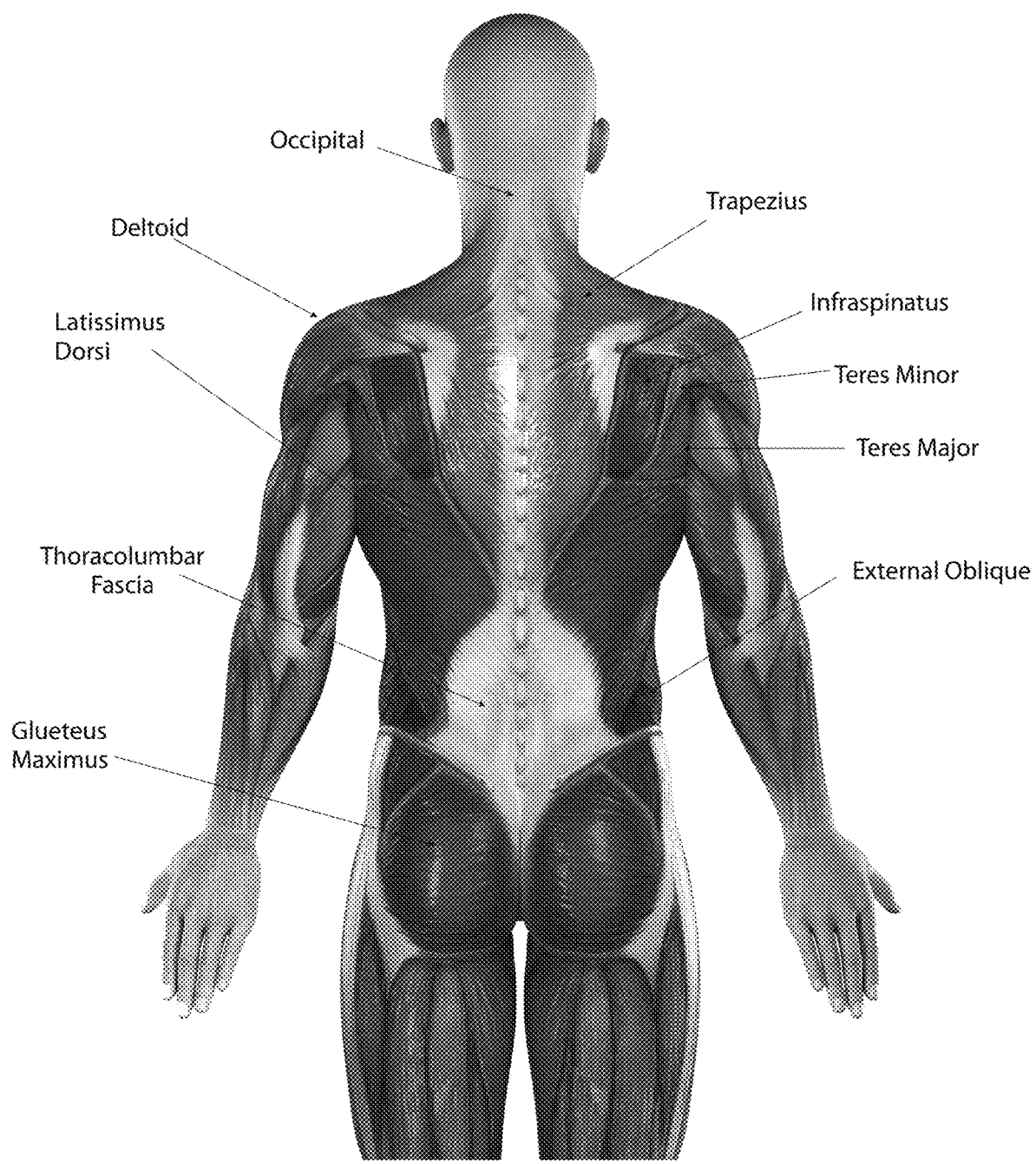
FIG. 54 is an illustration of the musculature of an individual.

As shown in FIG. 53, shaft 242 defines bore 246 and exit port 248. Exit port 248 is in fluid communication with bore 246. The opening of bore 246 is adapted to form a substantially air-impermeable seal with main body 210 of manifold 202 where intake port 216 terminates in opening 262. Shaft 242 includes furrows 250, 252, 254 and 256. Furrows 250, 252 and 254 extend circumferentially around shaft 242, whereas furrow 256 extends partially around shaft 242. Between ends of furrow 256 is plateau 258. As shown in FIGS. 50, 51A and 51B, exit port 248 terminates in an opening in plateau 258. In an embodiment, exit port 248 may be fitted with O-ring 228. Furrow 250 is adapted to receive an end portion of guide member 232, thereby substantially securing shaft 242 of swivel valve 204 within bore 214 of manifold 202. As shown in FIG. 39, furrows 252, 254 may be adapted to receive O-rings 260. O-rings 260 provide a substantially air-impermeable seal around furrow 256. O-rings 260 may also enhance the frictional fit between manifold 202 and swivel valve 204.

In operation, diverter 200, like diverter 100, can be utilized to selectively inflate and deflate channels 32 of therapy pad 30. Specifically, air can be delivered from an air source through tubing fitting 226 into intake port 216. The air then travels through intake port 216 until exiting main body 210 of manifold 202 through opening 210. The air subsequently enters swivel valve 204 through bore 246 and continues to exit port 248. Swivel valve 204 will generally be positioned within bore 214 of manifold such that exit port 248 of swivel valve 204 is aligned with entry port 220 of manifold 202. Air is thereby diverted from swivel valve 204 to entry port 220 of manifold 202 and through conduit, or exit port, 222. At or proximal to terminal opening 234, the air enter a tubing that is coupled to diverter 200 at recess 235. As air continuously flows through the system diverter, the channel 32 of therapy pad 30 that is couple to the tubing inflates.

In accordance with the instructions sent by controller unit 16, actuator 206 causes disc 240 to rotate. Once exit port 248 of swivel valve 204 is aligned with entry port 218 of manifold 202, another channel 32 can be inflated as previously described. A feature and advantage of diverter 200 of the present invention is that the previously inflated channel 32 can be substantially simultaneously deflated. Specifically, as swivel valve 204 rotates, the previously engaged entry port 220 of manifold 202 is disengaged from exit port 248 of swivel valve 204 and re-positioned into fluid communication with furrow 256. Due to the pressure differential between the previously inflated channel 32 and ambient, air exits channel 32, flowing through the respective tubing, entering manifold 202 at terminal opening 35 and traveling through exit port 218 toward entry port 220. Rather than enter exit port 248 of swivel valve 204, however, the air enters furrow 256 and ultimately exits manifold diverter 200 through exhaust port 222 in manifold 202. A further feature and advantage of the present invention is that the weight of a user on therapy pad 30 will increase the pressure differential between the previously inflated channel and air, thereby facilitating deflation of the channel 32.

Figure 60:
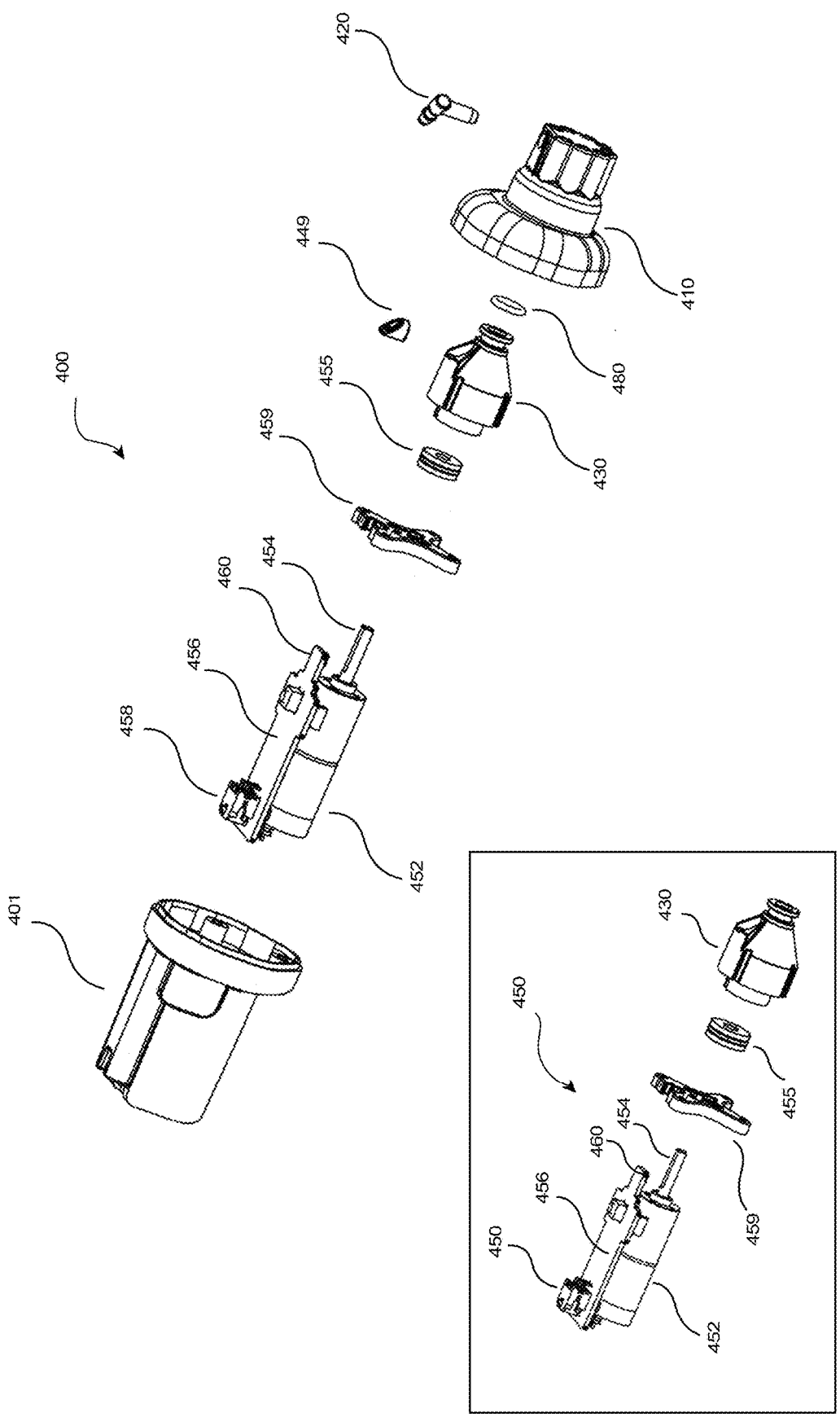
FIG. 60 is an exploded view of the various components making up the valve assembly.
Figure 60A:
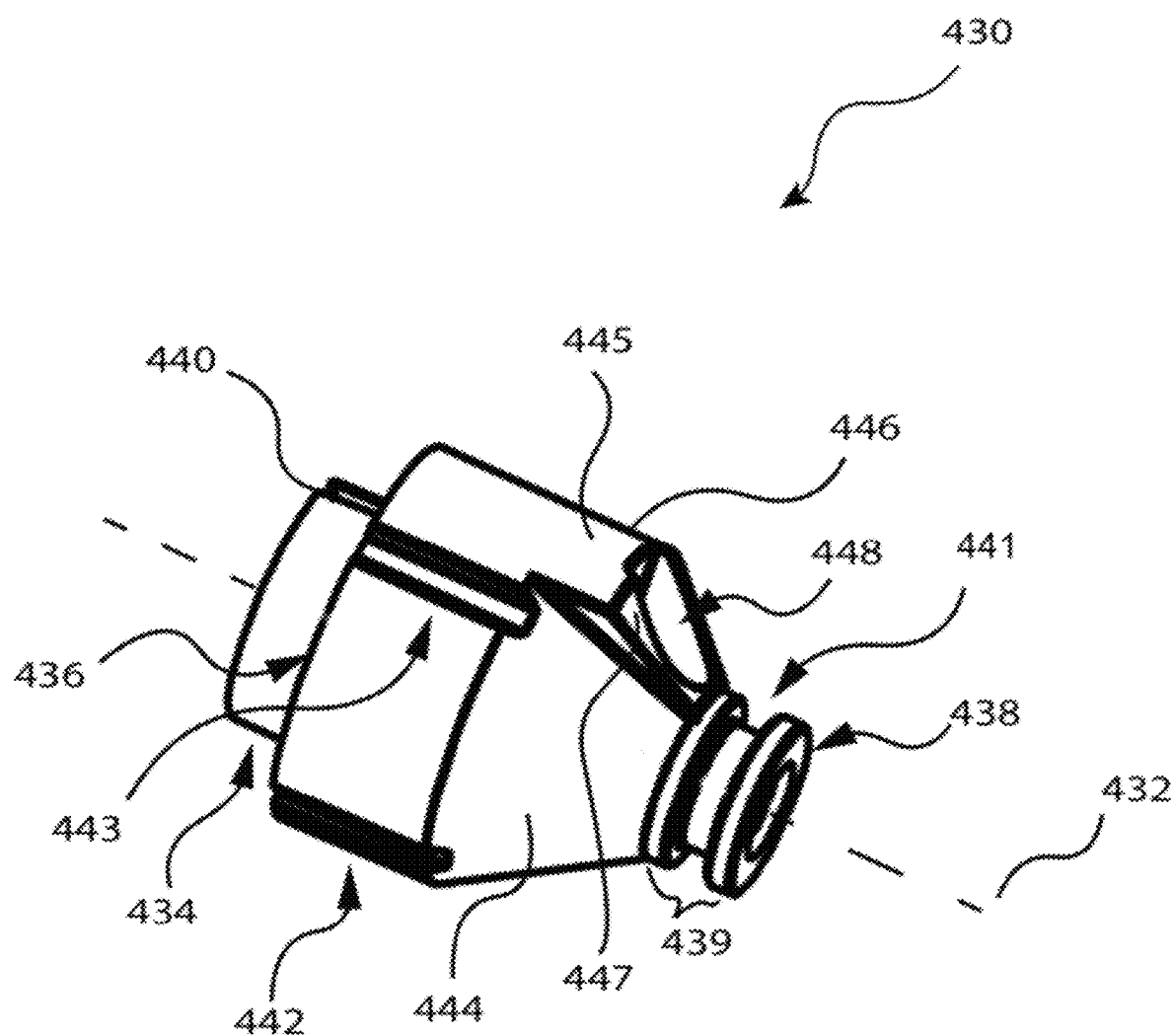
FIG. 60A is a view of a swivel valve alone.

Turning now to FIGS. 56-64B an alternative embodiment of a diverter or valve assembly 400 and an alternative therapy system 510 are illustrated. As will be appreciated, valve assembly 400 is intended to provide capabilities similar to diverter 100, illustrated in FIGS. 16-29, and diverter 200 illustrated in FIGS. 30-53. Based upon the discussion below, it will be clear that valve assembly 400 helps to make alternative therapy system 510 possible. As best illustrated in FIGS. 60 & 60A, and as further described below, valve assembly 400 has several components which are uniquely configured and oriented to provide control of air flow. More specifically, valve assembly 400 includes a housing 401 cooperating with a manifold 410. When examined in further detail, manifold 410 includes an input fitting 420 and a plurality of output ports 411-418 which will all cooperate to help direct airflow. A swivel valve 430 and a cooperating electronics assembly 450 are contained within manifold 410 and housing 401. As will be discussed in further detail below, swivel valve 430 cooperates with various structures of manifold 410 to appropriately direct air flow from input fitting 420 to a selected one of output ports 411-418. In a similar manner, electronics assembly 450 includes several components to control operation of swivel valve 430, and thus produce a desired outcome.

As illustrated in the various figures, and specifically in FIGS. 60 and 60A, swivel valve 430 is uniquely configured and structured to control air flow in a desired manner based upon appropriate positioning within manifold 410. The operations of electronics assembly 450 and its various components will control this positioning, thus enabling the desired control of airflow.

Again, electronics assembly 450 includes various components to accommodate operation, including a motor 452 which is specifically designed to drive a drive shaft 454. As illustrated, motor 452 is mounted to a motor bracket 459 in order to maintain positioning and to provide support. Motor bracket 459 also helps to support and align electronics board 456. Drive shaft 454 can take on many forms, as needed, so it will be able to provide rotational force to swivel valve 430. As will be appreciated, swivel valve 430 is physically connected to drive shaft 454 thus causing simultaneous movement of both components. Electronics assembly 450 further includes an electronics board 456, a control signal receptacle 458 (e.g. a connector jack, or some other similar electronics connection mechanism), and a position sensor 460. The operation of motor 452 is controlled by other components contained on the electronics board 456 (e.g. a processor) to provide appropriate positioning of swivel valve 430. Also illustrated in FIG. 60, a thrust washer 455 is positioned between swivel valve 430 a motor bracket 459 and electronics board 456, in order to avoid undesired friction and to further accommodate operation.

In order to accurately control positioning, a recess or groove 440 on a back side of swivel valve 430 allows a sensor 460 from the electronics board 456 to locate a swivel valve home position. Referring to FIG. 60A a close up view of swivel valve 430 is shown. As seen, swivel valve 430 is generally cylindrical at one end and is intended to be rotated around a central axis 432. Further, swivel valve 430 also includes an outer cylindrical edge 434 at a proximal end 436. A distal end 438 also includes a cylindrical structure, however this includes a recess or groove 441. As will be further discussed below, recess or grove 441 is specifically designed and configured to hold and accommodate an O-ring 480, so that an appropriate seal can be created. Grooves 443 and 442 are positioned on each side of the swivel valve 430 to allow exhaust to escape via a Cone like structure 444. These various grooves and related O-ring are discussed further below in relation to FIGS. 63A-63C.

Figure 61:
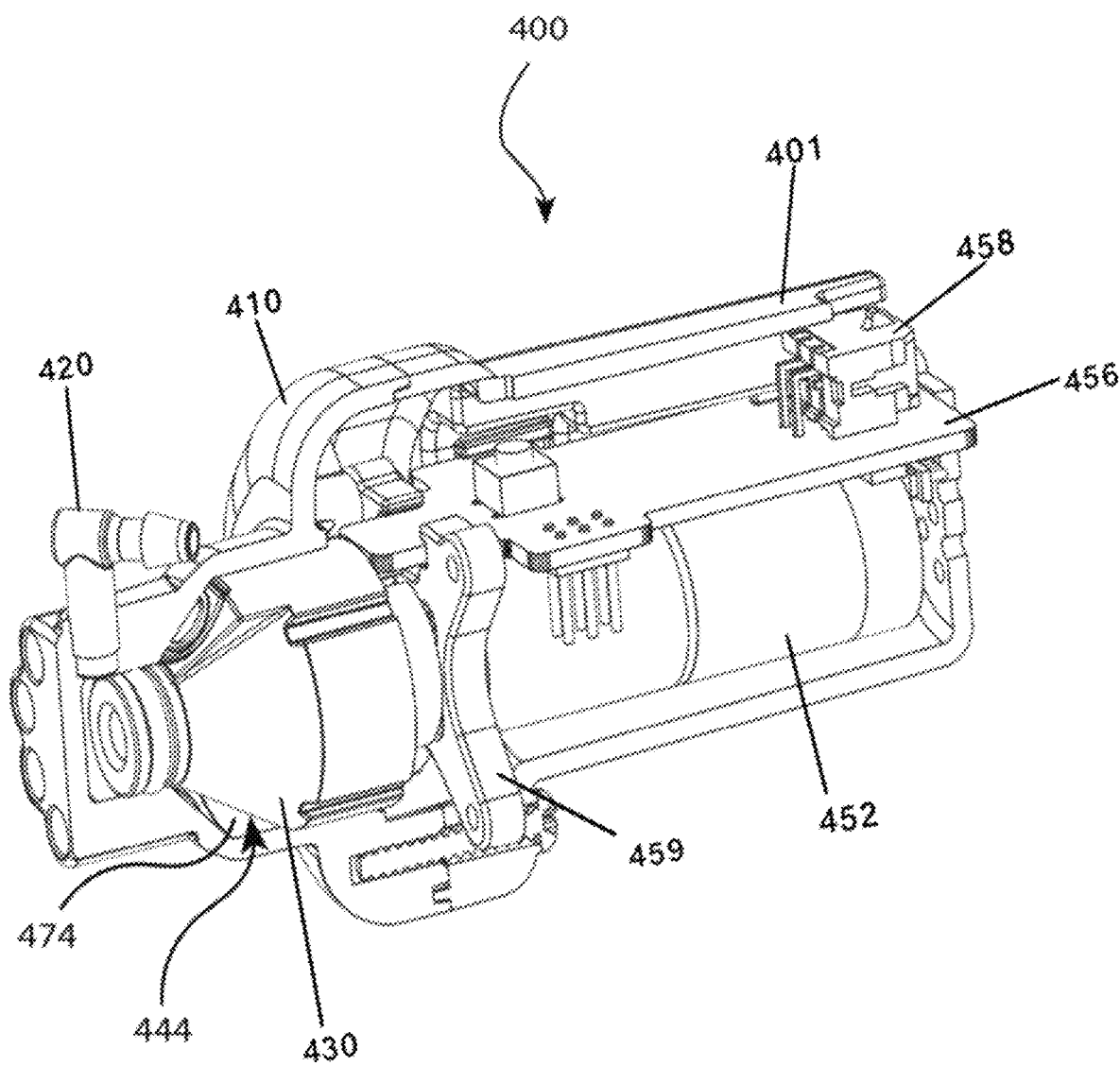
FIG. 61 is a cut-away view of the valve assembly.
Figure 62:
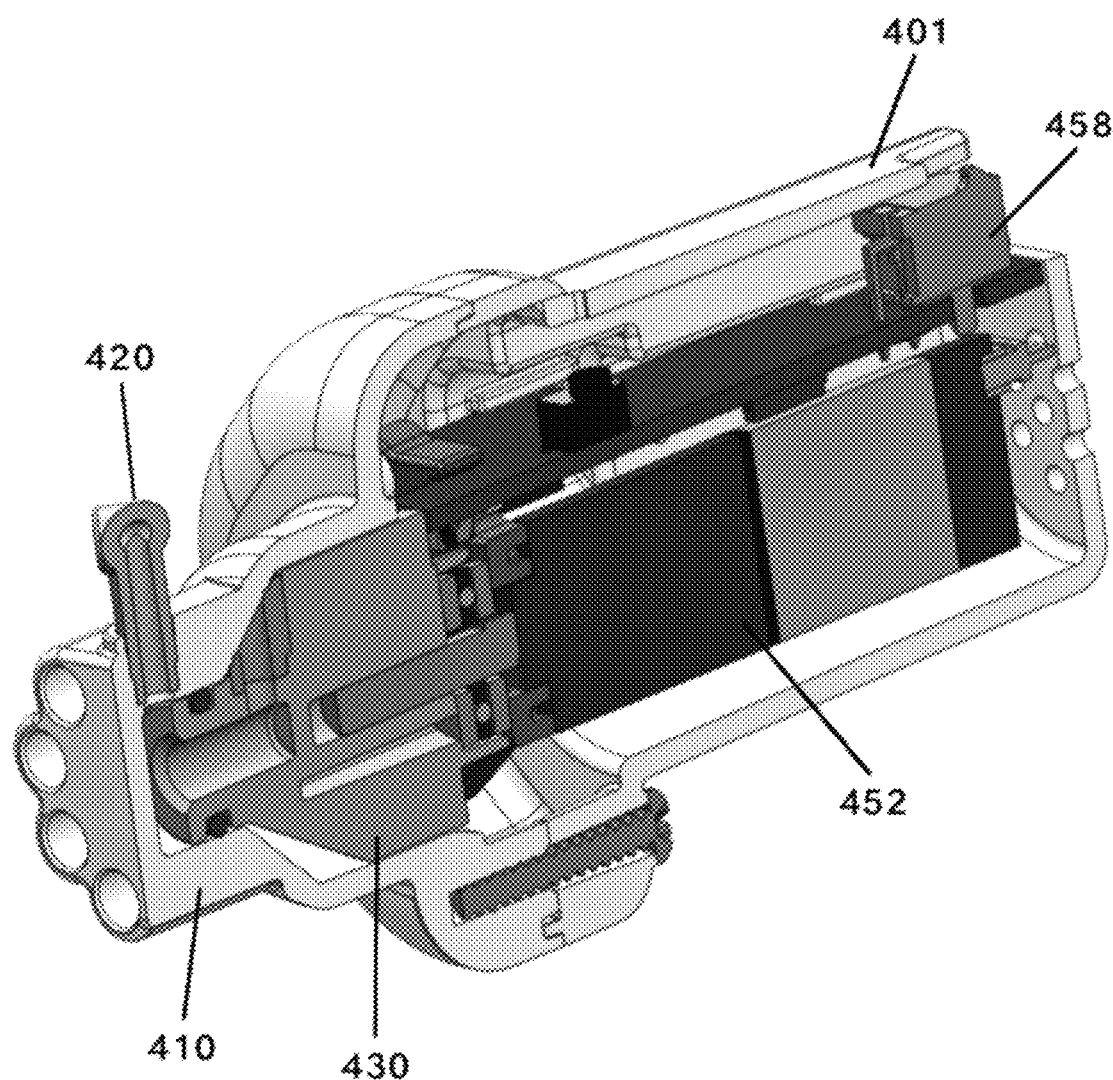
FIG. 62 is a cross sectional view of a swivel valve used within the valve assembly.

Turning now to FIGS. 61 and 62, further details regarding the cooperation of elements can be seen. More specifically, FIG. 61 is a cut-away view of diverter 400, with portions of housing 401 and manifold 410 being removed to illustrate the internal components thereof. As shown, motor bracket 459 is coupled to housing 401 and helps to maintain alignment of all related components. Circuit board 456 is also contained within housing 401, at a position immediately above motor 452. Positioned within manifold 410 is swivel valve 430. As will be discussed in further detail below, swivel valve 430 is specifically configured and designed to appropriately direct airflow, depending upon operation of motor 452. As better shown in FIG. 62, and as discussed above, motor 452 and swivel valve 430 are coupled to one another via drive shaft 454, thus, driving motor 452 to rotate drive shaft 454 will also cause related motion of swivel valve 430.

Figure 63A:
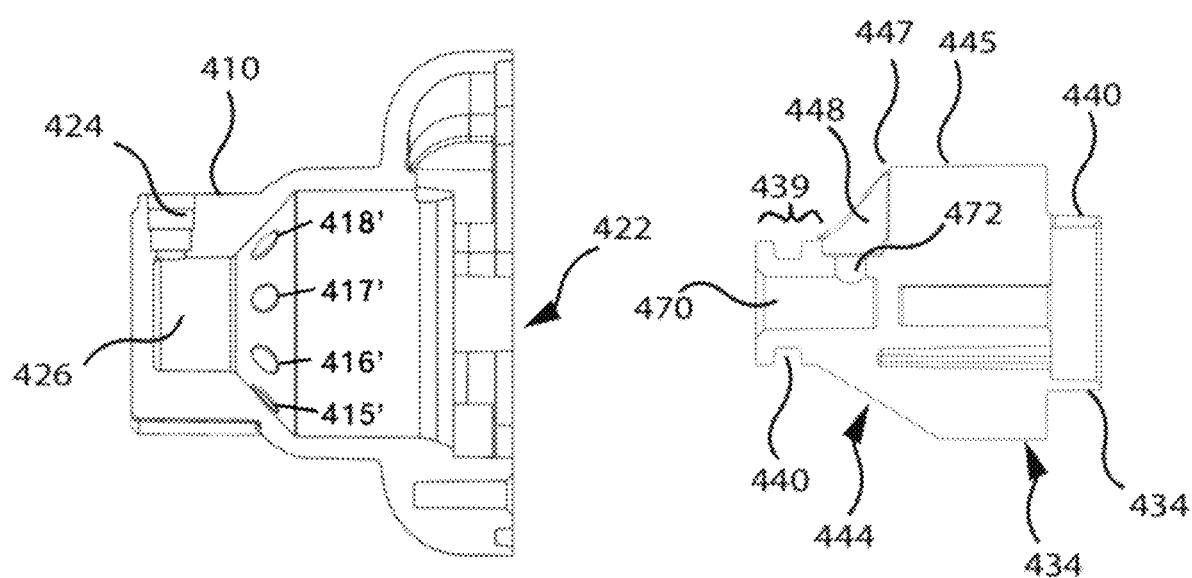
FIG. 63A-63C are various exploded cross sectional views of the swivel valve and manifold.
Figure 63B:
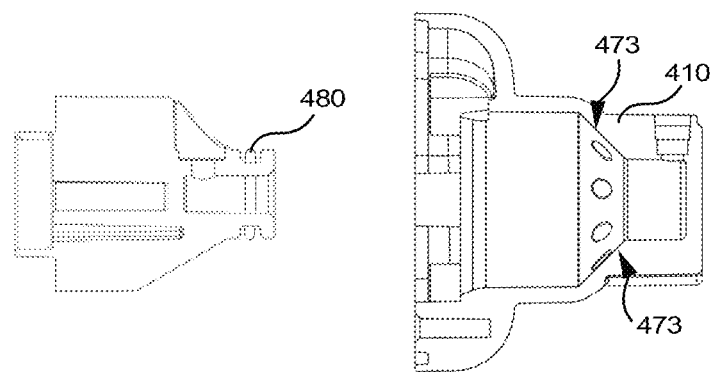

Referring now to FIGS. 63A and 63B, an outer cylindrical surface 434 of swivel valve 430 is configured to house a recess sensor window indicator 440. As will be appreciated by those skilled in the art, when assembled within housing 401, recess sensor indicator 440 (as positioned and coupled to outer cylindrical surface 434) will be oriented so that position sensor 460 will be able to read and sense the existence/position thereof. In operation, the recess sensor window indicator 440 will cooperate with position sensors 460, thus allowing the control electronics to precisely position and move swivel valve 430 as desired.

As also shown in FIGS. 60A and 63A, swivel valve 430 includes a cone like surface 444, which creates a natural transition from the cylindrical surface 434 to cylindrical structure 439 at distal end 438. Cone like structure 444 is configured to have a particular slope and angle which is uniquely configured to cooperate with manifold 410. As also illustrated, a portion of swivel valve 430 includes a ridge 446 which is specifically designed and configured to accommodate an aperture 448. Ridge 446 has a cylindrical segment 445 and a sloped segment 447, with aperture 448 housed within slope segment 447. As can be seen, the angle or slope of slope section 447 is different than the related angle or slope of cone like surface 444. Ridge 446 is specifically designed to interact and cooperate with an inner surface of manifold 410 to appropriately control airflow. More specifically, by positioning aperture 448 on the sloped section, cooperative coupling with an appropriate output port (i.e. one of output ports 411-418) can be achieved.

Figure 63C:
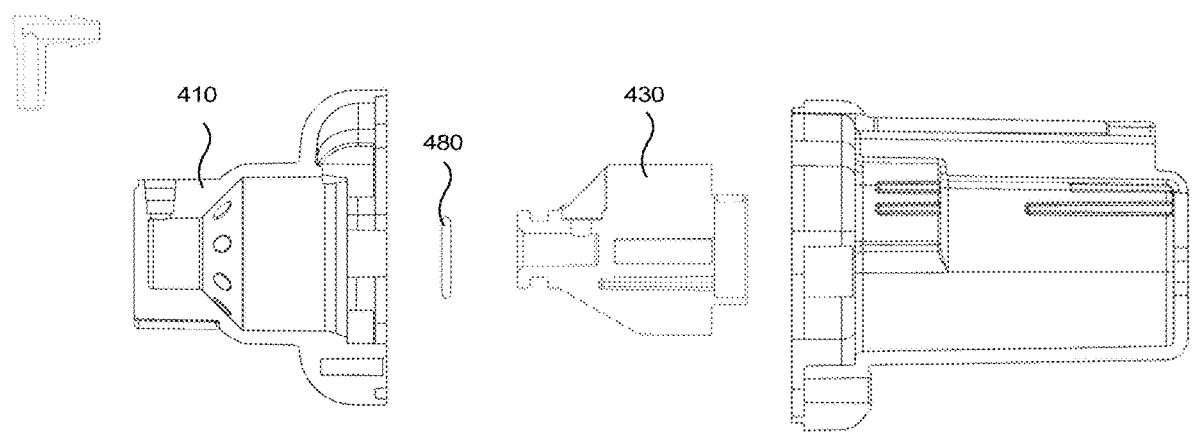

Referring now to FIGS. 63A-63C, various cross-sectional illustrations of swivel valve 430 and manifold 410 are presented. As mentioned, swivel valve 430 is designed and intended to be inserted into a recess 422 within manifold 410. The specific surfaces and configuration of recess 422 is designed to support several openings or air pathways so that airflow can be appropriately directed. As will also be seen, recess 422 is in fluid communication with manifold input 424. Although not shown, input fitting 420 is intended to be inserted into input 424, so that various fluid connections or airlines can be attached. As can be further discussed, input 424 allows airflow into an initial 426 within manifold 410. In operation, air signals present within initial chamber 426 will then be communicated to an input opening 470 within swivel valve 430. Input opening 470 is a central cylindrical channel, which then is in fluid communication with a transition opening 472. Transition opening 472 will carry any air signals present to aperture 448.

In summary, air signals presented to manifold input 424 are then fluidly communicated to aperture 448 in swivel valve 430. As further illustrated, swivel valve 430 is specifically designed to accommodate an O-ring and a face seal. Referring to FIG. 63C, which is an exploded cross sectional view of valve assembly 400, O-ring 480 can be seen. As better shown in FIG. 63B, O-ring 480 is shown housed within groove 440, thus providing a seal when swivel valve 430 is contained within manifold 410.

As partially illustrated in FIGS. 63A-63C, recess 422 of manifold 410 will include multiple openings 411'-418'. As can be appreciated, these openings are simply an opposite end of output ports 411-418 illustrated in FIG. 58. As should also be apparent, any air signals presented at openings 411'-418' will then be communicated via the open chamber to output ports 411-418 respectively.

As previously discussed, swivel valve 430 includes a cone like surface 444, which is configured to have a particular slope or angle relative to a central axis 432. As can be seen in FIG. 61, cone like surface 444 is specifically configured and designed to provide a gap 474 when swivel valve 430 is positioned and mounted within manifold 410. As also previously discussed, swivel valve 430 includes a ridge 446 having a slope portion 447 which is also configured at a particular slope or angle with respect to the central axis 432. In this case, slope portion 447 is specifically designed and configured to be immediately adjacent a related inner wall 473 within manifold 410. The design of these two portions (inner wall 473 and sloped portion 447), will thus allow for positioning of aperture 448 immediately adjacent any one of the inlet openings 411'-418'. Consequently, by appropriately positioning swivel valve 430 in a desired orientation, air signals can be transferred from inlet 424 to a selected one of the output ports 411-418. As will also be appreciated, appropriate positioning is achieved by control of motor 452, in conjunction with the related sensor 460 and position indicators 462. It is noted that the orientation of slope portion 447, in relation to the related inner wall of manifold 410, also accommodates the appropriate sealing between aperture 448 and the related output port (e.g. one of output ports 411-418). By simply holding swivel valve 430 in position within manifold 410 will cause pressure to be applied and appropriate sealing to occur. In some embodiments, a spring can be used between swivel valve 430 and electronics assembly 450, so that desired levels of pressure are maintained.

Figure 64A:
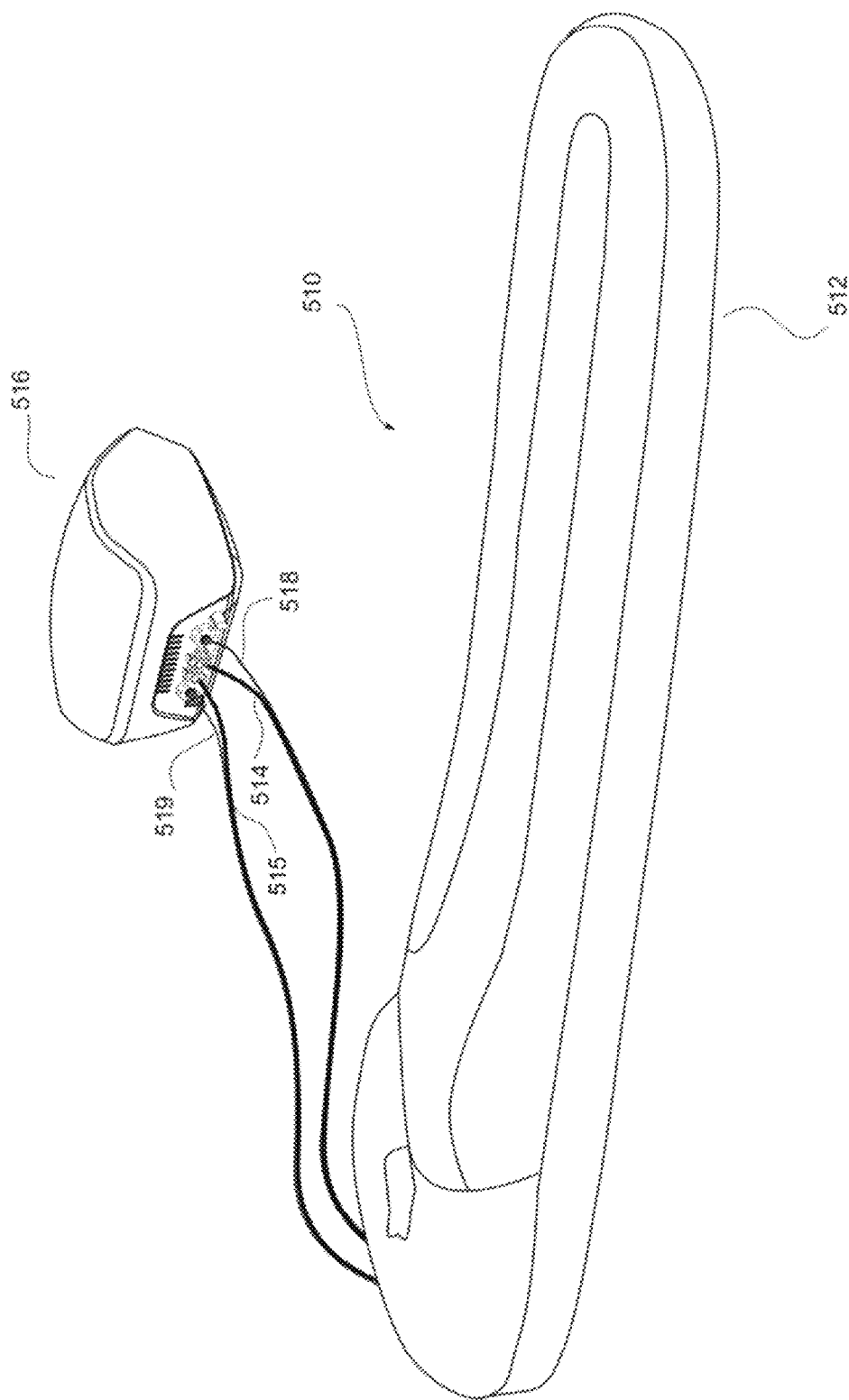
FIGS. 64A and 64B are views of an alternative therapy device made possible by using the valve assembly.
Figure 64B:
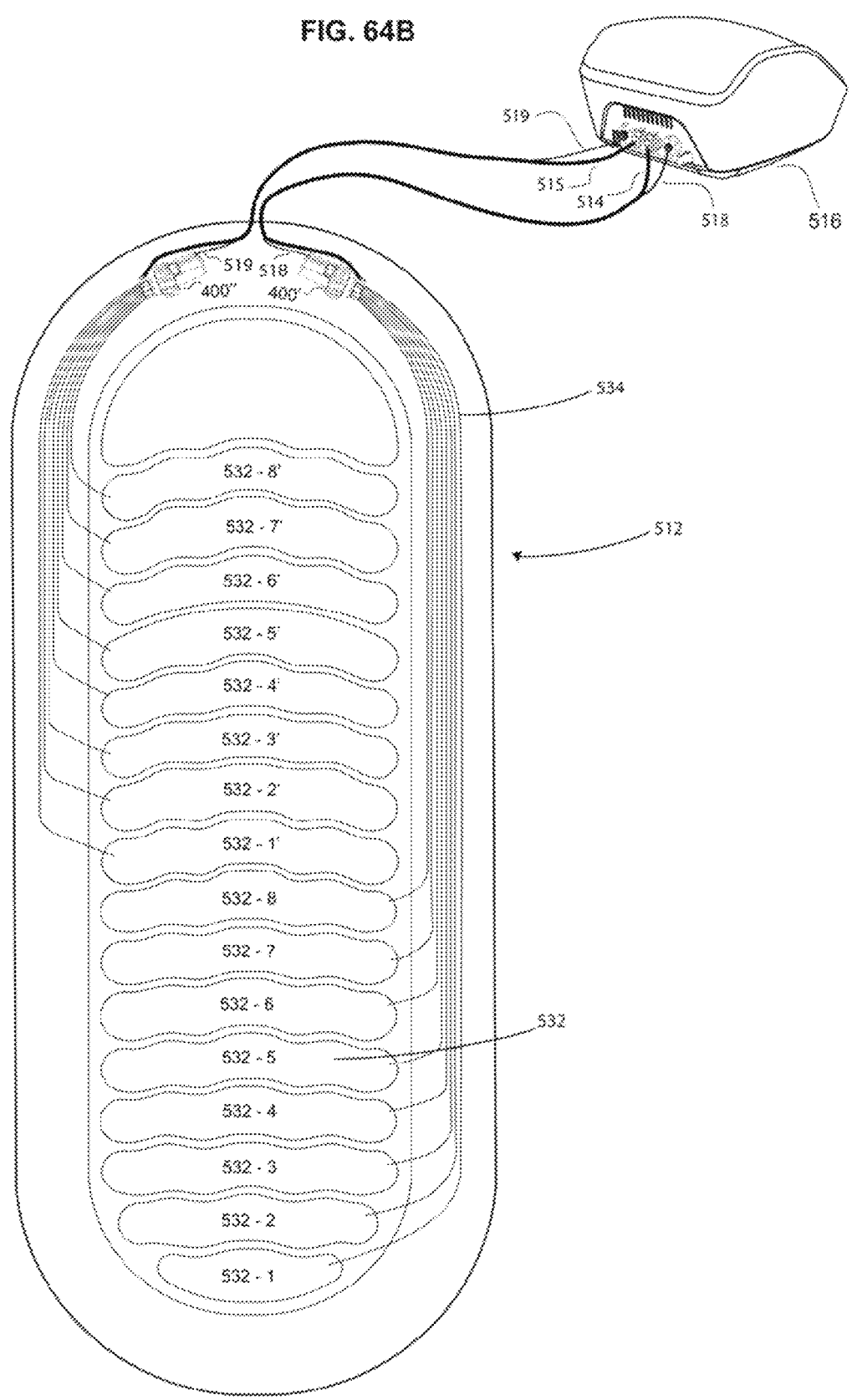

As will be further appreciated by those skilled in the art, the compact nature of diverter or valve assembly 400 will allow for more efficient operation of the therapy system. As generally illustrated in FIGS. 64A and 64B, an alternative therapy device or system 510 is made possible by using valve assembly 400. Specifically, therapy device 510 now includes an alternative controller unit 516, which includes a controller or processor, and an air pump having a related air signal output (not shown) which is connected to a first air tube 514 and a second air tube 515. Controller unit 516 also has a first control line 518 and a second control line 519 (i.e a pair of wire cable/tubing assemblies which each can be connected to a related diverter 400). First air tube 514 and first control line 518 are provided to mattress 512, so that desired therapy can be applied via a first diverter 400'. Similarly, second air tube 515 and second control line 519 are coupled to second diverter or valve assembly 400". As best illustrated in FIG. 64B, a first valve assembly 400 ' and a second valve assembly 400" are housed within mattress 512, so that a more compact therapy system 510 can be achieved. As shown, first valve assembly 400' receives control signals from controller unit 516 on first control line 518. Similarly, second valve assembly 400" receives control signals from controller unit 516 on second control line 519.

As also shown in FIGS. 64A and 64B, air tubes 514 and 515 carry air pressure signals from controller unit 516 to first valve assembly 400' and second valve assembly 400", respectively. To provide further efficiency and prevent unwanted back-flow, controller unit 516 has a first one-way valve 546 (not shown) and a second one-way valve 548 (not shown). Both first one-way valve 546 and second one-way valve 548 will ensure that air pressure signals are not sent back to controller 516. Further, the output of each valve assembly is coupled (via internal tubing) to a plurality of related fluid tubing 534 to multiple air channels 532-1 to 532-8 and 532-1' to 532-8', all contained within mattress 512. Since all of the above referenced components are contained within mattress 512 an efficient and relatively compact therapy system can be achieved.

As mentioned above, valve assembly 400 (and valve assemblies 400' and 400") includes connector 458 which accommodates an electrical connection to other components. As also mentioned, in one embodiment connector 458 is easily connected to using a related jack plug and appropriate control wires. Electronics board 456 will include components necessary to receive signals via connector 458, maintain any desired control programs or routines, and appropriately control motor 452. In one embodiment it is contemplated that motor 452 is a brushless DC motor, which is easily controlled by electronics board 456. Further, this control is efficiently enabled utilizing position sensor 460, in cooperation with the various position indicators 462 coupled to swivel valve 430. In this configuration, communications and power are easily supplied to valve assembly 400 via the above mentioned control wire.

Again, to avoid back flow, and ensure air flow in the desired direction, first one way valve 546 (not shown) and second one way valve 548 (not shown) are mounted to or housed within the controller unit 516 and ensure air flow towards first valve assembly 400' and second valve assembly 400", but do not allow air flow signals to be transmitted back to controller unit 516. Based upon the configuration and cooperation of components discussed above, operation of first valve assembly 400' and second valve assembly 400" will allow appropriate air flow signals to be transmitted to the various chambers 532-1 to 532-8 and 532-1' to 532-8' within mattress 512. As generally discussed above, the appropriate configuration and connection of tubing and the appropriate control of both first valve assembly 400' and second valve assembly 400" will cause appropriate inflation, using desired patterns or methodologies.

As a further alternative embodiment, the pressure profiles implemented by controller unit 516 can be customized based on the therapeutic needs of individuals using massage device 510. In particular, when a user engages mattress 512, such as by lying prone thereon, each pressure profile provides a pressure-therapy treatment program. As discussed above in relation to FIGS. 9-13, an individual may require therapeutic massage treatment to be delivered in many different ways. For example, therapy may be provided to the individual's external oblique and gluteus maximus muscles and theracolumbar fascia. Alternatively, an individual may require therapeutic massage treatment to be continuous from the individual's lumbar curve to the individual's cervical curve. An individual may also require the therapeutic massage treatment to be characterized by relatively lower pressure and applied in higher frequency to muscle groups proximal the thoracic curve than the pressure and frequency of massage treatment applied to muscle groups proximal the cervical and lumbar curves.

One skilled in the art will readily recognize that any number of unique pressure-therapy treatment programs can be developed to treat conditions and other ailments for which therapeutic massages can provide treatment or relief. Generally, such pressure-therapy treatments will progress in a direction toward the cervical curve from the gluteus curve. Processor of controller unit 16 or 516 can be programmed to treat an individual's gluteus, back, shoulders, and next by repeating a cycle of inflating channels 32-1 thru 32-16 (as shown in FIG. 9-13) or 532-1 thru 532-8 and 532-1' through 532-8' (as shown FIG. 64B) in a predetermined manner. Each of these channels may be operably connected to a separate chamber 132 or 532. Alternatively, multiple channels may be operably connected to a single chamber 132 or 532. The pressure profile is created by first inflating channel 32-1, then deflating channel 32-1 while inflating channel 32-2, then deflating channel 32-2 while deflating channel 32-3, and continuing this progression until channel 32-16 is inflate.

Figure 10:
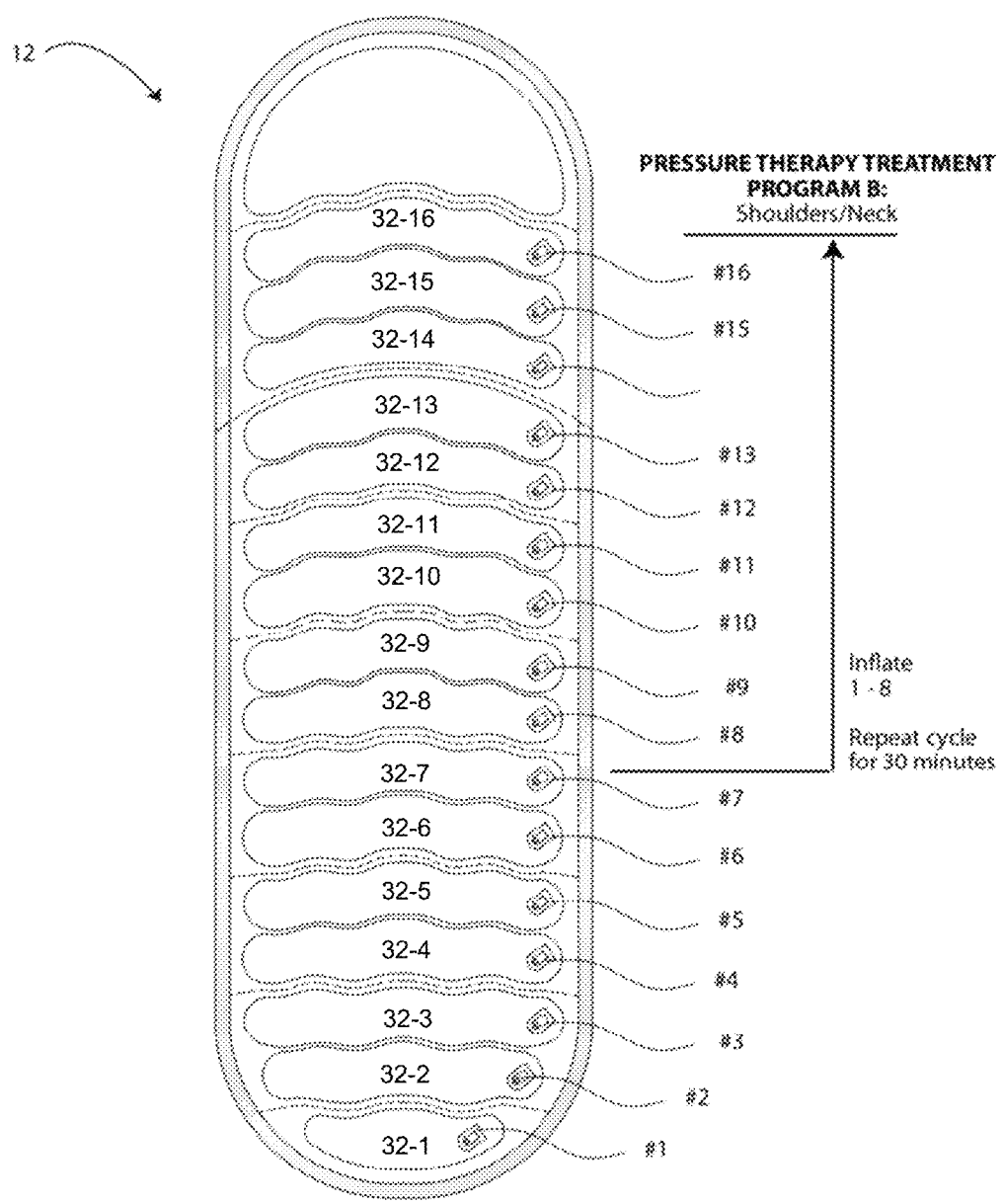
FIG. 10 illustrates an alternative pressure profile for a second pressure-therapy treatment.
Figure 11:
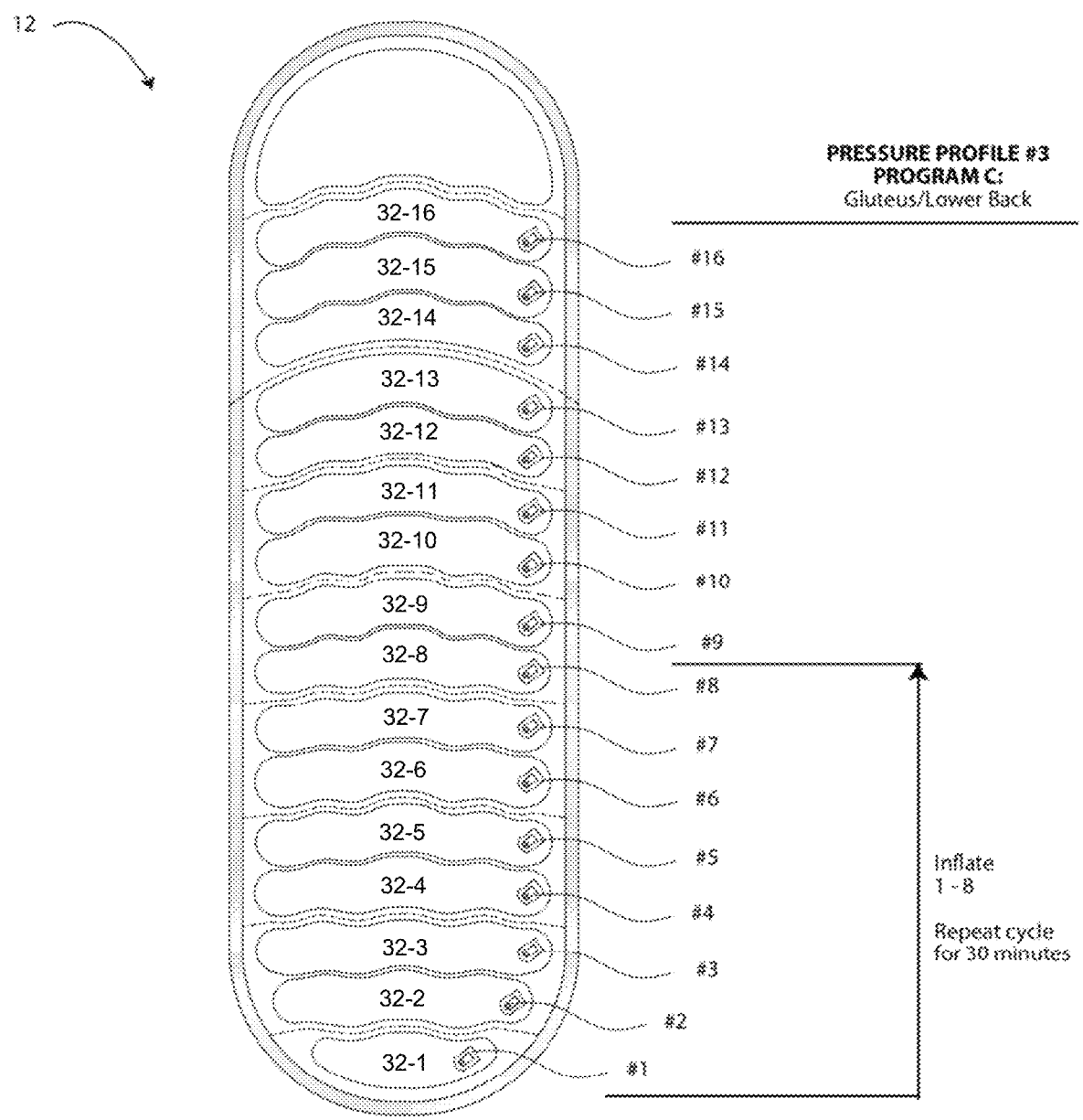
FIG. 11 illustrates yet another pressure profile for delivering a third pressure-therapy treatment.
Figure 12:
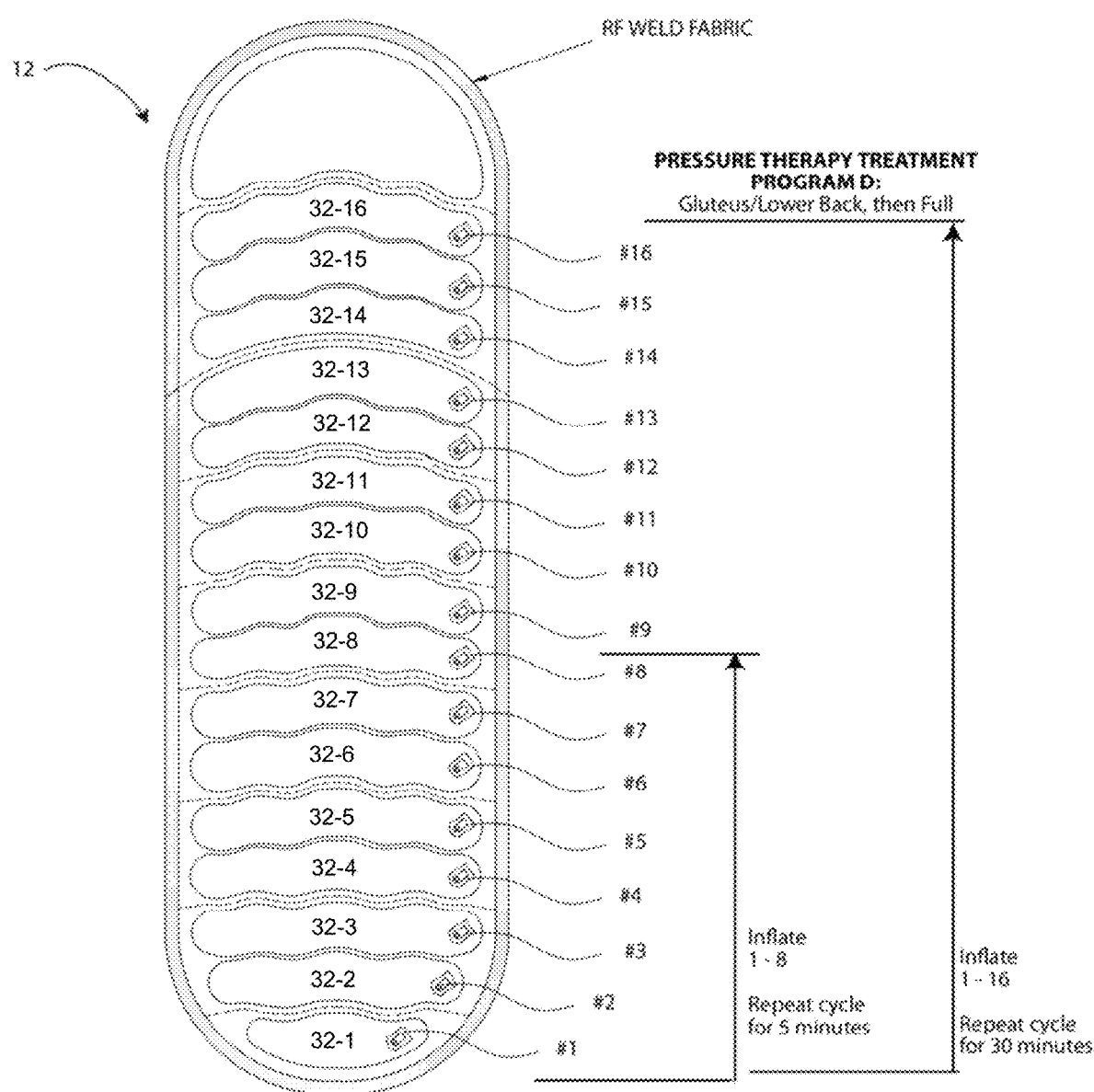
FIG. 12 illustrates a further pressure profile for delivering a fourth pressure-therapy treatment by the massage system.
Figure 13:
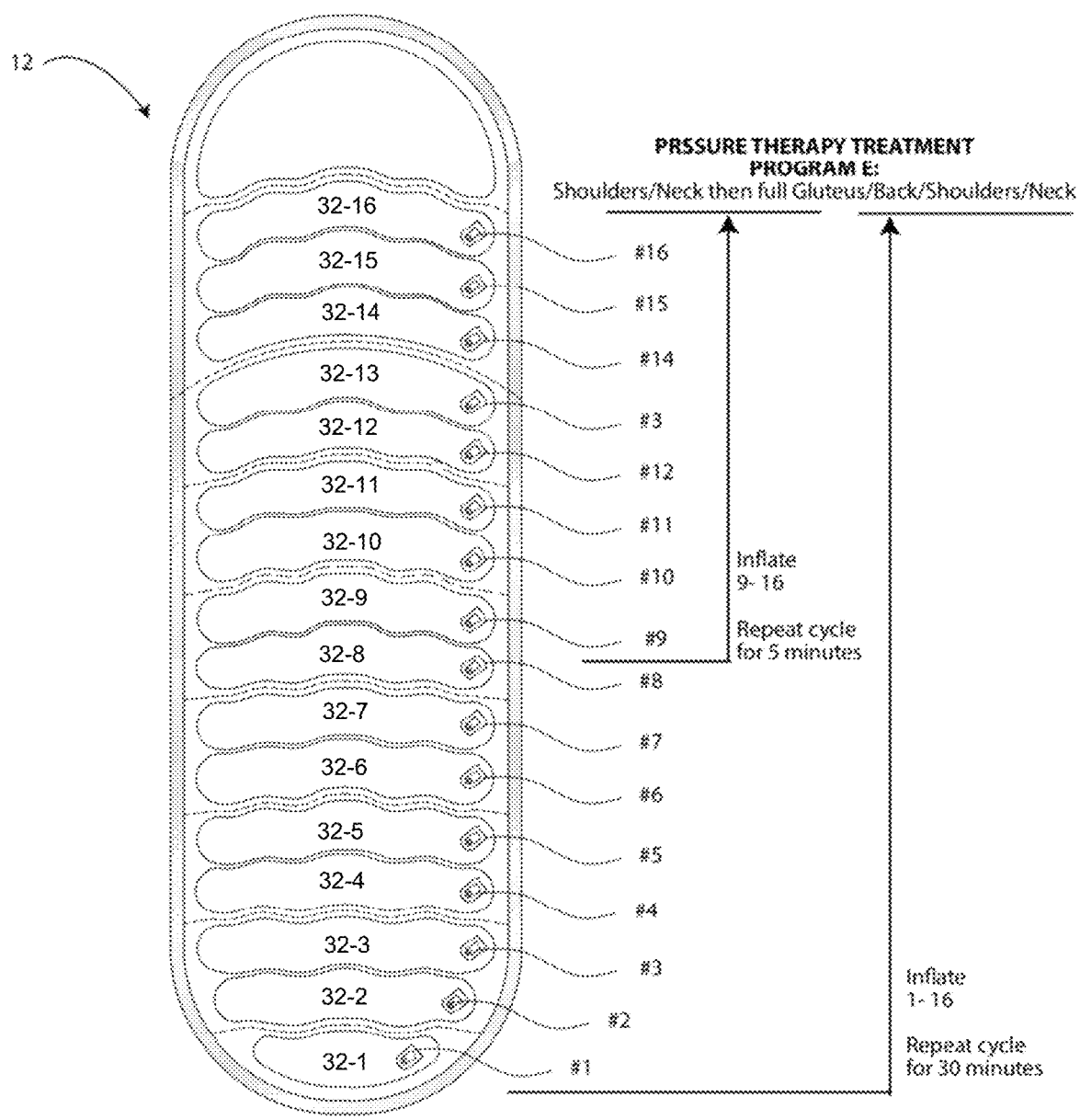
FIG. 13 illustrates an additional pressure profile for delivering a fifth pressure-therapy treatment.
Figure 38:
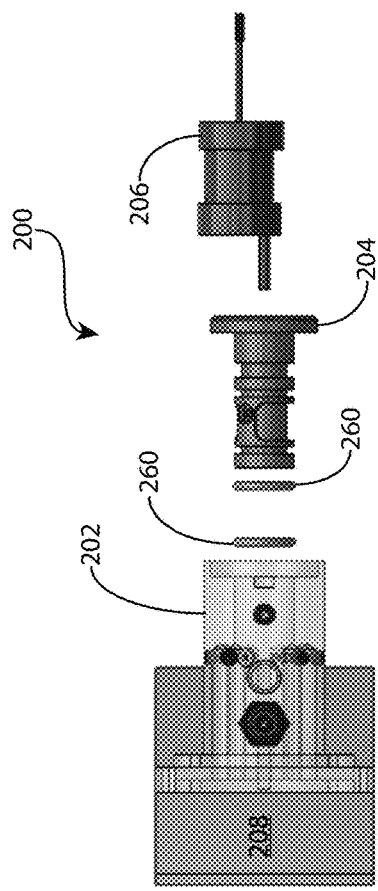
FIG. 38 is an exploded side view of the diverter of FIG. 35, depicted in phantom.

Referring to FIG. 10, massage system 10 provides therapeutic massage treatment to an individual's shoulder and neck by progressively inflating and deflating channels 32-8 thru 32-16. Referring to FIG. 11, massage system 10 provides therapeutic massage treatment to an individual's gluteus and lower back by progressively inflating and deflating channels 32-1 thru 32-8. Referring to FIGS. 12-13, massage systems provides asymmetric therapeutic massage treatment to an individual's gluteus, back, shoulders. As shown in FIG. 12, treatment is first applied to the individual's gluteus and lower back, followed by treatment to an individual's gluteus, lower and upper back, shoulders, and neck. As shown in FIG. 13, treatment is first applied to the individual's shoulders and neck, followed by treatment to the individual's gluteus, back, shoulders, and neck.

Massage system 10 is thereby capable of providing multiple sources of pressure therapy. A first source of pressure therapy originates in support pad 20, which applies pressure by continuously conforming to and supporting an individual's body. A second source of pressure therapy originates in therapy pad 30, which applies localized pressure along sinusoidal-shaped channels 32 located between the individual's body and support pad 20. A third source of pressure therapy originates in the controller unit 16, which can execute instructions for sequentially inflating and deflating channels 32 of therapy pad 30 in accordance with a prescribed treatment plan. These sources may be used alone, or in any combination with one another.

As will be appreciated, mattress 512 and controller 516 can also be operated to carry out many different pressure profiles. Several of these options have been discussed above in relation to FIGS. 9-13, which can all be accomplished using alternative therapy system 510.

Various embodiments of the invention have been described above for purposes of illustrating the details thereof and to enable one of ordinary skill in the art to make and use the invention. The details and features of the disclosed embodiment or embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A diverter for delivering air to a plurality of exit ports in a predetermined manner, comprising:
    a manifold having an air intake port and the plurality of exit ports housed therein, the air intake port and the plurality of exit ports in fluid communication with an internal chamber within the manifold;
    a swivel valve adapted to be received within the internal chamber of the manifold in a manner to allow rotation of the swivel valve with respect to a main body of the manifold, the swivel valve having a main bore extending inwardly from a first end and an exit opening positioned along an outer wall of the swivel valve, the exit opening extending into the main bore thus creating a fluid communication path between the main bore and the exit opening; and
    an actuator operatively coupled to the swivel valve to cause the rotation, wherein the actuator causes the swivel valve to be selectively positioned at a plurality of predetermined positions;

wherein the air intake port is oriented along an inner wall of the manifold at a first location, and the plurality of exit ports are oriented along the inner wall at a plurality of exit port locations;

wherein the swivel valve, when operatively positioned within the manifold, will have the main bore in fluid communication with the air intake port, and the exit opening positionable adjacent to any one of the plurality of exit ports, the swivel valve being shorter than the internal chamber thus providing an open space between the first end of the swivel valve and an end portion of the internal chamber; and wherein the inner wall of the manifold has a conical inner surface portion, each of the exit ports positioned at various locations along the conical inner surface, and wherein the exit ports provide fluid communication paths from the various locations along the conical inner surface to a plurality of locations at a first end of the manifold and wherein the swivel valve further has a conical surface which is positioned within the manifold at a location adjacent the manifold conical inner surface.

2. The diverter of claim 1 further comprising a seal positioned between the swivel valve and the internal chamber to provide an airtight enclosure and further direct airflow from the intake port to the main bore of the swivel valve.

3. A diverter for delivering air to a plurality of exit ports in a predetermined manner, comprising:

a manifold having an air intake port and the plurality of exit ports housed therein, the air intake port and the plurality of exit ports in fluid communication with an internal chamber within the manifold;

a swivel valve adapted to be received within the internal chamber of the manifold in a manner to allow rotation of the swivel valve with respect to a main body of the manifold, the swivel valve having a main bore extending inwardly from a first end and an exit opening positioned along an outer wall of the swivel valve, the exit opening extending into the main bore thus creating a fluid communication path between the main bore and the exit opening; and an actuator operatively coupled to the swivel valve to cause the rotation, wherein the actuator causes the swivel valve to be selectively positioned at a plurality of predetermined positions;

wherein positioning at each of the plurality of predetermined positions causes the swivel valve exit opening to be aligned with a selected one of the exit ports, positioning of the swivel valve at a predetermined one of the plurality of locations creating a fluid path extending from the intake port to the predetermined one of the exit ports;

wherein the air intake port is oriented along an inner wall of the manifold at a first location, and the plurality of exit ports are oriented along the inner wall at a plurality of exit port locations;

wherein the swivel valve, when operatively positioned within the manifold, will have the main bore in fluid communication with the air intake port, and the exit opening positionable adjacent to any one of the plurality of exit ports; and wherein the main body has eight exit ports, each positioned at a first end of the main body, and a connector extension configured to house the air intake port which can be coupled with an air supply hose, and wherein each of the eight exit ports are located within the extension.

4. The diverter of claim 3 wherein the swivel valve further has a sensor port configured to receive a sensor, the sensor port positioned a distance away from a central axis of rotation thus allowing an angular position of the swivel valve to be measured.

* * * * *